(12) United States Patent
Kwon et al.

(10) Patent No.: US 11,086,130 B2
(45) Date of Patent: Aug. 10, 2021

(54) OPTICAL DEVICE

(71) Applicant: Samsung Display Co., Ltd., Yongin-si (KR)

(72) Inventors: Jae Joong Kwon, Suwon-si (KR); Hyun Jin Cho, Seoul (KR); Ju Hwa Ha, Seoul (KR); Jeong Woo Park, Yongin-si (KR); Su Bin Jung, Incheon (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/514,885

(22) Filed: Jul. 17, 2019

(65) Prior Publication Data

US 2020/0026084 A1    Jan. 23, 2020

(30) Foreign Application Priority Data

Jul. 18, 2018   (KR) .................. 10-2018-0083640

(51) Int. Cl.
*G02B 27/01*   (2006.01)
*G02B 27/00*   (2006.01)
*G02B 3/00*    (2006.01)

(52) U.S. Cl.
CPC ....... *G02B 27/0172* (2013.01); *G02B 3/0037* (2013.01); *G02B 27/0093* (2013.01); *G02B 2027/0178* (2013.01); *G09G 2380/02* (2013.01)

(58) Field of Classification Search
CPC ................. G09G 2380/02; G02B 2027/0178
See application file for complete search history.

(56) References Cited

U.S. PATENT DOCUMENTS

| | | | |
|---|---|---|---|
| 9,237,338 B1* | 1/2016 | Maguire, Jr. | ...... G02B 27/0172 |
| 9,419,065 B2 | 8/2016 | Degner et al. | |
| 9,761,051 B2 | 9/2017 | Bromer | |
| 2010/0149073 A1 | 6/2010 | Chaum et al. | |
| 2011/0063580 A1* | 3/2011 | Amano | ............. G02B 17/0852 |
| | | | 353/20 |
| 2011/0249087 A1* | 10/2011 | Tsang | ................... H04N 9/8227 |
| | | | 348/40 |
| 2018/0063520 A1* | 3/2018 | Chung | ................. H04N 13/337 |
| 2018/0292652 A1* | 10/2018 | Ha | ..................... G02B 27/0179 |

FOREIGN PATENT DOCUMENTS

| | | |
|---|---|---|
| KR | 10-1660519 B1 | 9/2016 |
| KR | 10-1830364 B1 | 2/2018 |
| KR | 10-2018-0027813 A | 3/2018 |
| KR | 10-2018-0028339 A | 3/2018 |

* cited by examiner

*Primary Examiner* — Md Saiful A Siddiqui
(74) *Attorney, Agent, or Firm* — Lewis Roca Rothgerber Christie LLP

(57) ABSTRACT

An optical device is provided. The optical device includes: a lens including first and second reflective members; and a flexible display device including a first display area disposed on a first side surface of the lens and a second display area disposed on a second side surface of the lens, wherein the first reflective member is configured to reflect a first image displayed on the first display area to a first surface of the lens, and the second reflective member is configured to reflect a second image displayed on the second display area to the first surface of the lens.

29 Claims, 49 Drawing Sheets

OPTICAL DEVICE

CROSS-REFERENCE TO RELATED APPLICATION

This application claims priority to and the benefit of Korean Patent Application No. 10-2018-0083640, filed on Jul. 18, 2018, in the Korean Intellectual Property Office, the disclosure of which is incorporated herein by reference in its entirety.

BACKGROUND

1. Field

The present disclosure relates to an optical device.

2. Description of the Related Art

Augmented reality refers to a technology that displays a single image by superimposing a virtual image on a real image seen by a user's eyes. The virtual image may be an image in the form of text or graphics, and the real image may be information about an actual object (e.g., the image of a real object) observed in the field of view (FOV) of a device.

The augmented reality may be implemented utilizing a head mounted display (HMD), a head-up display (HUD), and/or the like. When implemented utilizing an HMD, the augmented reality may be provided in the form of eyeglasses that may not only be easily carried but also easily worn or taken off by a user. In this case, a display device that provides a virtual image for realizing the augmented reality is implemented utilizing a microdisplay such as an organic light emitting diode on silicon (OLEDoS) or a liquid crystal on silicon (LCOS).

Recently, there has been a demand to expand an area of a display device visible to a user's eyes, that is, the FOV of the user. In this case, a plurality of microdisplays may be needed.

SUMMARY

Aspects according to one or more embodiments of the present disclosure are directed toward an optical device implementing an augmented reality, which can expand an area of a display device visible to a user's eyes, that is, a field of view (FOV) of the user while utilizing one display.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an embodiment of the present disclosure, an optical device includes: a lens including first and second reflective members; and a flexible display device including a first display area on a first side surface of the lens and a second display area on a second side surface of the lens, wherein the first reflective member is configured to reflect a first image displayed on the first display area to a first surface of the lens, and the second reflective member is configured to reflect a second image displayed on the second display area to the first surface of the lens.

According to an embodiment of the present disclosure, an optical device includes: a lens including a first reflective member; and a flexible display device on a side surface of the lens and including a (1-1)-th display area for displaying a (1-1)-th image and a (1-2)-th display area for displaying a (2-1)-th image, wherein the side surface of the lens includes a light separation structure, wherein the light separation structure is configured to provide both the (1-1)-th image and the (2-1)-th image to the first reflective member, and the first reflective member is configured to reflect the (1-1)-th image and the (2-1)-th image from the light separation structure to a first surface of the lens.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions may be exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Hereinafter, example embodiments will be described with reference to the accompanying drawings.

Figure 1:
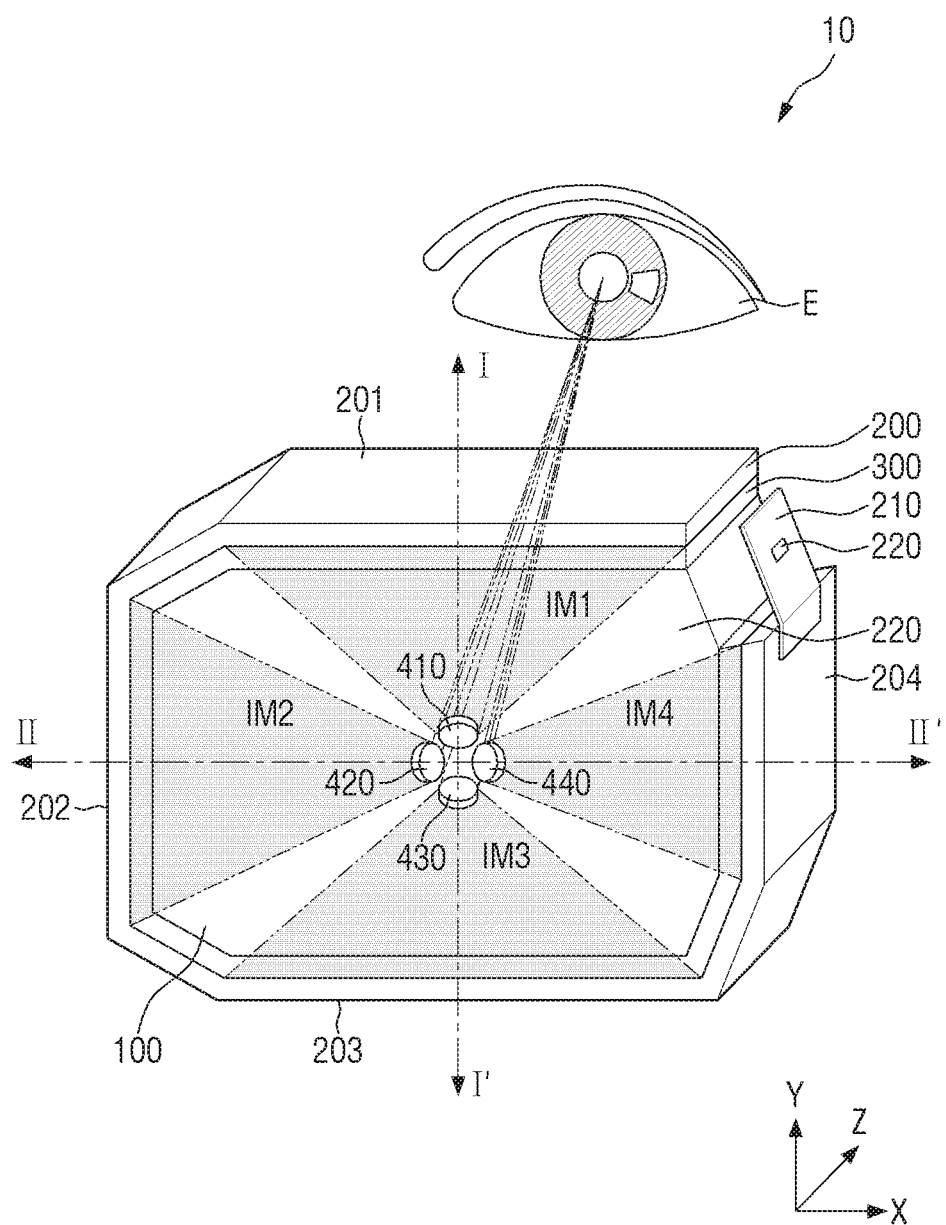
FIG. 1 is a perspective view of an augmented reality providing device according to an embodiment.

FIG. 1 is a perspective view of an augmented reality providing device according to an embodiment.

Referring to FIG. 1, the augmented reality providing device 10 according to the embodiment includes a lens 100, a flexible display device 200, and an adhesive layer 300. The augmented reality providing device 10 refers to an optical device for implementing an augmented reality.

The lens 100 may be formed to be transparent or translucent utilizing glass or plastic. Thus, a user can see a real image through the lens 100. The lens 100 may have a set or predetermined refractive power in consideration of the eyesight of the user.

Figure 2A:
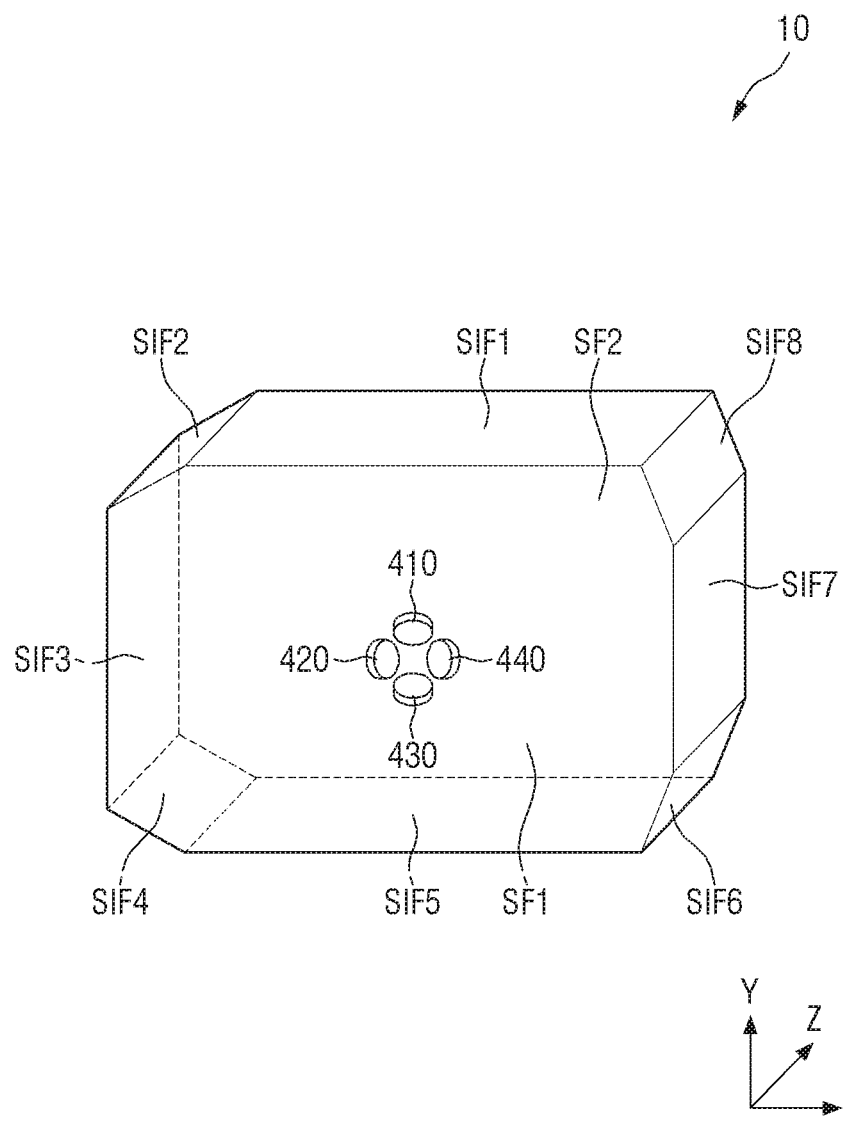
FIGS. 2A and 2B are perspective views each illustrating a lens of FIG. 1 in more detail.
Figure 2B:
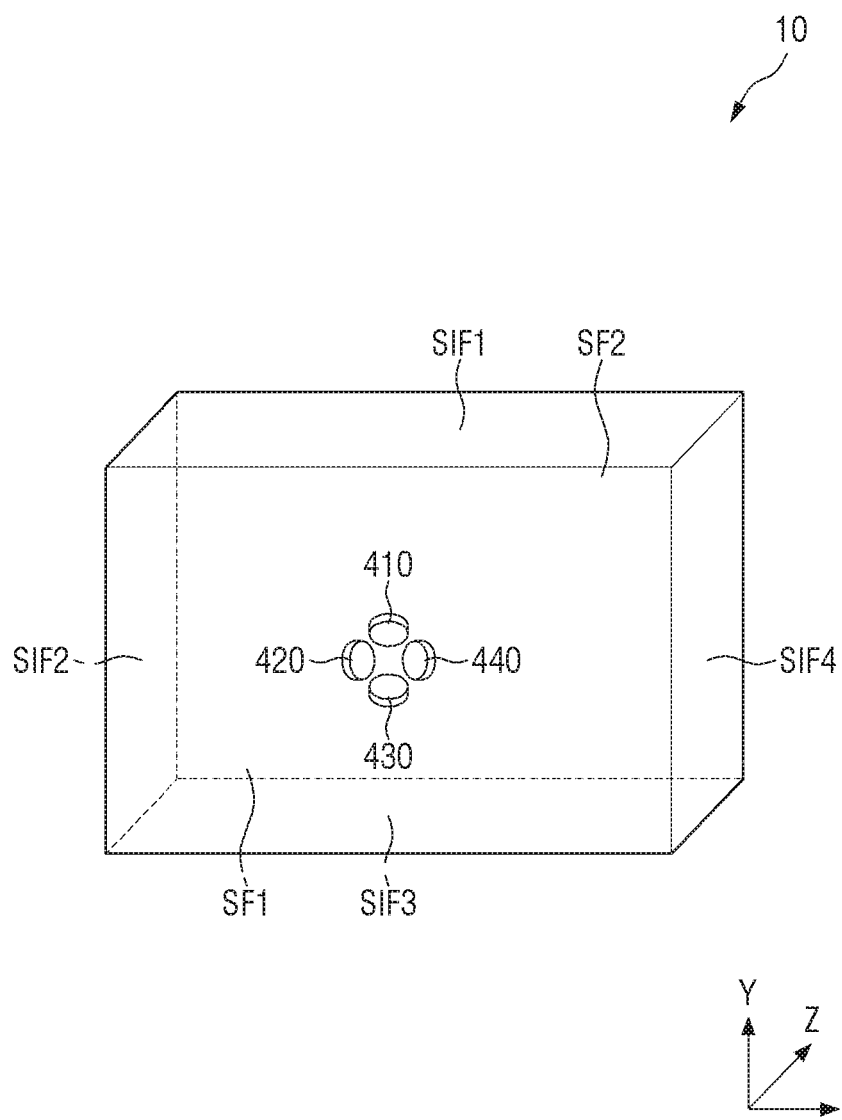

As illustrated in FIG. 2A, the lens 100 may be formed in the shape of a decahedron having octagonal first and second surfaces SF1 and SF2 and first through eighth side surfaces SIF1 through SIF8. However, the lens 100 may also be formed in various other suitable shapes. For example, as illustrated in FIG. 2B, the lens 100 may be formed in the shape of a hexahedron having rectangular first and second surfaces SF1 and SF2 and first through fourth side surfaces SIF1 through SIF4. That is, the lens 100 according to an embodiment may be formed in the shape of a polyhedron having polygonal first and second surfaces and side surfaces. In FIGS. 2A and 2B, the first surface SF1 is an upper surface, the second surface SF2 is a lower surface. The first surface SF1 may be defined as a surface where the user's eye E is located (or a surface where the user's eye E is facing), and the second surface SF2 may be defined as an outer surface of the lens 100. The lens 100 may also be formed in various suitable shapes other than the polyhedron, such as a circular cylinder, an elliptical cylinder, a semicircular cylinder, a semi-elliptical cylinder, a distorted circular cylinder, and/or a distorted semicircular cylinder. The distorted circular cylinder and the distorted semicircular cylinder refer to a circular cylinder and a semicircular cylinder having a non-uniform diameter.

The lens 100 includes first through fourth reflective members (e.g., reflectors or mirrors) 410 through 440. Each of the first through fourth reflective members 410 through 440 may also be referred to as a pin mirror, a reflector, or a mirror. The first through fourth reflective members 410 through 440 may be made of a metal material having high reflectance, such as silver (Ag).

In FIG. 1, the lens 100 includes one (i.e., a single) first reflective member 410, one second reflective member 420, one third reflective member 430, and one fourth reflective member 440. However, the lens 100 may also include a plurality of first reflective members 410, a plurality of second reflective members 420, a plurality of third reflective members 430, and a plurality of fourth reflective members 440. In order to expand an area of the flexible display device 200 visible to the user's eye E, that is, a field of view (FOV) of the user, the lens 100 may include a plurality of first reflective members 410, a plurality of second reflective members 420, a plurality of third reflective members 430, and a plurality of fourth reflective members 440.

The first through fourth reflective members 410 through 440 reflect a virtual image displayed on the flexible display device 200 to the user's eye E. Because the virtual image displayed on the display device 200 is reflected by the first through fourth reflective members 410 through 440, the depth of field is increased.

Figure 3A:
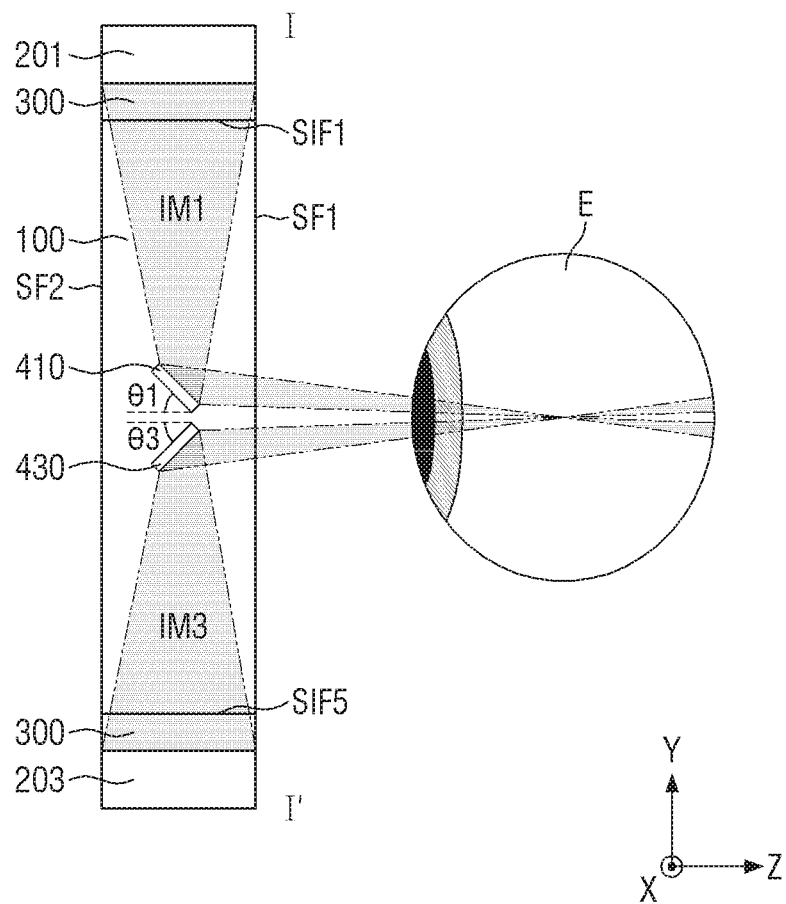
FIG. 3A illustrates an example cross-sectional view taken along the line I-I' of FIG. 1.
Figure 3B:
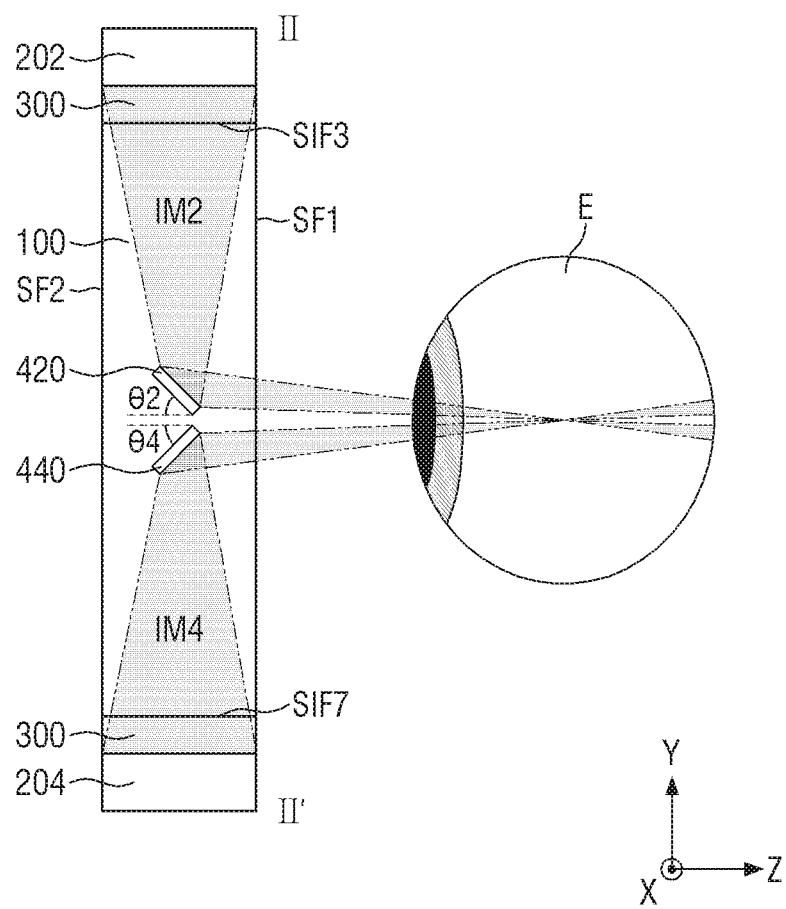
FIG. 3B illustrates an example cross-sectional view taken along the line II-II' of FIG. 1.
Figure 5:
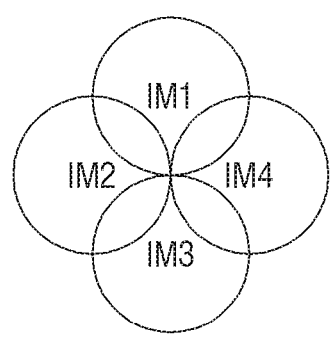
FIG. 5 illustrates images provided to a user by the augmented reality providing device of FIG. 1.

In one embodiment, as illustrated in FIG. 1, the first reflective member 410 reflects a first image IM1 of a first display area 201 to the first surface SF1 of the lens 100, thereby providing the first image IM1 to the user's eye E. The second reflective member 420 reflects a second image IM2 of a second display area 202 to the first surface SF1 of the lens 100, thereby providing the second image IM2 to the user's eye E. The third reflective member 430 reflects a third image IM3 of a third display area 203 to the first surface SF1 of the lens 100, thereby providing the third image IM3 to the user's eye E. The fourth reflective member 440 reflects a fourth image IM4 of a fourth display area 204 to the first surface SF1 of the lens 100, thereby providing the fourth image IM4 to the user's eye E. Here, the first through fourth reflective members 410 through 440 cause a virtual image, e.g., the first through fourth images IM1 through IM4 displayed on the flexible display device 200, to be focused at one point (e.g., at the same point) on the retina of the user's eye E, as illustrated in FIGS. 3A and 3B. Therefore, even if the user focuses on a real image through the lens 100, the virtual image can be clearly seen as illustrated in FIG. 5. That is, even if the user does not shift the focus on (or from) the real image, the virtual image can be clearly seen.

Each of the first through fourth reflective members 410 through 440 may be smaller than a pupil of the user's eye. For example, each of the first through fourth reflective members 410 through 440 may have a diameter of about 4 mm or less. In this case, it may be difficult for the user to recognize the first through fourth reflective members 410 through 440 because the user focuses on a real image (e.g., the user's eyes are focused on a real image at the time). However, as the size of each of the first through fourth reflective members 410 through 440 decreases, the luminance of a virtual image provided to the user's eye E by the flexible display device 200 also decreases. Therefore, the size of each of the first through fourth reflective members 410 through 440 may be set (or determined) in consideration of the luminance of the virtual image. Although each of the first through fourth reflective members 410 through 440 is shown to have a circular cross section in FIG. 1, it may also have an elliptical or polygonal cross section.

The flexible display device 200 displays a virtual image for realizing augmented reality. The flexible display device 200 may be disposed on the side surfaces of the lens 100.

The flexible display device 200 may include the first through fourth display areas 201 through 204 which display the first through fourth images IM1 through IM4. That is, the flexible display device 200 may include the first display area 201 which displays the first image IM1, the second display area 202 which displays the second image IM2, the third display area 203 which displays the third image IM3, and the fourth display area 204 which displays the fourth image IM4.

Referring to FIGS. 1 and 2A, the first display area 201 may be disposed on the first side surface SIF1 of the lens 100, the second display area 202 may be disposed on the third side surface SIF3 of the lens 100, the third display area 203 may be disposed on the fifth side surface SIF5 of the lens 100, and the fourth display area 204 may be disposed on the seventh side surface SIF7 of the lens 100. The second display area 202 may extend from an end of the first display area 201, and a bent area between the first display area 201 and the second display area 202 may be disposed on the second side surface SIF2 of the lens 100. The third display area 203 may extend from an end of the second display area 202, and a bent area between the second display area 202 and the third display area 203 may be disposed on the fourth side surface SIF4 of the lens 100. The fourth display area 204 may extend from an end of the third display area 203, and a bent area between the third display area 203 and the fourth display area 204 may be disposed on the sixth side surface SIF6 of the lens 100. That is, the flexible display device 200 may surround the side surfaces of the lens 100.

In FIGS. 1 and 2A, the first reflective member 410 is disposed closer to the first side surface SIF1 of the lens 100 and the first display area 201 of the flexible display device 200 than the second through fourth reflective members 420 through 440. The second reflective member 420 is disposed closer to the third side surface SIF3 of the lens 100 and the second display area 202 of the flexible display device 200 than the first, third and fourth reflective members 410, 430 and 440. The third reflective member 430 is disposed closer to the fifth side surface SIF5 of the lens 100 and the third display area 203 of the flexible display device 200 than the first, second and fourth reflective members 410, 420 and 440. The fourth reflective member 440 is disposed closer to the seventh side surface SIF7 of the lens 100 and the fourth display area 204 of the flexible display device 200 than the first through third reflective members 410 through 430.

Referring to FIGS. 1 and 2B, the first display area 201 may be disposed on the first side surface SIF1 of the lens 100, the second display area 202 may be disposed on the second side surface SIF2 of the lens 100, the third display area 203 may be disposed on the third side surface SIF3 of the lens 100, and the fourth display area 204 may be disposed on the fourth side surface SIF4 of the lens 100. The second display area 202 may extend from an end of the first display area 201, and a bent area between the first display area 201 and the second display area 202 may be disposed on a side shared by the first side surface SIF1 and the second side surface SIF2. The third display area 203 may extend from an end of the second display area 202, and a bent area between the second display area 202 and the third display area 203 may be disposed on a side shared by the second side surface SIF2 and the third side surface SIF3. The fourth display area 204 may extend from an end of the third display area 203, and a bent area between the third display area 203 and the fourth display area 204 may be disposed on a side shared by the third side surface SIF3 and the fourth side surface SIF4. That is, the flexible display device 200 may surround the side surfaces of the lens 100.

In FIGS. 1 and 2B, the first reflective member 410 is disposed closer to the first side surface SIF1 of the lens 100 and the first display area 201 of the flexible display device 200 than the second through fourth reflective members 420 through 440. The second reflective member 420 is disposed closer to the second side surface SIF2 of the lens 100 and the second display area 202 of the flexible display device 200 than the first, third and fourth reflective members 410, 430 and 440. The third reflective member 430 is disposed closer to the third side surface SIF3 of the lens 100 and the third display area 203 of the flexible display device 200 than the first, second and fourth reflective members 410, 420 and 440. The fourth reflective member 440 is disposed closer to the fourth side surface SIF4 of the lens 100 and the fourth display area 204 of the flexible display device 200 than the first through third reflective members 410 through 430.

The first reflective member 410 and the third reflective member 430 may be arranged with each other (e.g., side by side) in a second direction (Y-axis direction), which is a height direction of the lens 100. The first reflective member 410 and the third reflective member 430 may be arranged symmetrically in the second direction (Y-axis direction), which is the height direction of the lens 100, with respect to the center (e.g., the center of geometry or the center of mass) of the lens 100. The second reflective member 420 and the fourth reflective member 440 may be arranged with each other (e.g., side by side) in a first direction (X-axis direction). The second reflective member 420 and the fourth reflective member 440 may be arranged symmetrically in the first direction (X-axis direction) with respect to the center of the lens 100.

The first through fourth reflective members 410 through 440 may be arranged in a diamond shape as illustrated in FIG. 1. In this case, the first through fourth images IM1 through IM4 seen by the user may be in a diamond shape as illustrated in FIG. 5. As illustrated in FIG. 5, the first image IM1 and the third image IM3 may not overlap each other, and the second image IM2 and the fourth image IM4 may not overlap each other. In FIG. 5, the first image IM1 overlaps a part of the second image IM2 and a part of the fourth image IM4, the third image IM3 overlaps another part of the second image IM2 and another part of the fourth image IM4. However, the present disclosure is not limited to this case. That is, by adjusting the distance between the reflective members and the inclined angle of each of the reflective members, it is possible to make the first image IM1 not overlap the second image IM2 and the fourth image IM4 and make the third image IM3 not overlap the second image IM2 and the fourth image IM4.

As illustrated in FIGS. 3A and 3B, an inclined angle θ1 of the first reflective member 410 may be set such that the first reflective member 410 can reflect the first image IM1 of the first display area 201 to the user's eye E. An inclined angle θ2 of the second reflective member 420 may be set such that the second reflective member 420 can reflect the second image IM2 of the second display area 202 to the user's eye E. An inclined angle θ3 of the third reflective member 430 may be set such that the third reflective member 430 can reflect the third image IM3 of the third display area 203 to the user's eye E. An inclined angle θ4 of the fourth reflective member 440 may be set such that the fourth reflective member 440 can reflect the fourth image IM4 of the fourth display area 204 to the user's eye E.

The first through fourth angles 81 through 84 refer to angles of inclination in the second direction (Y-axis direction) with respect to a third direction (Z-axis direction), which is a thickness direction of the lens 100, as illustrated in FIGS. 3A and 3B.

When the first reflective member 410 and the third reflective member 430 are arranged symmetrically in the second direction (Y-axis direction) with respect to the center of the lens 100, the inclined angle θ1 of the first reflective member 410 and the inclined angle θ3 of the third reflective member 430 may be substantially the same as illustrated in FIG. 3A. In addition, when the second reflective member 420 and the fourth reflective member 440 are arranged symmetrically in the first direction (X-axis direction) with respect to the center of the lens 100, the inclined angle θ2 of the second reflective member 420 and the inclined angle θ4 of the fourth reflective member 440 may be substantially the same as illustrated in FIG. 3B.

The flexible display device 200 may be inclined at an angle to each side surface of the lens 100.

Figure 4A:
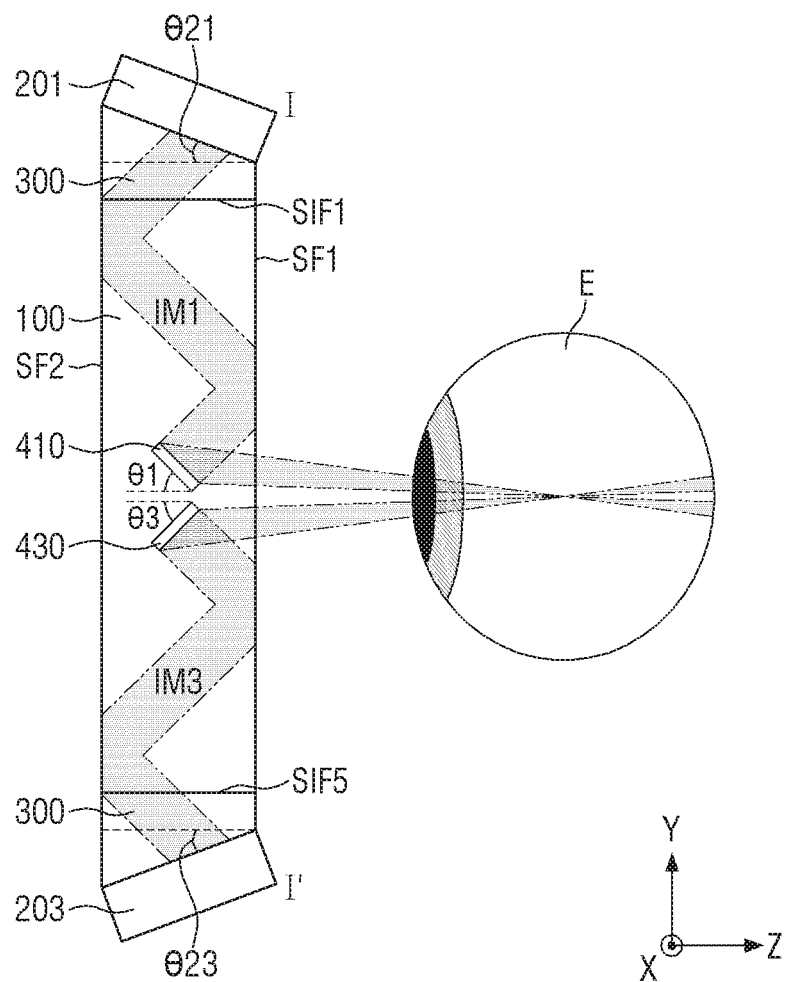
FIG. 4A illustrates another example cross-sectional view taken along the line I-I' of FIG. 1.

For example, as illustrated in FIG. 4A, the first display area 201 of the flexible display device 200 may be inclined at a set or predetermined angle θ21 with respect to the first side surface SIF1 of the lens 100. The third display area 203 may be inclined at a set or predetermined angle θ23 with respect to the fifth side surface SIF5 of the lens 100. The angle θ21 at which the first display area 201 is inclined with respect to the first side surface SIF1 of the lens 100 may be set in consideration of an angle for totally reflecting (e.g., total reflection of) the first image IM1 of the first display area 201 on the second surface SF2 of the lens 100. In addition, the angle θ23 at which the third display area 203 is inclined with respect to the fifth side surface SIF5 of the lens 100 may be set in consideration of an angle for totally reflecting the third image IM3 of the third display area 203 on the second surface SF2 of the lens 100. The angles for totally reflecting the first image IM1 of the first display area 201 and the third image IM3 of the third display area 203 on the second surface SF2 of the lens 100 may vary according to the material of the lens 100 and may be about 45 degrees or less. For example, when the lens 100 is made of poly (methyl methacrylate) (PMMA), the total reflection angle may be 42 degrees. Therefore, if the total reflection angle is taken into consideration, the angle θ21 at which the first display area 201 is inclined with respect to the first side surface SIF1 of the lens 100 and the angle θ23 at which the third display area 203 is inclined with respect to the fifth side surface SIF5 of the lens 100 may be 45 degrees or less.

In this case, the first image IM1 displayed by the first display area 201 may be totally reflected on the first surface SF1 and the second surface SF2 of the lens 100 and then reflected by the first reflective member 410 as illustrated in FIG. 4A. In addition, the third image IM3 displayed by the third display area 203 may be totally reflected on the first surface SF1 and the second surface SF2 of the lens 100 and then reflected by the third reflective member 430. When the first reflective member 410 and the third reflective member 430 are arranged symmetrically in the second direction (Y-axis direction), which is the height direction of the lens 100, with respect to the center of the lens 100, the angle θ21 at which the first display area 201 of the display device 200 is inclined with respect to the first side surface SIF1 of the lens 100 and the angle θ23 at which the third display area 203 of the flexible display device 200 is inclined with respect to the fifth side surface SIF5 of the lens 100 may be substantially the same.

Figure 4B:
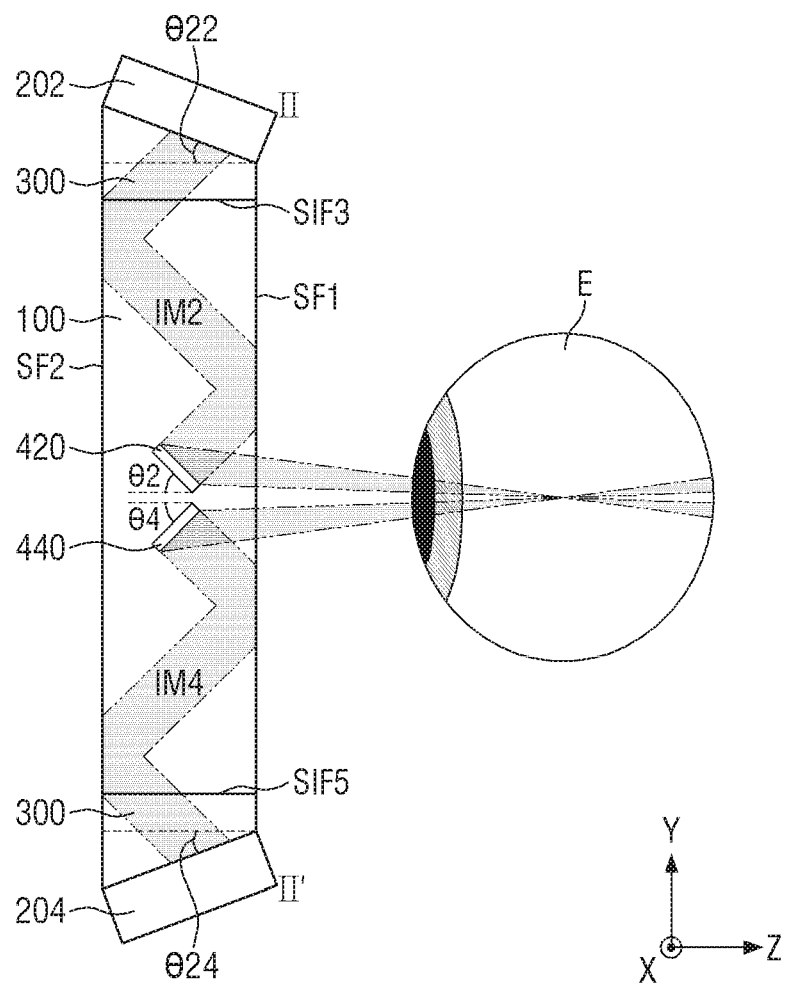
FIG. 4B illustrates another cross-sectional view taken along the line II-II' of FIG. 1.

In addition, as illustrated in FIG. 4B, the second display area 202 of the flexible display device 200 may be inclined at a set or predetermined angle θ22 with respect to the third side surface SIF3 the lens 100, and the fourth display area 204 may be inclined at a set or predetermined angle θ24 with respect to the seventh side surface SIF7 of the lens 100. The angle θ22 at which the second display area 202 is inclined with respect to the third side surface SIF3 of the lens 100 may be set in consideration of an angle for totally reflecting the second image IM2 of the second display area 202 on the second surface SF2 of the lens 100. In addition, the angle θ24 at which the fourth display area 204 is inclined with respect to the seventh side surface SIF7 of the lens 100 may be set in consideration of an angle for totally reflecting the fourth image IM4 of the fourth display area 204 on the second surface SF2 of the lens 100. The angles for totally reflecting the second image IM2 of the second display area 202 and the fourth image IM4 of the fourth display area 204 on the second surface SF2 of the lens 100 may vary according to the material of the lens 100 and may be about 45 degrees of less. For example, when the lens 100 is made of poly(methyl methacrylate) (PMMA), the total reflection angle may be 42 degrees. Therefore, if the total reflection angle is taken into consideration, the angle θ22 at which the second display area 202 is inclined with respect to the third side surface SIF3 of the lens 100 and the angle θ24 at which the fourth display area 204 is inclined with respect to the seventh side surface SIF7 of the lens 100 may be 45 degrees or less.

In this case, the second image IM2 displayed by the second display area 202 may be totally reflected on the first surface SF1 and the second surface SF2 of the lens 100 and then reflected by the second reflective member 420 as illustrated in FIG. 4B. In addition, the fourth image IM4 displayed by the fourth display area 204 may be totally reflected on the first surface SF1 and the second surface SF2 of the lens 100 and then reflected by the fourth reflective member 440. When the second reflective member 420 and the fourth reflective member 440 are arranged symmetrically in the first direction (X-axis direction), which is a width direction of the lens 100, with respect to the center of the lens 100, the angle θ22 at which the second display area 202 of the display device 200 is inclined with respect to the third side surface SIF3 of the lens 100 and the angle 824 at which the fourth display area 204 of the flexible display device 200 is inclined with respect to the seventh side surface SIF7 of the lens 100 may be substantially the same.

The flexible display device 200 may be bent due to its flexibility. For example, the flexible display device 200 may be an organic light emitting display.

The flexible display device 200 may include a substrate, a thin-film transistor layer disposed on the substrate, a light emitting element layer, an encapsulation layer, a barrier film disposed on the encapsulation layer, and a polarizer disposed on the barrier film.

In order for the flexible display device 200 to have flexibility, the substrate may be made of plastic. In this case, the substrate may include a flexible substrate and a support substrate. For example, the flexible substrate may be made of a polyimide film, and the support substrate may be made of polyethylene terephthalate (PET).

The thin-film transistor layer is disposed on the substrate. The thin-film transistor layer may include scan lines, data lines, and thin-film transistors. Each of the thin-film transistors includes a gate electrode, a semiconductor layer, and source and drain electrodes. When a scan driver is formed directly on the substrate, it may be formed together with the thin-film transistor layer.

The light emitting element layer is disposed on the thin-film transistor layer. The light emitting element layer includes anodes, a light emitting layer, a cathode, and banks. The light emitting layer may include an organic light emitting layer containing an organic material. For example, the light emitting layer may include a hole injection layer, a hole transporting layer, an organic light emitting layer, an electron transporting layer, and an electron injection layer. In an embodiment, the hole injection layer and the electron injection layer can be omitted. When a voltage is applied to the anodes and the cathode, holes and electrons move to the organic light emitting layer through the hole transporting layer and the electron transporting layer, respectively, and combine together in the organic light emitting layer to emit light. The light emitting element layer may be a pixel array layer in which pixels are formed. Therefore, an area in which the light emitting element layer is formed may be defined as a display area for displaying an image. An area around the display area may be defined as a non-display area.

The encapsulation layer is disposed on the light emitting element layer. The encapsulation layer serves to prevent or reduce penetration of oxygen or moisture into the light emitting element layer. The encapsulation layer may include at least one inorganic layer and at least one organic layer.

The barrier film for encapsulating the flexible display device 200 to protect the flexible display device 200 from oxygen or moisture is disposed on the encapsulation layer.

A flexible circuit board 210 is attached to an end of the fourth display area 204 of the flexible display device 200. Alternatively, the flexible circuit board 210 may be attached to the other end of the first display area 201 which faces the end of the fourth display area 204. Alternatively, when there are many signal lines and voltage lines for driving the flexible display device 200, two flexible circuit boards 210 may be attached to the other end of the first display area 201 and the end of the fourth display area 204, respectively. The flexible circuit board 210 may be a flexible printed circuit board or a chip on film (COF).

An integrated driver circuit 220 may be mounted on the flexible circuit board 210. The integrated driver circuit 220 may supply data voltages, scan control signals, a power supply voltage, etc., for driving the flexible display device 200 to the flexible display device 200.

The adhesive layer 300 bonds the lens 100 and the flexible display device 200 together. The adhesive layer 300 may be an optically clear resin (OCR) and/or an optically clear adhesive (OCA) film.

As described above, according to the augmented reality providing device 10 according to the embodiment, a real image may be provided to (e.g., formed in) a user's eye through the lens 100, and a virtual image output from the flexible display device 200 may be provided to (e.g., formed in) the user's eye through the first through fourth reflective members 410 through 440. That is, one image in which the virtual image is superimposed on the real image can be provided to (e.g., formed in) the user's eye.

In addition, in the augmented reality providing device 10 according to the embodiment, because the flexible display device 200 is disposed on a plurality of side surfaces of the lens 100, a plurality of images input to the side surfaces of the lens 100 may be provided to the user's eye through a plurality of reflective members, respectively. Therefore, even though one (e.g., a single) display is utilized, an area of the display device 200 visible to the user, that is, the FOV of the user can be expanded.

In comparable art, when a microdisplay such as an organic light emitting diode on silicon (OLEDoS) or a liquid crystal on silicon (LCOS) is utilized as the display device 200, a plurality of display devices 200 should be placed on the side surfaces of the lens 100 in order to expand the user's FOV. In this case, an image displayed on the display devices 200 may look separated to the user due to the space between the display devices 200. In addition, because the display devices 200 are driven individually, they need to be synchronized, which makes it complicated to drive the display devices 200. Further, in the case of an OLEDoS, because a color filter is formed on an organic light emitting layer that emits white light in order to realize color, it is difficult to achieve high luminance.

On the other hand, in the augmented reality providing device 10 according to the embodiment, because the flexible display device 200 is disposed on the side surfaces of the lens 100, a plurality of images can be output to the side surfaces of the lens 100, respectively. Thus, according to the augmented reality providing device 10 according to the embodiment, the user's FOV can be easily expanded, a virtual image does not look separated to the user, and there is no need to synchronize a plurality of display devices. In addition, if the display device 200 of the augmented reality providing device 10 according to the embodiment utilizes red, green and blue organic light emitting layers, it is an enhancement in achieving high luminance compared with an OLEDoS, because a color filter is not required.

Figure 6:
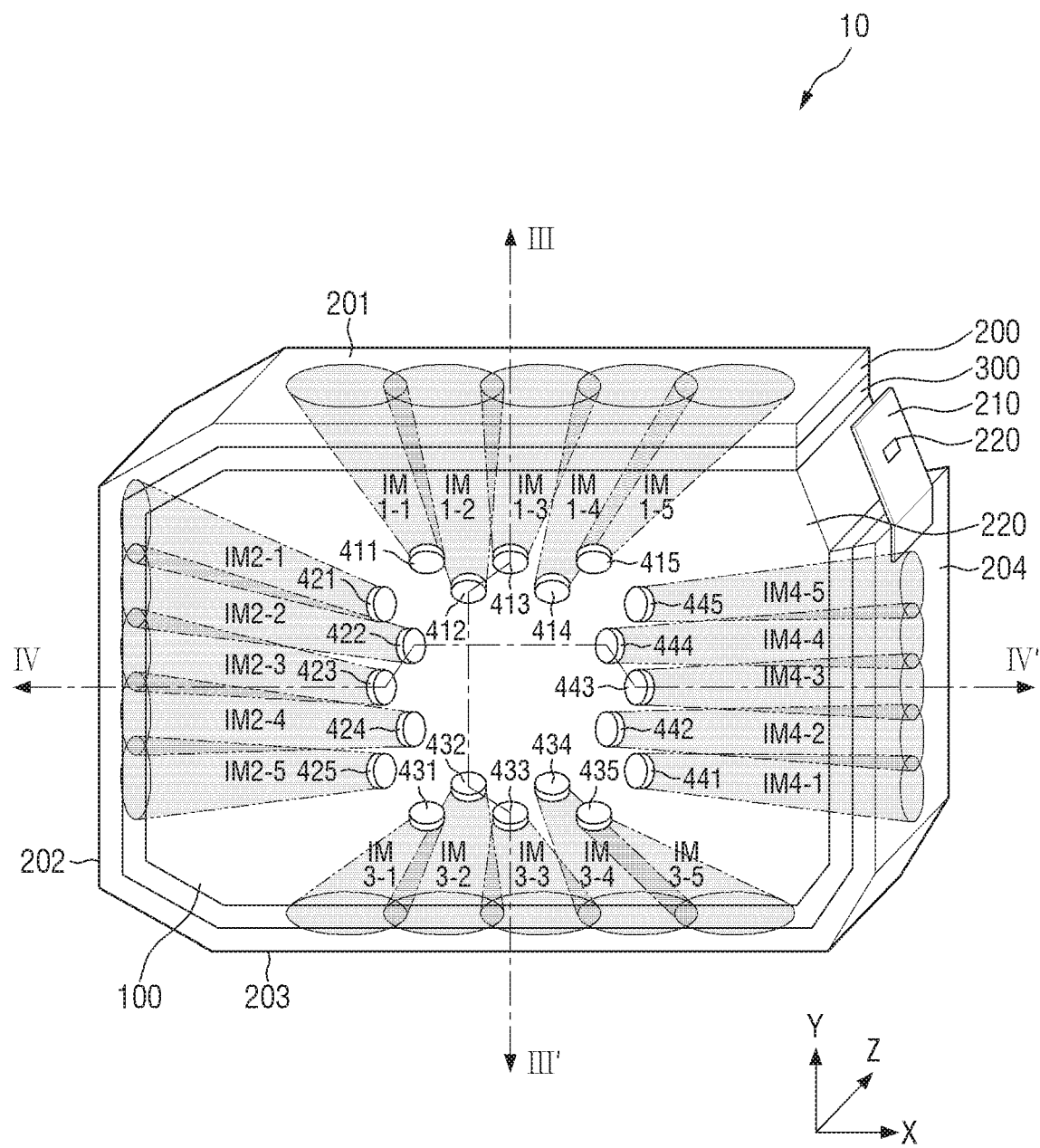
FIG. 6 is a perspective view of an augmented reality providing device according to an embodiment.

FIG. 6 is a perspective view of an augmented reality providing device 10 according to an embodiment.

The augmented reality providing device 10 illustrated in FIG. 6 includes a lens 100, a flexible display device 200, and an adhesive layer 300.

The embodiment shown in FIG. 6 is different from the embodiment shown in FIG. 1 in that the lens 100 includes a plurality of first reflective members 411 through 415, a plurality of second reflective members 421 through 425, a plurality of third reflective members 431 through 435, and a plurality of fourth reflective members 441 through 445. In FIG. 6, a description of elements and features identical or substantially similar to those of the embodiment shown in FIG. 1 may not be repeated.

Referring to FIG. 6, the first reflective members may include $(1\text{-}1)^{th}$ through $(1\text{-}5)^{th}$ reflective members 411 through 415. A first display area 201 of the flexible display device 200 may be divided into $(1\text{-}1)^{th}$ through $(1\text{-}5)^{th}$ display regions. The $(1\text{-}1)^{th}$ through $(1\text{-}5)^{th}$ reflective members 411 through 415 may reflect $(1\text{-}1)^{th}$ through $(1\text{-}5)^{th}$ images IM1-1 through IM1-5 displayed on the $(1\text{-}1)^{th}$ through $(1\text{-}5)^{th}$ display regions of the first display area 201 to a first surface of the lens 100, thereby providing the $(1\text{-}1)^{th}$ through $(1\text{-}5)^{th}$ images IM1-1 through IM1-5 to a user's eye E.

The second reflective members may include $(2\text{-}1)^{th}$ through $(2\text{-}5)^{th}$ reflective members 421 through 425. A second display area 202 of the flexible display device 200 may be divided into $(2\text{-}1)^{th}$ through $(2\text{-}5)^{th}$ display regions. The $(2\text{-}1)^{th}$ through $(2\text{-}5)^{th}$ reflective members 421 through 425 may reflect $(2\text{-}1)^{th}$ through $(2\text{-}5)^{th}$ images IM2-1 through IM2-5 displayed on the $(2\text{-}1)^{th}$ through $(2\text{-}5)^{th}$ display regions to the first surface of the lens 100, thereby providing the $(2\text{-}1)^{th}$ through $(2\text{-}5)^{th}$ images IM2-1 through IM2-5 to the user's eye E.

The third reflective members may include $(3\text{-}1)^{th}$ through $(3\text{-}5)^{th}$ reflective members 431 through 435. A third display area 203 of the flexible display device 200 may be divided into $(3\text{-}1)^{th}$ through $(3\text{-}5)^{th}$ display regions. The $(3\text{-}1)^{th}$ through $(3\text{-}5)^{th}$ reflective members 431 through 435 may reflect $(3\text{-}1)^{th}$ through $(3\text{-}5)^{th}$ images IM3-1 through IM3-5 displayed on the $(3\text{-}1)^{th}$ through $(3\text{-}5)^{th}$ display regions to the first surface of the lens 100, thereby providing the $(3\text{-}1)^{th}$ through $(3\text{-}5)^{th}$ images IM3-1 through IM3-5 to the user's eye E.

The fourth reflective members may include $(4\text{-}1)^{th}$ through $(4\text{-}5)^{th}$ reflective members 441 through 445. A fourth display area 204 of the flexible display device 200 may be divided into $(4\text{-}1)^{th}$ through $(4\text{-}5)^{th}$ display regions. The $(4\text{-}1)^{th}$ through $(4\text{-}5)^{th}$ reflective members 441 through 445 may reflect $(4\text{-}1)^{th}$ through $(4\text{-}5)^{th}$ images IM4-1 through IM4-5 displayed on the $(4\text{-}1)^{th}$ through $(4\text{-}5)^{th}$ display regions to the first surface of the lens 100, thereby providing the $(4\text{-}1)^{th}$ through $(4\text{-}5)^{th}$ images IM4-1 through IM4-5 to the user's eye E.

Figure 7A:
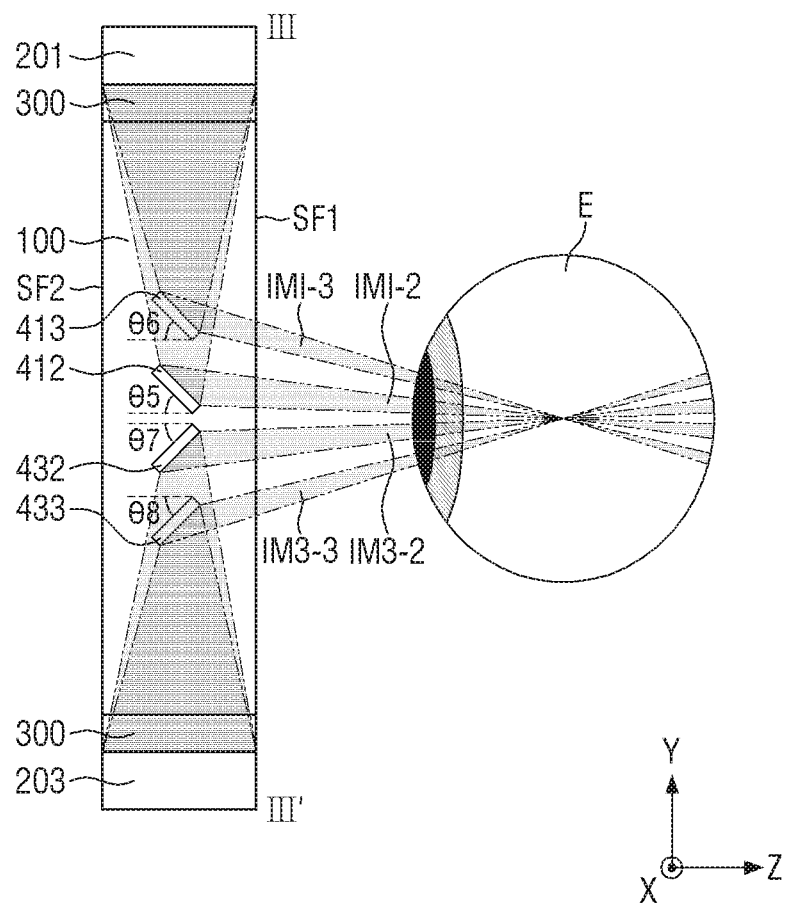
FIG. 7A illustrates an example cross-sectional view taken along the line III-III' of FIG. 6.
Figure 7B:
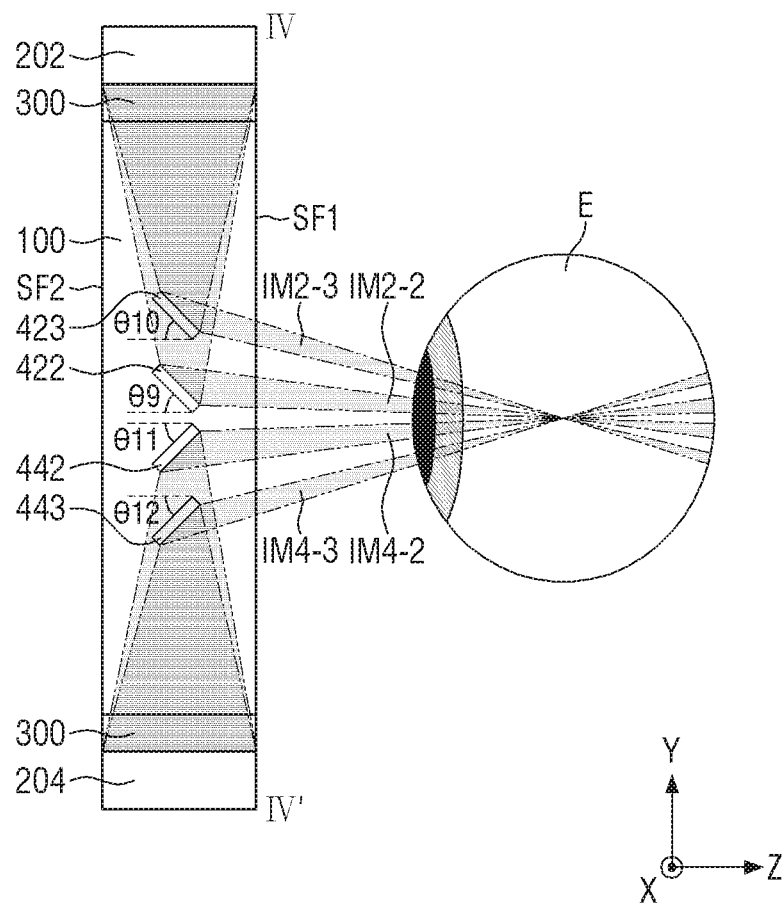
FIG. 7B illustrates an example cross-sectional view taken along the line IV-IV' of FIG. 6.
Figure 8:
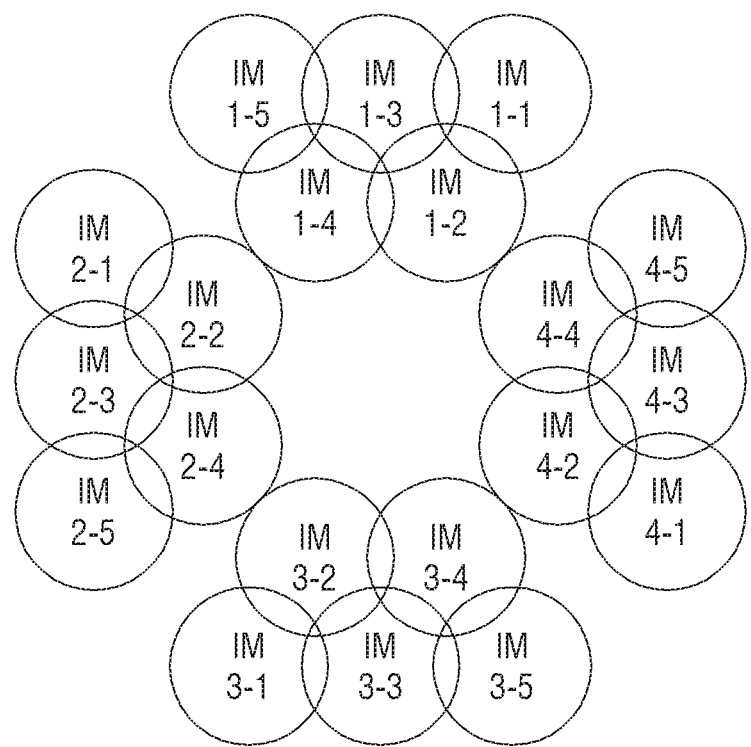
FIG. 8 illustrates images provided to a user by the augmented reality providing device of FIG. 6.

That is, because the $(1\text{-}1)^{th}$ through $(1\text{-}5)^{th}$ images IM1-1 through IM1-5, the $(2\text{-}1)^{th}$ through $(2\text{-}5)^{th}$ images IM2-1 through IM2-5, the $(3\text{-}1)^{th}$ through $(3\text{-}5)^{th}$ images IM3-1 through IM3-5 and the $(4\text{-}1)^{th}$ through $(4\text{-}5)^{th}$ images IM4-1 through IM4-5 displayed on the flexible display device 200 are reflected by the $(1\text{-}1)^{th}$ through $(1\text{-}5)^{th}$ reflective members 411 through 415, the $(2\text{-}1)^{th}$ through $(2\text{-}5)^{th}$ reflective members 421 through 425, the $(3\text{-}1)^{th}$ through $(3\text{-}5)^{th}$ reflective members 431 through 435 and the $(4\text{-}1)^{th}$ through $(4\text{-}5)^{th}$ reflective members 441 through 445, the depth of field is increased. In addition, the $(1\text{-}1)^{th}$ through $(1\text{-}5)^{th}$ reflective members 411 through 415, the $(2\text{-}1)^{th}$ through $(2\text{-}5)^{th}$ reflective members 421 through 425, the $(3\text{-}1)^{th}$ through $(3\text{-}5)^{th}$ reflective members 431 through 435 and the $(4\text{-}1)^{th}$ through $(4\text{-}5)^{th}$ reflective members 441 through 445 cause a virtual image, e.g., the $(1\text{-}1)^{th}$ through $(1\text{-}5)^{th}$ images IM1-1 through IM1-5, the $(2\text{-}1)^{th}$ through $(2\text{-}5)^{th}$ images IM2-1 through IM2-5, the $(3\text{-}1)^{th}$ through $(3\text{-}5)^{th}$ images IM3-1 through IM3-5 and the $(4\text{-}1)^{th}$ through $(4\text{-}5)^{th}$ images IM4-1 through IM4-5 displayed on the flexible display device 200 to be focused at one point on the retina of the user's eye E, as illustrated in FIGS. 7A and 7B. Therefore, even if the user focuses on a real image through the lens 100, the virtual image can be clearly seen as illustrated in FIG. 8. That is, even if the user does not shift the focus on the real image, the virtual image can be clearly seen.

The $(1\text{-}1)^{th}$ reflective member 411, the $(1\text{-}3)^{th}$ reflective member 413 and the $(1\text{-}5)^{th}$ reflective member 415 may be disposed closer to the first display area 201 than the $(1\text{-}2)^{th}$ reflective member 412 and the $(1\text{-}4)^{th}$ reflective member 414. The $(1\text{-}1)^{th}$ reflective member 411, the $(1\text{-}3)^{th}$ reflective member 413 and the $(1\text{-}5)^{th}$ reflective member 415 may be arranged side by side in the first direction (X-axis direction). The $(1\text{-}2)^{th}$ reflective member 412 and the $(1\text{-}4)^{th}$ reflective member 414 may be arranged side by side in the first direction (X-axis direction).

The $(2\text{-}1)^{th}$ reflective member 421, the $(2\text{-}3)^{th}$ reflective member 423 and the $(2\text{-}5)^{th}$ reflective member 425 may be disposed closer to the second display area 202 than the $(2\text{-}2)^{th}$ reflective member 422 and the $(2\text{-}4)^{th}$ reflective member 424. The $(2\text{-}1)^{th}$ reflective member 421, the $(2\text{-}3)^{th}$ reflective member 423 and the $(2\text{-}5)^{th}$ reflective member 425 may be arranged side by side in the second direction (Y-axis direction). The $(2\text{-}2)^{th}$ reflective member 422 and the $(2\text{-}4)^{th}$ reflective member 424 may be arranged side by side in the second direction (Y-axis direction).

The $(3\text{-}1)^{th}$ reflective member 431, the $(3\text{-}3)^{th}$ reflective member 433 and the $(3\text{-}5)^{th}$ reflective member 435 may be disposed closer to the third display area 203 than the $(3\text{-}2)^{th}$ reflective member 432 and the $(3\text{-}4)^{th}$ reflective member 434. The $(3\text{-}1)^{th}$ reflective member 431, the $(3\text{-}3)^{th}$ reflective member 433 and the $(3\text{-}5)^{th}$ reflective member 435 may be arranged side by side in the first direction (X-axis direction). The $(3\text{-}2)^{th}$ reflective member 432 and the $(3\text{-}4)^{th}$ reflective member 434 may be arranged side by side in the first direction (X-axis direction).

The $(4\text{-}1)^{th}$ reflective member 441, the $(4\text{-}3)^{th}$ reflective member 443 and the $(4\text{-}5)^{th}$ reflective member 445 may be disposed closer to the fourth display area 204 than the $(4\text{-}2)^{th}$ reflective member 442 and the $(4\text{-}4)^{th}$ reflective member 444. The $(4\text{-}1)^{th}$ reflective member 441, the $(4\text{-}3)^{th}$ reflective member 443 and the $(4\text{-}5)^{th}$ reflective member 445 may be arranged side by side in the second direction (Y-axis direction). The $(4\text{-}2)^{th}$ reflective member 442 and the $(4\text{-}4)^{th}$ reflective member 444 may be arranged side by side in the second direction (Y-axis direction).

Because the $(1\text{-}1)^{th}$ reflective member 411, the $(1\text{-}3)^{th}$ reflective member 413 and the $(1\text{-}5)^{th}$ reflective member 415 are disposed closer to the first display area 201 than the $(1\text{-}2)^{th}$ reflective member 412 and the $(1\text{-}4)^{th}$ reflective member 414, an inclined angle θ6 of each of the (1-1)th reflective member 411, the (1-3)th reflective member 413 and the (1-5)th reflective member 415 may be larger than an inclined angle θ5 of each of the (1-2)th reflective member 412 and the (1-4)th reflective member 414. Here, each of the (1-1)th reflective member 411, the (1-3)th reflective member 413 and the (1-5)th reflective member 415 may have the same inclined angle θ6, and each of the (1-2)th reflective member 412 and the (1-4)th reflective member 414 may have the same inclined angle θ5. In addition, because the (3-1)th reflective member 431, the (3-3)th reflective member 433 and the (3-5)th reflective member 435 are disposed closer to the third display area 203 than the (3-2)th reflective member 432 and the (3-4)th reflective member 434, an inclined angle θ8 of each of the (3-1)th reflective member 431, the (3-3)th reflective member 433 and the (3-5)th reflective member 435 may be larger than an inclined angle θ7 of each of the (3-2)th reflective member 432 and the $(3\text{-}4)^{th}$ reflective member 434. Here, each of the (3-1)th reflective member 431, the (3-3)th reflective member 433 and the (3-5)th reflective member 435 may have the same inclined angle θ8, and each of the (3-2)th reflective member 432 and the (3-4)$^{th}$ reflective member 434 may have the same inclined angle θ7.

The (1-1)$^{th}$ through (1-5)$^{th}$ reflective members 411 through 415 may be arranged symmetrically to the (3-1)$^{th}$ through (3-5)$^{th}$ reflective members 431 through 435 in the second direction (Y-axis direction) with respect to the center of the lens 100. In this case, as illustrated in FIG. 7A, the inclined angle θ6 of each of the (1-1)$^{th}$ reflective member 411, the (1-3)$^{th}$ reflective member 413 and the (1-5)$^{th}$ reflective member 415 may be substantially the same as the inclined angle θ8 of each of the (3-1)$^{th}$ reflective member 431, the (3-3)$^{th}$ reflective member 433 and the (3-5)$^{th}$ reflective member 435. In addition, the inclined angle θ5 of each of the (1-2)$^{th}$ reflective member 412 and the (1-4)$^{th}$ reflective member 414 may be substantially the same as the inclined angle θ7 of each of the (3-2)$^{th}$ reflective member 432 and the (3-4)$^{th}$ reflective member 434.

Because the (2-1)$^{th}$ reflective member 421, the (2-3)$^{th}$ reflective member 423 and the (2-5)$^{th}$ reflective member 425 are disposed closer to the second display area 202 than the (2-2)$^{th}$ reflective member 422 and the (2-4)$^{th}$ reflective member 424, an inclined angle θ10 of each of the (2-1)th reflective member 421, the (2-3)th reflective member 423 and the (2-5)th reflective member 425 may be larger than an inclined angle θ9 of each of the (2-2)$^{th}$ reflective member 422 and the (2-4)$^{th}$ reflective member 424. Here, each of the (2-1)th reflective member 421, the (2-3)th reflective member 423 and the (2-5)th reflective member 425 may have the same inclined angle θ10, and each of the (2-2)$^{th}$ reflective member 422 and the (2-4)$^{th}$ reflective member 424 may have the same inclined angle θ9. In addition, because the (4-1)$^{th}$ reflective member 441, the (4-3)$^{th}$ reflective member 443 and the (4-5)$^{th}$ reflective member 445 are disposed closer to the fourth display area 204 than the (4-2)$^{th}$ reflective member 442 and the (4-4)$^{th}$ reflective member 444, an inclined angle θ12 of each of the (4-1)th reflective member 441, the (4-3)th reflective member 443 and the (4-5)th reflective member 445 may be larger than an inclined angle θ11 of each of the (4-2)th reflective member 442 and the (4-4)th reflective member 444. Here, each of the (4-1)th reflective member 441, the (4-3)th reflective member 443 and the (4-5)th reflective member 445 may have the same inclined angle θ12, and each of the (4-2)th reflective member 442 and the (4-4)th reflective member 444 may have the same inclined angle θ11.

The (2-1)th through (2-5)th reflective members 421 through 425 may be arranged symmetrically to the (4-1)th through (4-5)th reflective members 441 through 445 in the first direction (X-axis direction) with respect to the center of the lens 100. In this case, as illustrated in FIG. 7B, the inclined angle θ10 of each of the (2-1)$^{th}$ reflective member 421, the (2-3)$^{th}$ reflective member 423 and the (2-5)$^{th}$ reflective member 425 may be substantially the same as the inclined angle θ12 of each of the (4-1)$^{th}$ reflective member 441, the (4-3)$^{th}$ reflective member 443 and the (4-5)$^{th}$ reflective member 445. In addition, the inclined angle θ9 of each of the (2-2)$^{th}$ reflective member 422 and the (2-4)$^{th}$ reflective member 424 may be substantially the same as the inclined angle θ11 of each of the (4-2)$^{th}$ reflective member 442 and the (4-4)$^{th}$ reflective member 444.

The fifth through twelfth angles θ5 through θ12 refer to angles of inclination in the second direction (Y-axis direction) with respect to the third direction (Z-axis direction), which is the thickness direction of the lens 100 as illustrated in FIGS. 7A and 7B.

As illustrated in FIG. 8, the (1-1)$^{th}$ through (1-5)$^{th}$ images IM1-1 through IM1-5, the (2-1)$^{th}$ through (2-5)$^{th}$ images IM2-1 through IM2-5, the (3-1)$^{th}$ through (3-5)$^{th}$ images IM3-1 through IM3-5 and the (4-1)$^{th}$ through (4-5)$^{th}$ images IM4-1 through IM4-5 seen by the user may be in the shape of Olympic rings (e.g., overlapping rings). In FIG. 8, the (1-1)$^{th}$ through (1-5)$^{th}$ images IM1-1 through IM1-5 overlap each other, the (2-1)$^{th}$ through (2-5)$^{th}$ images IM2-1 through IM2-5 overlap each other, the (3-1)$^{th}$ through (3-5)$^{th}$ images IM3-1 through IM3-5 overlap each other, and the (4-1)$^{th}$ through (4-5)$^{th}$ images IM4-1 through IM4-5 overlap each other. However, the present disclosure is not limited to this case. That is, by adjusting the distance between the reflective members and the inclined angle of each of the reflective members, it is possible to make the (1-1)$^{th}$ through (1-5)$^{th}$ images IM1-1 through IM1-5 not overlap each other, make the (2-1)$^{th}$ through (2-5)$^{th}$ images IM2-1 through IM2-5 not overlap each other, make the (3-1)$^{th}$ through (3-5)$^{th}$ images IM3-1 through IM3-5 not overlap each other, and make the (4-1)$^{th}$ through (4-5)$^{th}$ images IM4-1 through IM4-5 not overlap each other.

As described above, each of the first through fourth display areas 201 through 204 of the flexible display device 200 may include a plurality of display regions, and a plurality of images displayed on the display regions may be provided to the user's eye E through a plurality of reflective members. Therefore, in the embodiment illustrated in FIG. 6, an area visible to the user's eye E in each of the first through fourth display areas 201 through 204 may be increased compared with the embodiment illustrated in FIG. 1. Thus, the user's FOV can be expanded.

Figure 9:
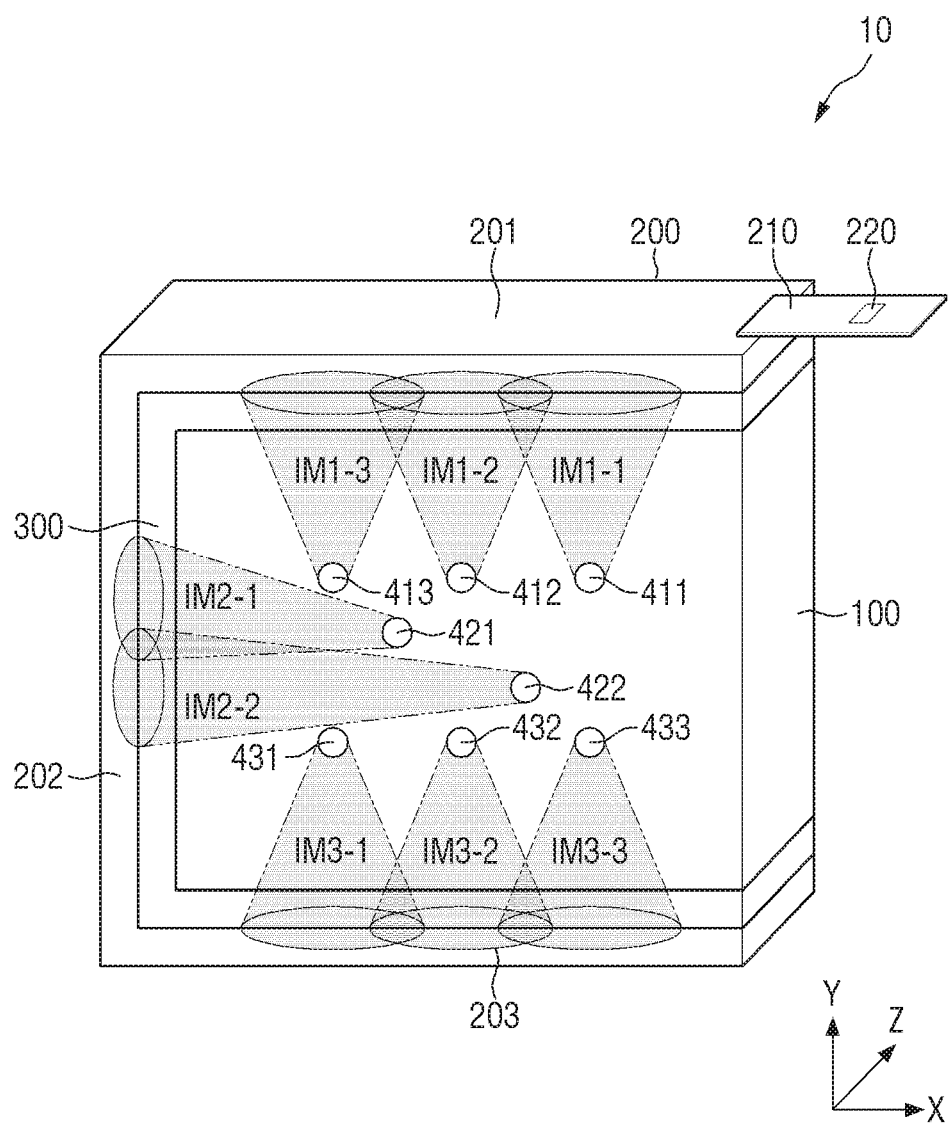
FIG. 9 is a perspective view of an augmented reality providing device according to an embodiment.

FIG. 9 is a perspective view of an augmented reality providing device 10 according to an embodiment.

The augmented reality providing device 10 illustrated in FIG. 9 includes a lens 100, a flexible display device 200, and an adhesive layer 300.

The embodiment shown in FIG. 9 is different from the embodiment shown in FIG. 1 in that the flexible display device 200 is disposed only on first through third side surfaces of the lens 100, and the lens 100 includes a plurality of first reflective members 411 through 413, a plurality of second reflective members 421 and 422 and a plurality of third reflective members 431 through 433, but does not include a fourth reflective member 440. In FIG. 9, a description of elements and features identical or substantially similar to those of the embodiment shown in FIG. 1 may not be repeated.

Referring to FIG. 9, the first reflective members may include (1-1)$^{th}$ through (1-3)$^{th}$ reflective members 411 through 413. A first display area 201 of the flexible display device 200 may be divided into (1-1)$^{th}$ through (1-3)$^{th}$ display regions. The (1-1)$^{th}$ through (1-3)$^{th}$ reflective members 411 through 413 may reflect (1-1)$^{th}$ through (1-3)$^{th}$ images IM1-1 through IM1-3 displayed on the (1-1)$^{th}$ through (1-3)$^{th}$ display regions of the first display area 201 to a first surface of the lens 100, thereby providing the (1-1)$^{th}$ through (1-3)$^{th}$ images IM1-1 through IM1-3 to a user's eye E.

The second reflective members may include (2-1)$^{th}$ and (2-2)$^{th}$ reflective members 421 and 422. A second display area 202 of the flexible display device 200 may be divided into (2-1)$^{th}$ and (2-2)$^{th}$ display regions. The (2-1)$^{th}$ and (2-2)$^{th}$ reflective members 421 and 422 may reflect (2-1)$^{th}$ and (2-2)$^{th}$ images IM2-1 and IM2-2 displayed on the (2-1)$^{th}$ and (2-2)$^{th}$ display regions to the first surface of the lens 100, thereby providing the (2-1)$^{th}$ and (2-2)$^{th}$ images IM2-1 through IM2-2 to the user's eye E.

The third reflective members may include (3-1)$^{th}$ through (3-3)$^{th}$ reflective members 431 through 433. A third display area 203 of the flexible display device 200 may be divided into (3-1)$^{th}$ through (3-3)$^{th}$ display regions. The (3-1)$^{th}$ through (3-3)$^{th}$ reflective members 431 through 433 may reflect (3-1)$^{th}$ through (3-3)$^{th}$ images IM3-1 through IM3-3 displayed on the (3-1)$^{th}$ through (3-3)$^{th}$ display regions to the first surface of the lens 100, thereby providing the (3-1)$^{th}$ through (3-3)$^{th}$ images IM3-1 through IM3-3 to the user's eye E.

That is, because the (1-1)$^{th}$ through (1-3)$^{th}$ images IM1-1 through IM1-3, the (2-1)$^{th}$ and the (2-2)$^{th}$ images IM2-1 and IM2-2, and the (3-1)$^{th}$ through (3-3)$^{th}$ images IM3-1 through IM3-3 displayed on the flexible display device 200 are reflected by the (1-1)$^{th}$ through (1-3)$^{th}$ reflective members 411 through 413, the (2-1)$^{th}$ and (2-2)$^{th}$ reflective members 421 and 422 and the (3-1)$^{th}$ through (3-3)$^{th}$ reflective members 431 through 433, the depth of field is increased. In addition, the (1-1)$^{th}$ through (1-3)$^{th}$ reflective members 411 through 413, the (2-1)$^{th}$ and (2-2)$^{th}$ reflective members 421 and 422 and the (3-1)$^{th}$ through (3-3)$^{th}$ reflective members 431 through 433 cause a virtual image, e.g., the (1-1)$^{th}$ through (1-3)$^{th}$ images IM1-1 through IM1-3, the (2-1)$^{th}$ and (2-2)$^{th}$ images IM2-1 and IM2-2 and the (3-1)$^{th}$ through (3-3)$^{th}$ images IM3-1 through IM3-3 displayed on the flexible display device 200 to be focused at one point on the retina of the user's eye E. Therefore, even if the user focuses on a real image through the lens 100, the virtual image can be clearly seen. That is, even if the user does not shift the focus on the real image, the virtual image can be clearly seen.

The (1-1)$^{th}$ through (1-3)$^{th}$ reflective members 411 through 413 may be arranged side by side in the first direction (X-axis direction). The (2-1)$^{th}$ reflective member 421 may be disposed closer to the second display area 202 than the (2-2)$^{th}$ reflective member 422. The (3-1)$^{th}$ through (3-3)$^{th}$ reflective members 431 through 433 may be arranged side by side in the first direction (X-axis direction). The (1-1)$^{th}$ through (1-3)$^{th}$ reflective members 411 through 413 may be arranged symmetrically to the (3-1)$^{th}$ through (3-3)$^{th}$ reflective members 431 through 433 in the second direction (Y-axis direction) with respect to the center of the lens 100.

A flexible circuit board 210 may be attached to an end of the first display area 201 of the flexible display device 200. Alternatively, the flexible circuit board 210 may be attached to an end of the third display area 203. Alternatively, when there are many signal lines and voltage lines for driving the flexible display device 200, two flexible circuit boards 210 may be attached to the end of the first display area 201 and the end of the third display area 203, respectively.

As described above, each of the first through third display areas 201 through 203 of the flexible display device 200 may include a plurality of display regions, and a plurality of images displayed on the display regions may be provided to the user's eye E through a plurality of reflective members. Therefore, in the embodiment illustrated in FIG. 9, an area visible to the user's eye E in each of the first through third display areas 201 through 203 may be increased compared with the embodiment illustrated in FIG. 1. Thus, the user's FOV can be expanded.

Figure 10:
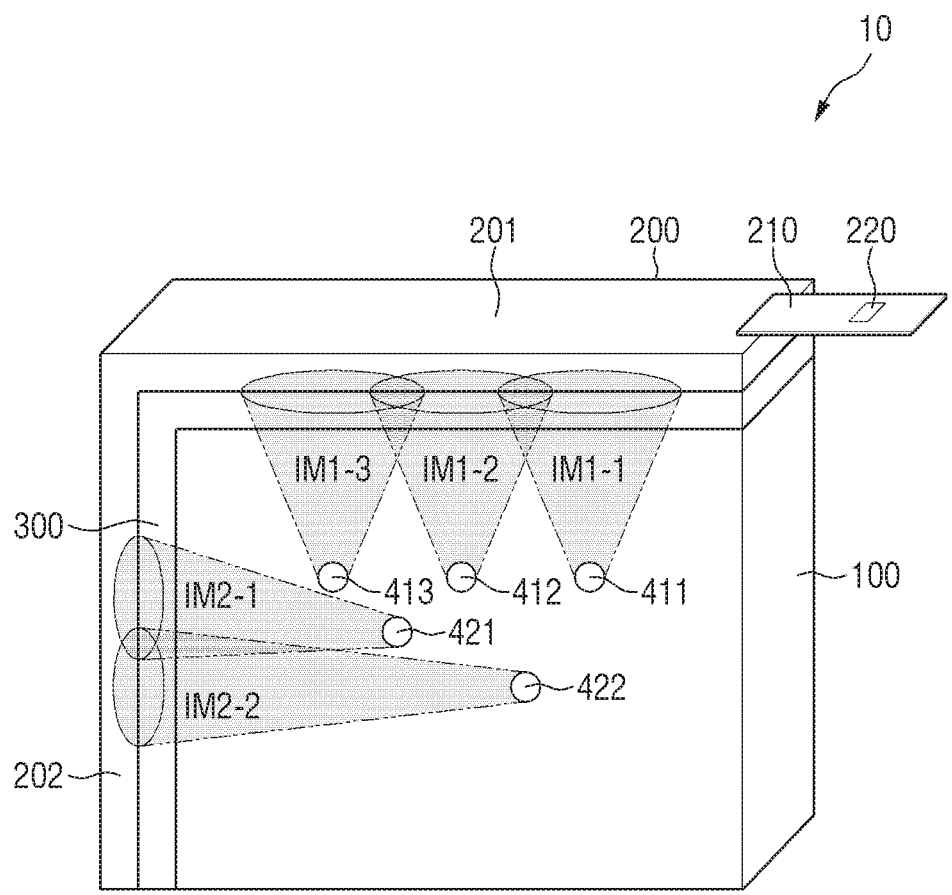
FIG. 10 is a perspective view of an augmented reality providing device according to an embodiment.

FIG. 10 is a perspective view of an augmented reality providing device 10 according to an embodiment.

The augmented reality providing device 10 illustrated in FIG. 10 includes a lens 100, a flexible display device 200, and an adhesive layer 300.

The embodiment shown in FIG. 10 is different from the embodiment shown in FIG. 1 in that the flexible display device 200 is disposed only on first and second side surfaces of the lens 100, and the lens 100 includes a plurality of first reflective members 411 through 413 and a plurality of second reflective members 421 and 422, but does not include third and fourth reflective members 430 and 440. In FIG. 10, a description of elements and features identical or substantially similar to those of the embodiment shown in FIG. 1 may not be repeated.

Referring to FIG. 10, the first reflective members may include (1-1)$^{th}$ through (1-3)$^{th}$ reflective members 411 through 413. A first display area 201 of the flexible display device 200 may be divided into (1-1)$^{th}$ through (1-3)$^{th}$ display regions. The (1-1)$^{th}$ through (1-3)$^{th}$ reflective members 411 through 413 may reflect (1-1)$^{th}$ through (1-3)$^{th}$ images IM1-1 through IM1-3 displayed on the (1-1)$^{th}$ through (1-3)$^{th}$ display regions of the first display area 201 to a first surface of the lens 100, thereby providing the (1-1)$^{th}$ through (1-3)$^{th}$ images IM1-1 through IM1-3 to a user's eye E.

The second reflective members may include (2-1)$^{th}$ and (2-2)$^{th}$ reflective members 421 and 422. A second display area 202 of the flexible display device 200 may be divided into (2-1)$^{th}$ and (2-2)$^{th}$ display regions. The (2-1)$^{th}$ and (2-2)$^{th}$ reflective members 421 and 422 may reflect (2-1)$^{th}$ and (2-2)$^{th}$ images IM2-1 and IM2-2 displayed on the (2-1)$^{th}$ and (2-2)$^{th}$ display regions to the first surface of the lens 100, thereby providing the (2-1)$^{th}$ and (2-2)$^{th}$ images IM2-1 through IM2-2 to the user's eye E.

That is, because the (1-1)$^{th}$ through (1-3)$^{th}$ images IM1-1 through IM1-3 and the (2-1)$^{th}$ and the (2-2)$^{th}$ images IM2-1 and IM2-2 displayed on the flexible display device 200 are reflected by the (1-1)$^{th}$ through (1-3)$^{th}$ reflective members 411 through 413 and the (2-1)$^{th}$ and (2-2)$^{th}$ reflective members 421 and 422, the depth of field is increased. In addition, the (1-1)$^{th}$ through (1-3)$^{th}$ reflective members 411 through 413 and the (2-1)$^{th}$ and (2-2)$^{th}$ reflective members 421 and 422 cause a virtual image, e.g., the (1-1)$^{th}$ through (1-3)$^{th}$ images IM1-1 through IM1-3 and the (2-1)$^{th}$ and (2-2)$^{th}$ images IM2-1 and IM2-2 displayed on the flexible display device 200 to be focused at one point on the retina of the user's eye E. Therefore, even if the user focuses on a real image through the lens 100, the virtual image can be clearly seen. That is, even if the user does not shift the focus on the real image, the virtual image can be clearly seen.

The (1-1)$^{th}$ through (1-3)$^{th}$ reflective members 411 through 413 may be arranged side by side in the first direction (X-axis direction). The (2-1)$^{th}$ reflective member 421 may be disposed closer to the second display area 202 than the (2-2)$^{th}$ reflective member 422.

A flexible circuit board 210 may be attached to an end of the first display area 201 of the flexible display device 200. Alternatively, the flexible circuit board 210 may be attached to an end of the second display area 202. Alternatively, when there are many signal lines and voltage lines for driving the flexible display device 200, two flexible circuit boards 210 may be attached to the end of the first display area 201 and the end of the third display area 203, respectively.

As described above, each of the first and second display areas 201 and 202 of the flexible display device 200 may include a plurality of display regions, and a plurality of images displayed on the display regions may be provided to the user's eye E through a plurality of reflective members.

Therefore, in the embodiment illustrated in FIG. 10, an area visible to the user's eye E in each of the first and second display areas 201 and 202 may be increased compared with the embodiment illustrated in FIG. 1. Thus, the user's FOV can be expanded.

Figure 11:
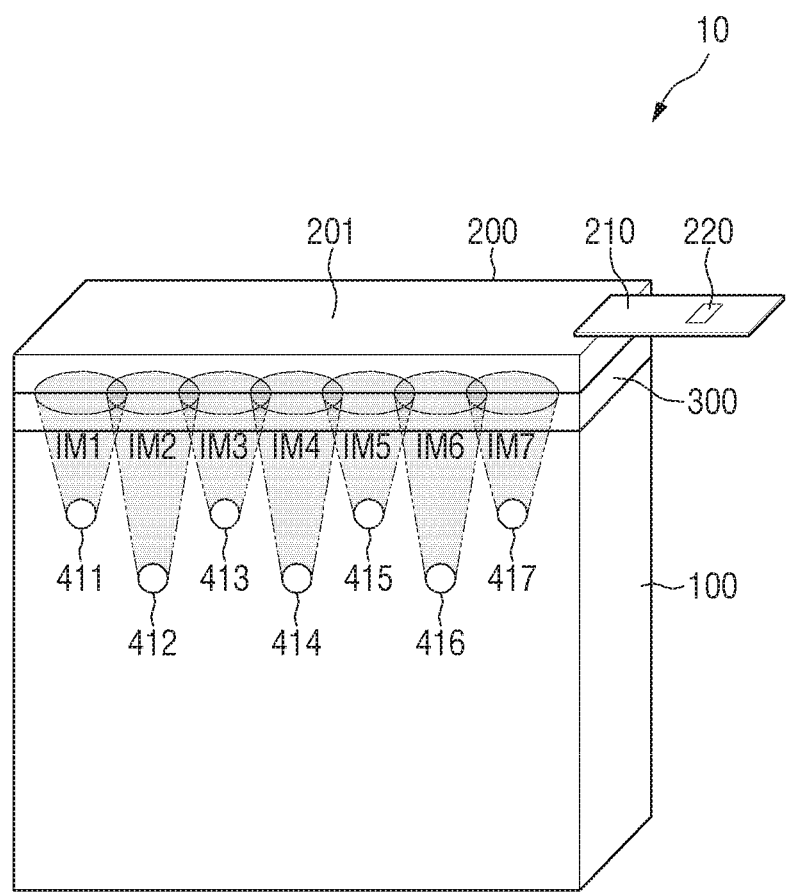
FIG. 11 is a perspective view of an augmented reality providing device according to an embodiment.

FIG. 11 is a perspective view of an augmented reality providing device 10 according to an embodiment.

The augmented reality providing device 10 illustrated in FIG. 11 includes a lens 100, a flexible display device 200, and an adhesive layer 300.

The embodiment shown in FIG. 11 is different from the embodiment shown in FIG. 1 in that the flexible display device 200 is disposed only on a first side surface of the lens 100, and the lens 100 includes a plurality of first reflective members 411 through 417, but does not include second through fourth reflective members 420 through 440. In FIG. 11, a description of elements and features identical or substantially similar to those of the embodiment shown in FIG. 1 may not be repeated.

Referring to FIG. 11, the first reflective members may include $(1-1)^{th}$ through $(1-7)^{th}$ reflective members 411 through 417. The flexible display device 200 may be divided into $(1-1)^{th}$ through $(1-7)^{th}$ display regions. The $(1-1)^{th}$ through $(1-7)^{th}$ reflective members 411 through 417 may reflect $1^{st}$ through $7^{th}$ images IM1 through IM7 displayed on the $(1-1)^{th}$ through $(1-7)^{th}$ display regions to a first surface of the lens 100, thereby providing the $1^{st}$ through $7^{th}$ images IM1 through IM7 to a user's eye E.

That is, because the $1^{st}$ through $7^{th}$ images IM1 through IM7 displayed on the flexible display device 200 are reflected by the $1^{st}$ through $7^{th}$ reflective members 411 through 417, the depth of field is increased. In addition, the $1^{th}$ through $7^{th}$ reflective members 411 through 417 cause a virtual image, e.g., the $1^{st}$ through $7^{th}$ images IM1 through IM7 displayed on the flexible display device 200 to be focused at one point on the retina of the user's eye E. Therefore, even if the user focuses on a real image through the lens 100, the virtual image can be clearly seen. That is, even if the user does not shift the focus on the real image, the virtual image can be clearly seen.

The (1-1)th, $(1-5)^{th}$ and $(1-7)^{th}$ reflective members 411, 413, 415 and 417 may be arranged side by side in the first direction (X-axis direction). The $(1-2)^{th}$, $(1-4)^{th}$ and $(1-6)^{th}$ reflective members 412, 414 and 416 may be arranged side by side in the first direction (X-axis direction). The $(1-1)^{th}$, $(1-3)^{th}$, $(1-5)^{th}$ and $(1-7)^{th}$ reflective members 411, 413, 415 and 417 may be disposed closer to the flexible display device 200 than the $(1-2)^{th}$, $(1-4)^{th}$ and $(1-6)^{th}$ reflective members 412, 414 and 416.

A flexible circuit board 210 may be attached to an end or the other end of a first display area 201 of the flexible display device 200. Alternatively, when there are many signal lines and voltage lines for driving the flexible display device 200, two flexible circuit boards 210 may be attached to the end and the other end (i.e., two opposing ends) of the first display area 201, respectively.

As described above, the flexible display device 200 disposed on a side surface of the lens 100 may include a plurality of display regions, and a plurality of images displayed on the display regions may be provided to the user's eye E through a plurality of reflective members. Therefore, in the embodiment illustrated in FIG. 11, an area visible to the user's eye E in the flexible display device 200 disposed on the side surface of the lens 100 may be increased compared with the embodiment illustrated in FIG. 1. Thus, the user's FOV can be expanded.

Figure 12:
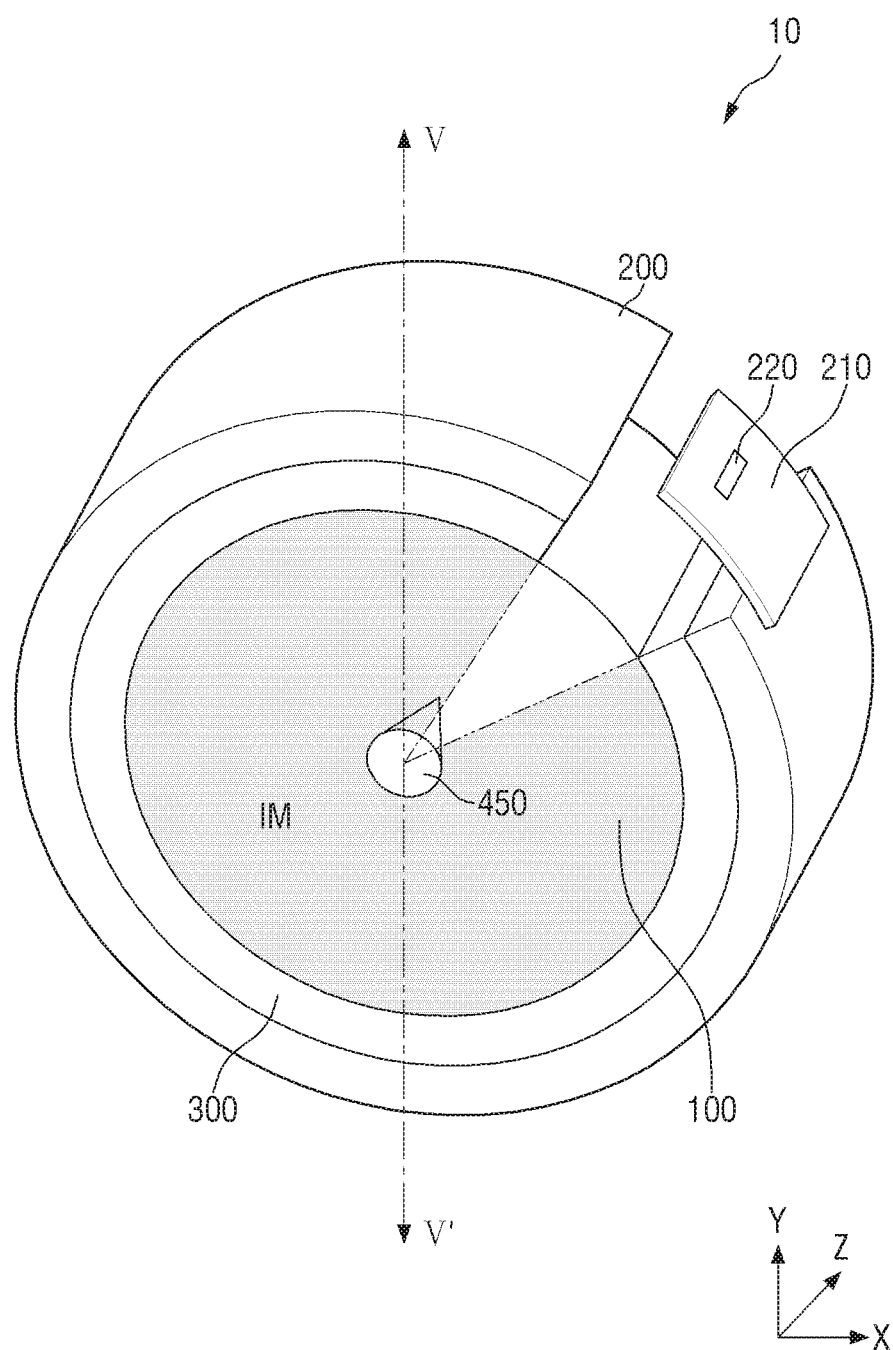
FIG. 12 is a perspective view of an augmented reality providing device according to an embodiment.

FIG. 12 is a perspective view of an augmented reality providing device 10 according to an embodiment.

The augmented reality providing device 10 illustrated in FIG. 12 includes a lens 100, a flexible display device 200, and an adhesive layer 300.

The embodiment shown in FIG. 12 is different from the embodiment shown in FIG. 1 in that the lens 100 is formed in the shape of a cylinder rather than a polyhedron, the flexible display device 200 surrounds a side surface of the lens 100, and the lens 100 includes one reflective member. In FIG. 12, a description of elements and features identical or substantially similar to those of the embodiment shown in FIG. 1 may not be repeated.

Figure 13:
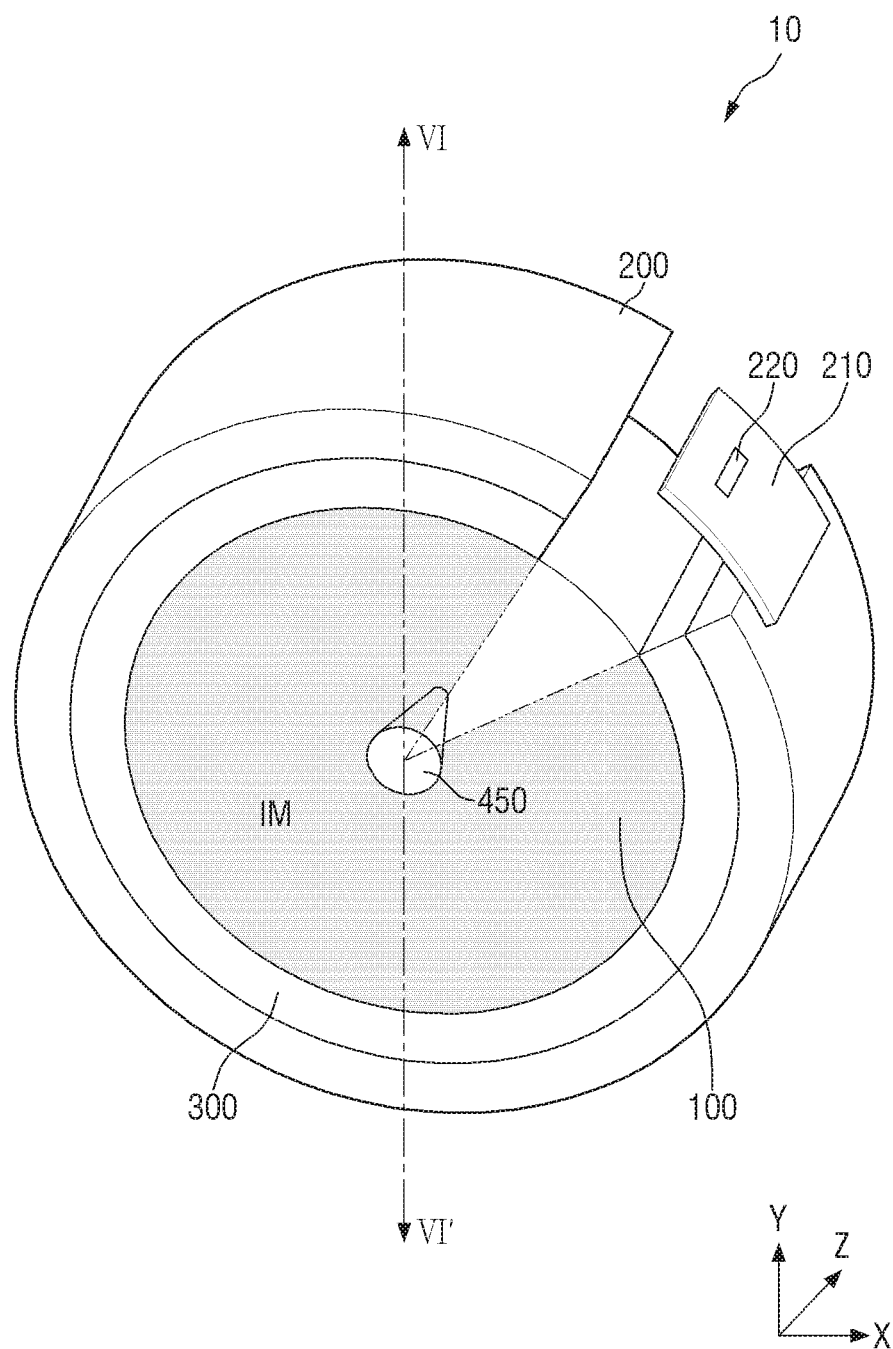
FIG. 13 is a perspective view of an augmented reality providing device according to an embodiment.

Referring to FIG. 12, the lens 100 is formed in the shape of a circular cylinder having circular first and second surfaces and a side surface. However, the lens 100 may also be formed in various other suitable shapes. For example, the lens 100 may be formed in the shape of an elliptical cylinder having elliptical first and second surfaces and a side surface as illustrated in FIG. 13. Alternatively, the lens 100 may be formed in the shape of a semicircular cylinder, a semi-elliptical cylinder, a distorted circular cylinder, or a distorted semicircular cylinder. The distorted circular cylinder and the distorted semicircular cylinder refer to a circular cylinder and a semicircular cylinder having a non-uniform diameter.

The lens 100 includes one reflective member 450. The reflective member 450 may be formed in a conical shape as illustrated in FIG. 12 or in a cylindrical shape in which a base close to a user's eye E is smaller than the other base as illustrated in FIG. 13. In this case, an image of the flexible display device 200 can be reflected to the user's eye E by any part of the side surface of the cylindrical lens 100.

Figure 14A:
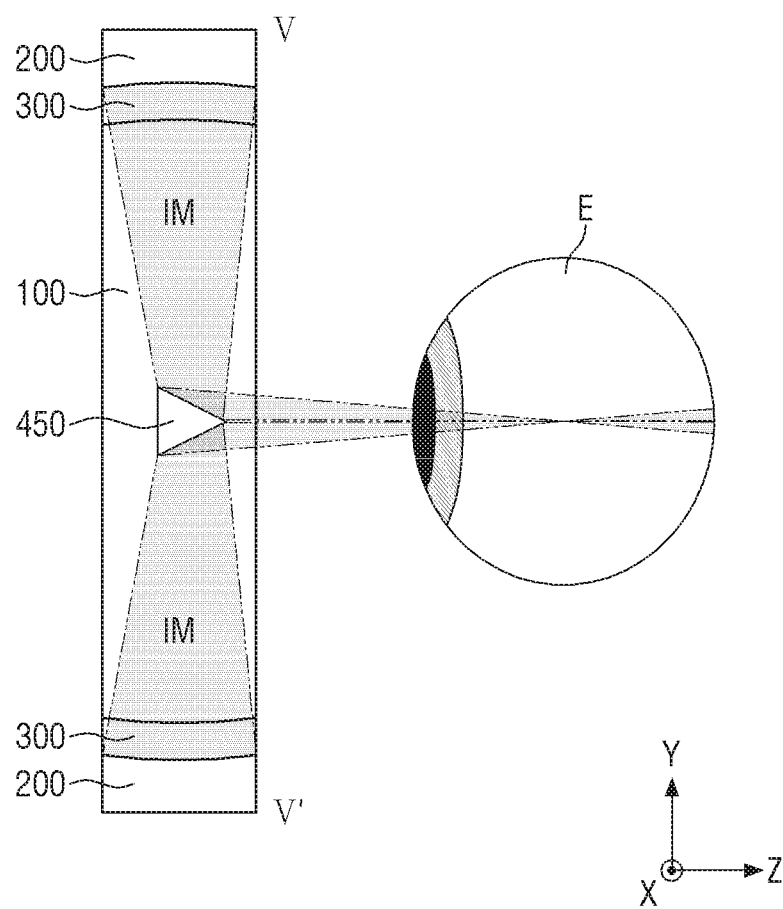
FIG. 14A illustrates an example cross-sectional view taken along the line V-V' of FIG. 12.
Figure 14B:
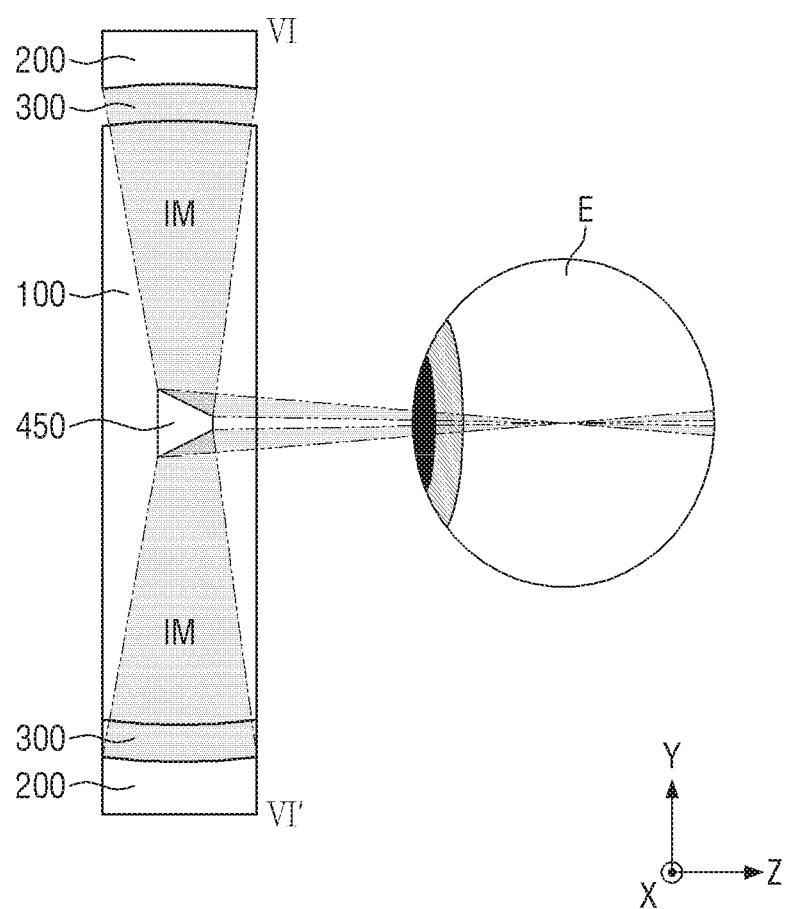
FIG. 14B illustrates an example cross-sectional view taken along the line VI-VI' of FIG. 13.
Figure 15A:
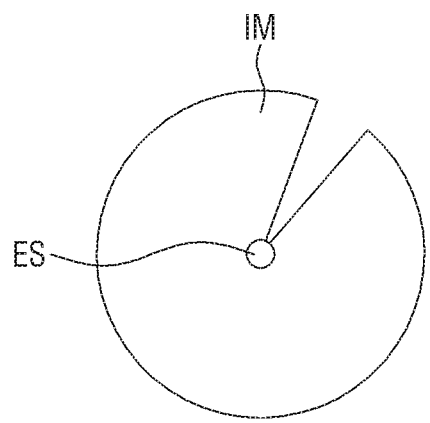
FIG. 15A illustrates an image provided to a user by the augmented reality providing device of FIG. 12.
Figure 15B:
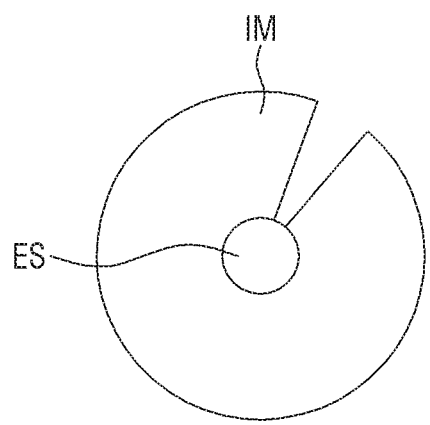
FIG. 15B illustrates an image provided to a user by the augmented reality providing device of FIG. 13.

Because a virtual image IM displayed on the flexible display device 200 is reflected by the reflective member 450, the depth of field is increased. Here, the reflective member 450 causes the virtual image IM displayed on the flexible display device 200 to be focused at one point on the retina of the user's eye E as illustrated in FIGS. 14A and 14B. Therefore, even if the user focuses on a real image through the lens 100, the virtual image IM can be clearly seen as illustrated in FIGS. 15A and 15B. That is, even if the user does not shift the focus on the real image, the virtual image IM can be clearly seen.

The flexible display device 200 may be curved to surround the side surface of the lens 100. The flexible display device 200 may display one image IM. In this case, the image IM reflected by the reflective member 450 and thus seen by the user may be circular as illustrated in FIGS. 15A and 15B. The image IM seen by the user may have an empty space ES at the center, and the size of the empty space ES is greater when the reflective member 450 is formed in a cylindrical shape than when the reflective member 450 is formed in a conical shape. Therefore, the reflective member 450 may be formed in a conical shape rather than a cylindrical shape.

A flexible circuit board 210 may be attached to an end of the flexible display device 200. Alternatively, the flexible circuit board 210 may be attached to the other end facing the end of the flexible display device 200. Alternatively, when there are many signal lines and voltage lines for driving the flexible display device 200, two flexible circuit boards 210 may be attached to the end and the other end (i.e., two opposing ends) of the flexible display device 200, respectively.

As described above, the lens 100 may be formed in a cylindrical shape, the flexible display device 200 may surround the side surface of the lens 100, and the image IM displayed on the flexible display device 200 may be provided to the user's eye E through the reflective member 450 in a conical or cylindrical shape. Therefore, in the embodiment illustrated in FIG. 12, an area visible to the user's eye E in the flexible display device 200 may be increased compared with the embodiment illustrated in FIG. 1. Thus, the user's FOV can be expanded.

Figure 16:
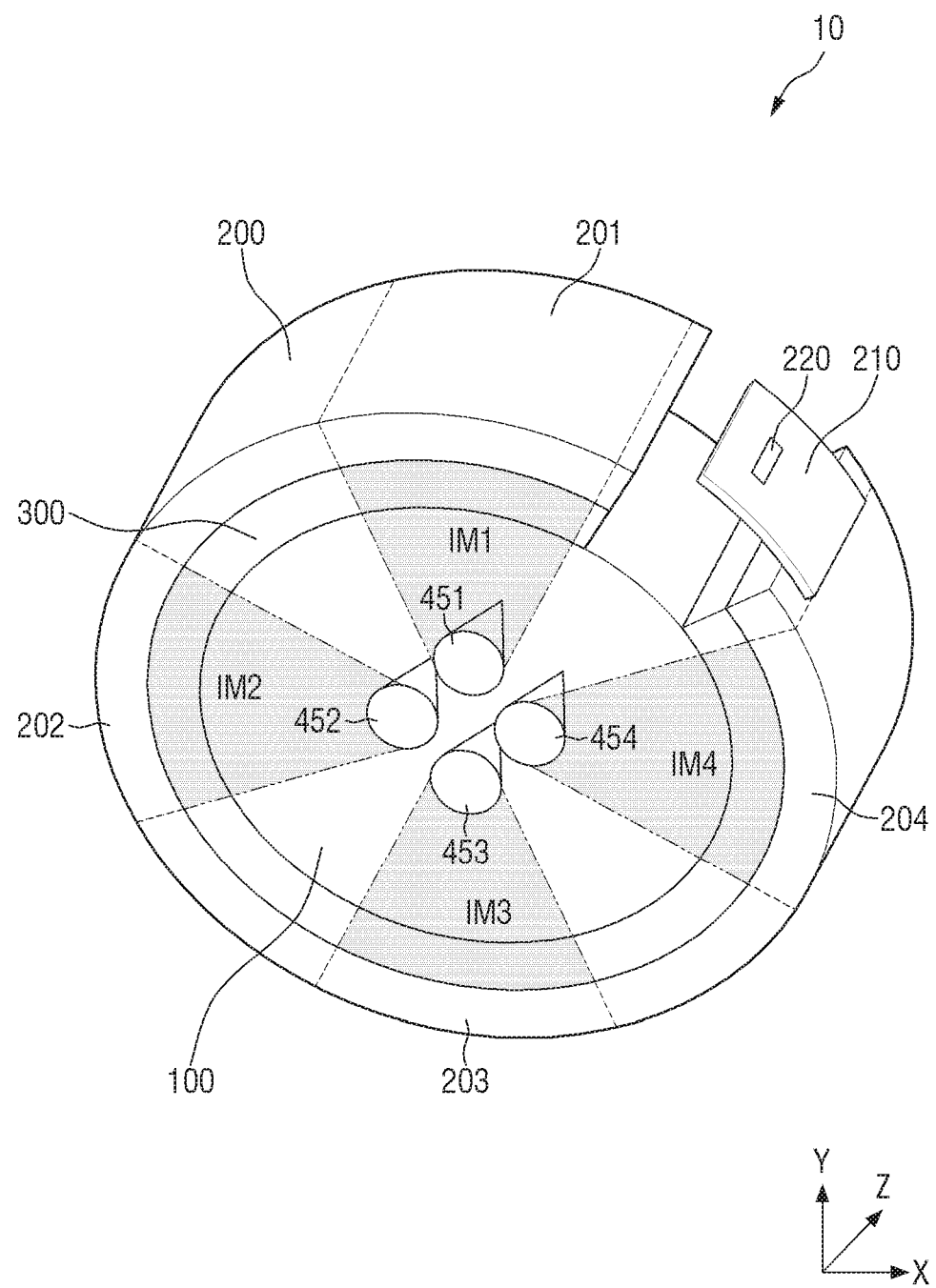
FIG. 16 is a perspective view of an augmented reality providing device according to an embodiment.

FIG. 16 is a perspective view of an augmented reality providing device 10 according to an embodiment.

The augmented reality providing device 10 illustrated in FIG. 16 includes a lens 100, a flexible display device 200, and an adhesive layer 300.

The embodiment shown in FIG. 16 is different from the embodiment shown in FIG. 1 in that the lens 100 is formed in the shape of an elliptical cylinder rather than a polyhedron, the flexible display device 200 surrounds a side surface of the lens 100, and the lens 100 includes reflective members having a conical or cylindrical shape. In FIG. 16, a description of elements and features identical or substantially similar to those of the embodiment shown in FIG. 1 may not be repeated.

Referring to FIG. 16, the lens 100 is formed in the shape of an elliptical cylinder having elliptical first and second surfaces and a side surface. However, the lens 100 may also be formed in various other suitable shapes. For example, the lens 100 may be formed in the shape of a circular cylinder having circular first and second surfaces and a side surface as illustrated in FIG. 12. Alternatively, the lens 100 may be formed in the shape of a semicircular cylinder, a semielliptical cylinder, a distorted circular cylinder, or a distorted semicircular cylinder. The distorted circular cylinder and the distorted semicircular cylinder refer to a circular cylinder and a semicircular cylinder having a non-uniform diameter.

When the lens 100 is formed in the shape of an elliptical cylinder as illustrated in FIG. 16, not all images displayed on the flexible display device 200 can be provided to a user's eye E utilizing one reflective member as illustrated in FIGS. 12 and 13. Therefore, a plurality of reflective members may be included in the lens 100. For example, the reflective members may include first through fourth reflective members 451 through 454. Each of the first through fourth reflective members 451 through 454 may be formed in a conical shape as illustrated in FIG. 16 or in a cylindrical shape in which a base close to the user's eye E is smaller than the other base as illustrated in FIG. 13.

The first reflective member 451 reflects a first image IM1 displayed on a first display area 201 of the flexible display device 200 to a first surface SF1 of the lens 100, thereby providing the first image IM1 to the user's eye E. The second reflective member 452 reflects a second image IM2 displayed on a second display area 202 of the flexible display device 200 to the first surface SF1 of the lens 100, thereby providing the second image IM2 to the user's eye E. The third reflective member 453 reflects a third image IM3 displayed on a third display area 203 of the flexible display device 200 to the first surface SF1 of the lens 100, thereby providing the third image IM3 to the user's eye E. The fourth reflective member 454 reflects a fourth image IM4 displayed on a fourth display area 204 of the flexible display device 200 to the first surface SF1 of the lens 100, thereby providing the fourth image IM4 to the user's eye E.

Figure 17:
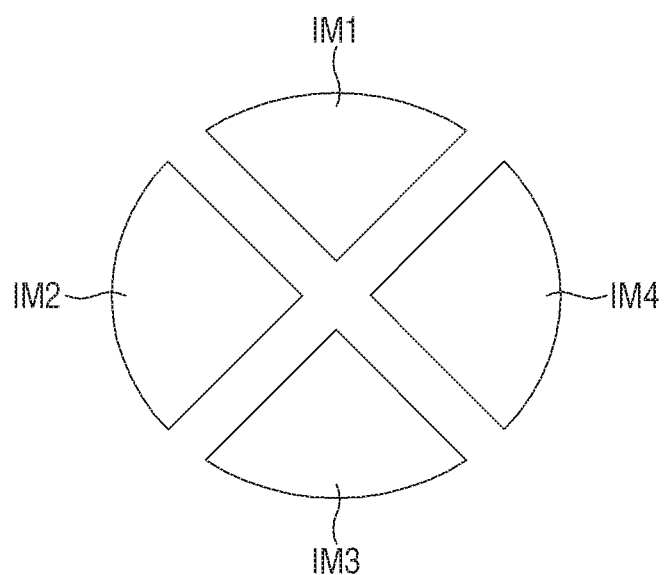
FIG. 17 illustrates images provided to a user by the augmented reality providing device of FIG. 16.

Because a virtual image, i.e., the first through fourth images IM1 through IM4 displayed on the flexible display device 200 are reflected by the first through fourth reflective members 451 through 454, the depth of field is deepened. Here, the first through fourth reflective members 451 through 454 cause the first through fourth images IM1 through IM4 displayed on the flexible display device 200 to be focused at one point on the retina of the user's eye E. Therefore, even if the user focuses on a real image through the lens 100, the first through fourth images IM1 through IM4 can be clearly seen as illustrated in FIG. 17. That is, even if the user does not shift the focus on the real image, the first through fourth images IM1 through IM4 can be clearly seen.

The flexible display device 200 may be curved to surround the side surface of the lens 100. The flexible display device 200 may be divided into the first through fourth display areas 201 through 204. In one embodiment, the first display area 201 may be an area in which the flexible display device 200 is curved with a first curvature, and the second display area 202 may be an area in which the flexible display device 200 is curved with a second curvature greater than the first curvature. The third display area 203 may be an area which faces the first display area 201 and in which the flexible display device 200 is curved with the first curvature. In addition, the fourth display area 204 may be an area which faces the second display area 202 and in which the flexible display device 200 is curved with the second curvature.

Each of the first through fourth images IM1 through IM4 reflected by the first through fourth reflective members 451 through 454 and thus seen by the user may have a fan shape as illustrated in FIG. 17. In FIG. 17, the first through fourth images IM1 through IM4 do not overlap each other. However, the present disclosure is not limited to this case. That is, by adjusting the distance between the first through fourth reflective members 451 through 454 and the inclined angle of each of the first through fourth reflective members 451 through 454, it is possible to make the first through fourth images IM1 through IM4 overlap each other.

A flexible circuit board 210 may be attached to an end of the fourth display area 204. Alternatively, the flexible circuit board 210 may be attached to an end of the first display area 201 which faces the end of the fourth display area 204. Alternatively, when there are many signal lines and voltage lines for driving the flexible display device 200, two flexible circuit boards 210 may be attached to the end of the first display area 201 and the end of the fourth display area 204, respectively.

As described above, the lens 100 may be formed in the shape of an elliptical cylinder, the flexible display device 200 may surround the side surface of the lens 100, and the first through fourth images IM1 through IM4 displayed on the first through fourth display areas 201 through 204 may be provided to the user's eye E through the first through fourth reflective members 451 through 454 in a conical or cylindrical shape. Therefore, in the embodiment illustrated in FIG. 16, an area visible to the user's eye E in the flexible display device 200 may be increased compared with the embodiment illustrated in FIG. 1. Thus, the user's FOV can be expanded.

Figure 18:
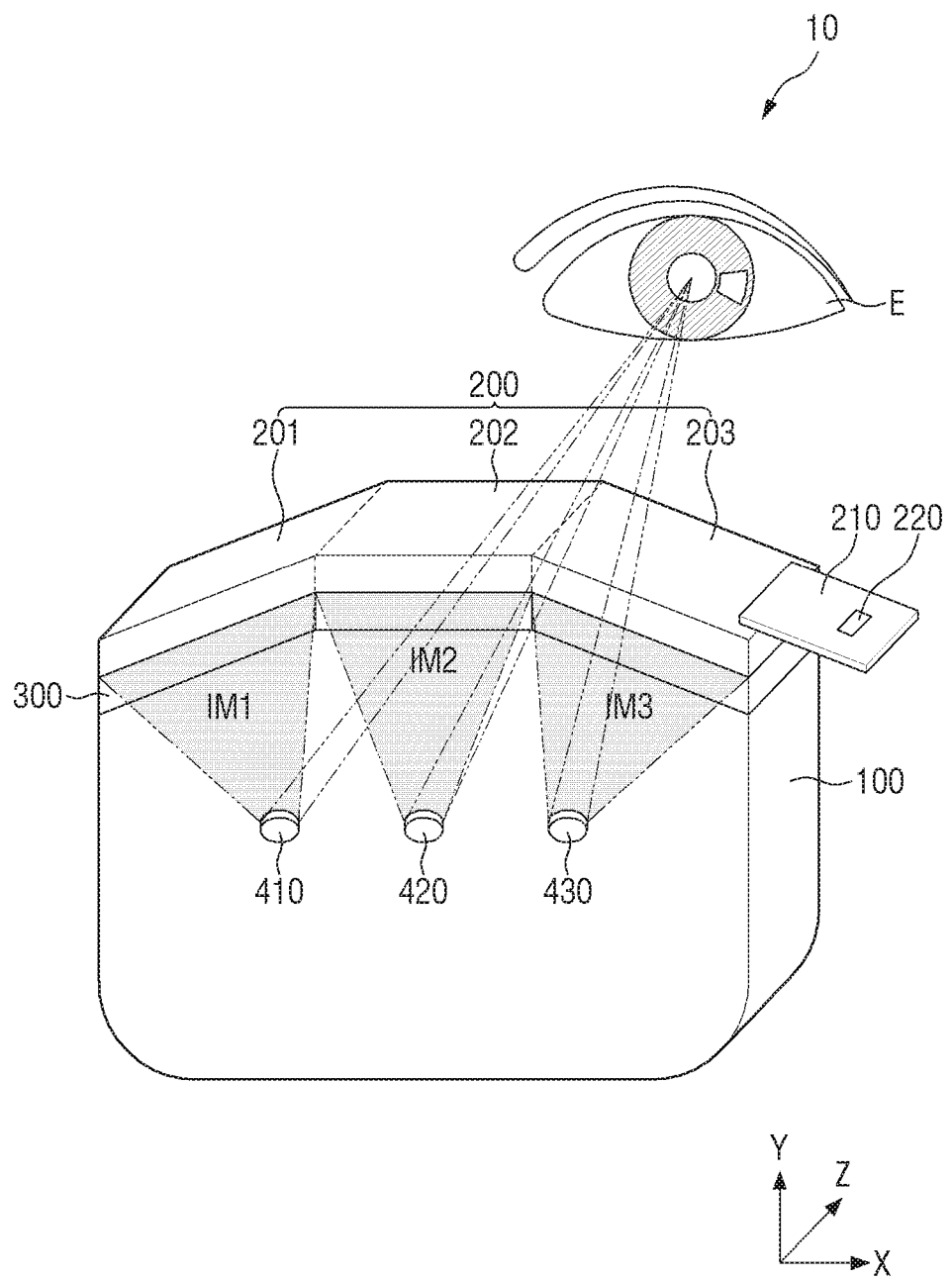
FIG. 18 is a perspective view of an augmented reality providing device according to an embodiment.

FIG. 18 is a perspective view of an augmented reality providing device 10 according to an embodiment.

The augmented reality providing device 10 illustrated in FIG. 18 includes a lens 100, a flexible display device 200, and an adhesive layer 300.

The embodiment shown in FIG. 18 is different from the embodiment shown in FIG. 1 in that the flexible display device 200 is disposed on first through third side surfaces SIF1 through SIF3 of the lens 100, and the lens 100 includes first through third reflective members 410 through 430 arranged side by side in the first direction (X-axis direction).

In FIG. 18, a description of elements and features identical or substantially similar to those of the embodiment shown in FIG. 1 may not be repeated.

Figure 19:
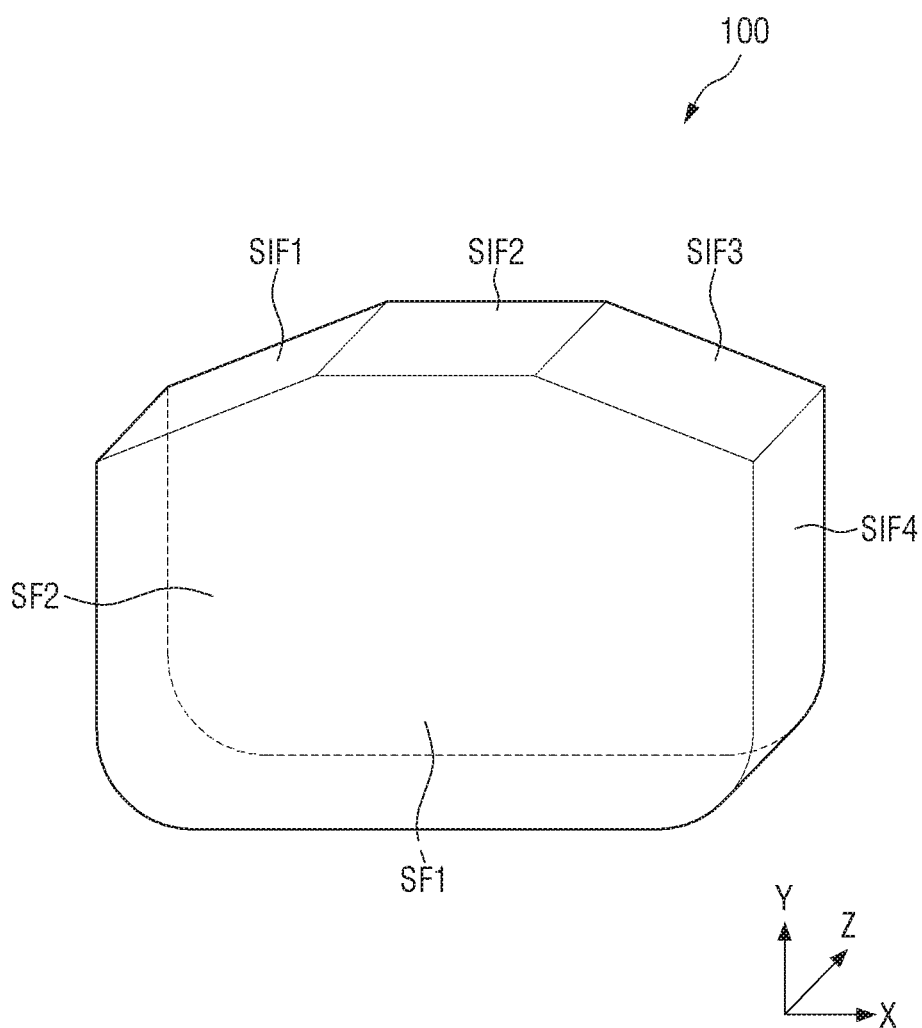
FIG. 19 is a perspective view illustrating a lens of FIG. 18 in more detail.

In one embodiment, as illustrated in FIG. 19, the lens 100 may include the first through third side surfaces SIF1 through SIF3 disposed on an upper side of the lens 100 and a fourth side surface SIF4 disposed on left, right and lower sides of the lens 100. The second side surface SIF2 may extend from an end of the first side surface SIF1, and the third side surface SIF3 may extend from an end of the second side surface SIF2. An angle formed by the first side surface SIF1 and the second side surface SIF2 and an angle formed by the second side surface SIF2 and the third side surface SIF3 may be obtuse angles. In addition, the angle formed by the first side surface SIF1 and the second side surface SIF2 may be substantially the same as the angle formed by the second side surface SIF2 and the third side surface angle SIF3. In FIG. 19, the left, right and lower sides of the lens 100 are formed in an elliptical shape to form one side surface SIF4. However, the present disclosure is not limited to this case. That is, the lens 100 may include a plurality of side surfaces in addition to the first through third side surfaces SIF1 through SIF3.

The lens 100 may include the first through third reflective members 410 through 430 arranged side by side in the first direction (X-axis direction). The first reflective member 410 may reflect a first image IM1 displayed on a first display area 201 of the flexible display device 200 to a first surface SF1 of the lens 100, thereby providing the first image IM1 to a user's eye E. The second reflective member 420 may reflect a second image IM2 displayed on a second display area 202 of the flexible display device 200 to the first surface SF1 of the lens 100, thereby providing the second image IM2 to the user's eye E. The third reflective member 430 may reflect a third image IM3 displayed on a third display area 203 of the flexible display device 200 to the third surface SF3 of the lens 100, thereby providing the third image IM3 to the user's eye E.

That is, because the first through third images IM1 through IM3 displayed on the flexible display device 200 are reflected by the first through third reflective members 410 through 430, the depth of field is increased. In addition, the first through third reflective members 410 through 430 cause a virtual image, e.g., the first through third images IM1 through IM3 displayed on the flexible display device 200 to be focused at one point on the retina of the user's eye E. Therefore, even if the user focuses on a real image through the lens 100, the virtual image can be clearly seen. That is, even if the user does not shift the focus on the real image, the virtual image can be clearly seen.

The flexible display device 200 may include the first display area 201 disposed on the first side surface SIF1, the second display area 202 disposed on the second side surface SIF2, and the third display area 203 disposed on the third side surface SIF3. The first display area 201 may extend from an end of the second display area 202, and the third display area 203 may extend from the other end of the second display area 202. The other end of the second display area 202 may be opposite to the end of the second display area 202.

The distance between the first reflective member 410 and the first display area 201 may be smaller than the distance between the second reflective member 402 and the second display area 202. The distance between the third reflective member 430 and the third display area 203 may be smaller than the distance between the second reflective member 402 and the second display area 202.

The first reflective member 410 is disposed closer to the first display area 201 than the second and third reflective members 420 and 430. The second reflective member 420 is disposed closer to the second display area 202 than the first and third reflective members 410 and 430. The third reflective member 430 is disposed closer to the third display area 203 than the first and second reflective members 410 and 420.

Figure 20:
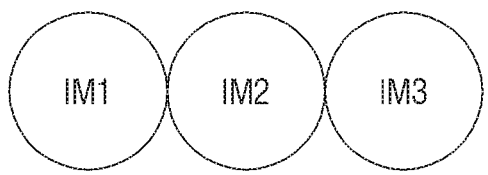
FIG. 20 illustrates images provided to a user by the augmented reality providing device of FIG. 18.

When the first through third reflective members 410 through 430 are arranged side by side in the first direction (X-axis direction) as illustrated in FIG. 18, the first through third images IM1 through IM3 seen by the user may be arranged side by side in the first direction (X-axis direction) as illustrated in FIG. 20. On the other hand, when the first through third reflective members 410 through 430 are arranged side by side in the second direction (Y-axis direction) as illustrated in FIGS. 21 and 22A, the first through third images IM1 through IM3 seen by the user may be arranged side by side in the second direction (Y-axis direction) as illustrated in FIG. 22B.

Figure 21:
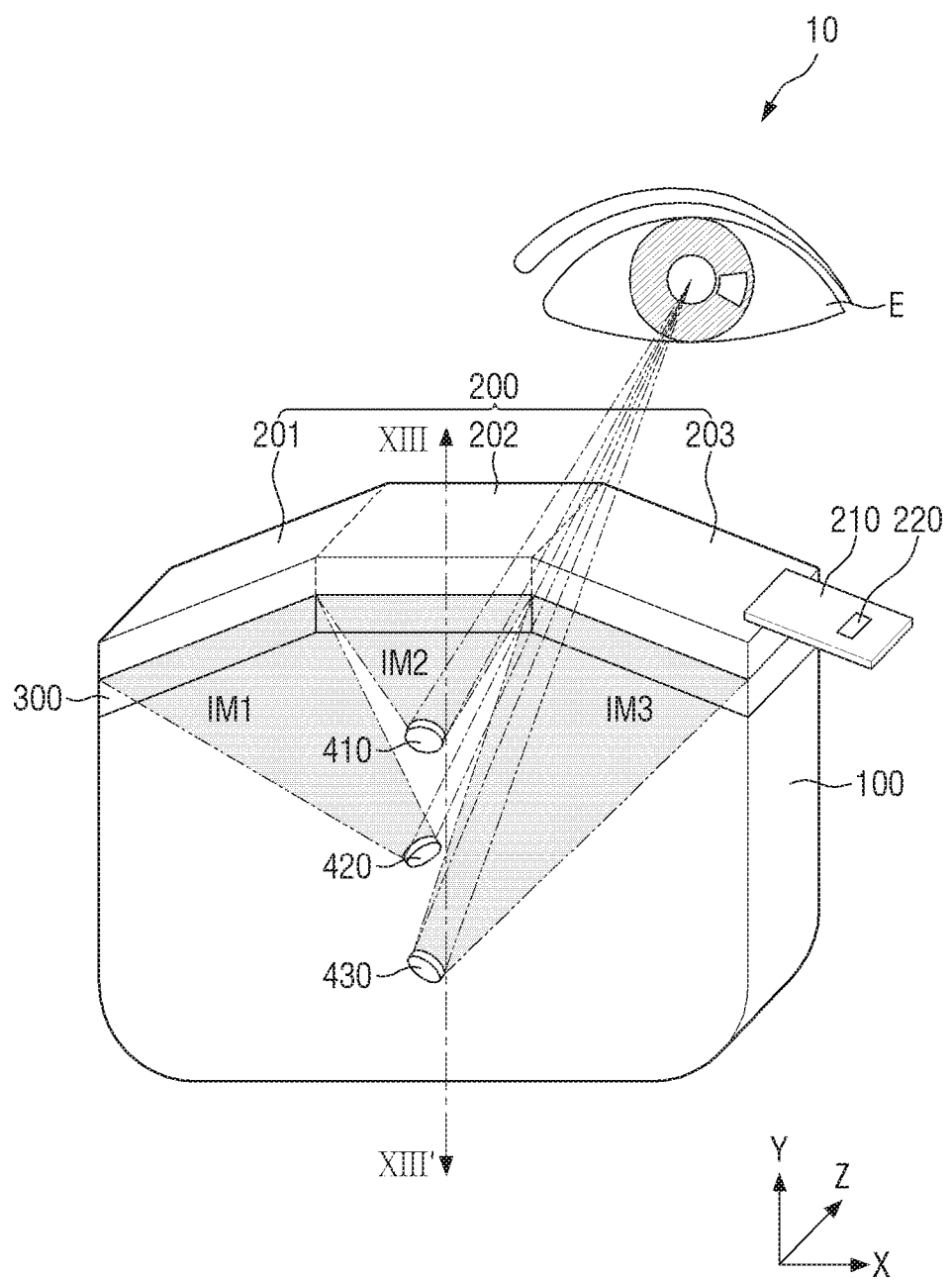
FIG. 21 is a perspective view of an augmented reality providing device according to an embodiment.
Figure 22A:
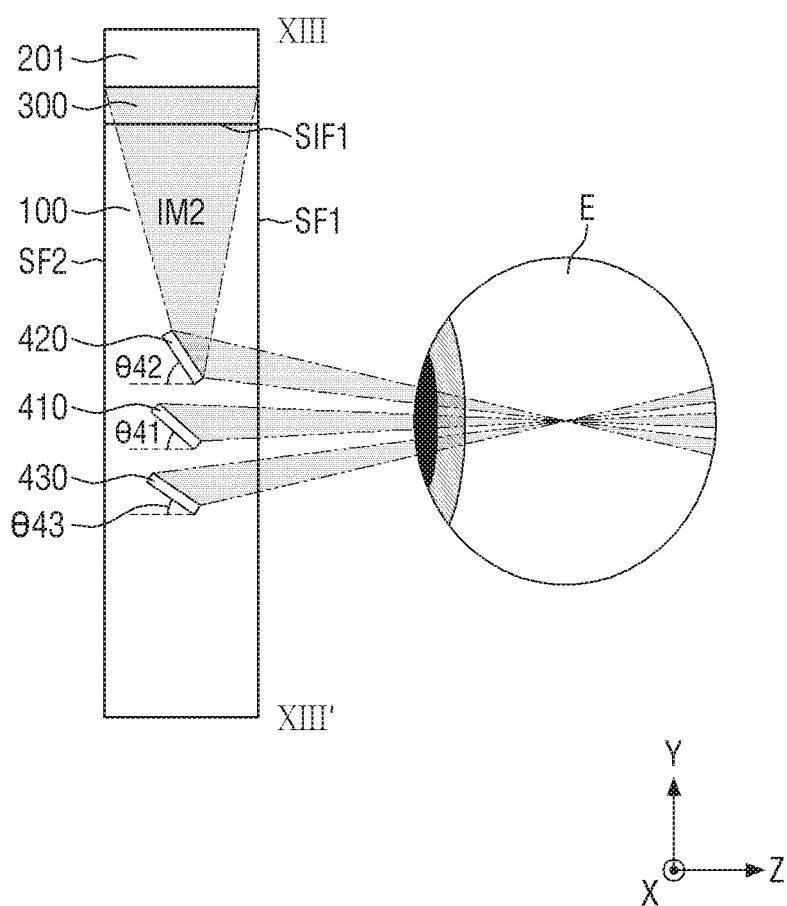
FIG. 22A illustrates an example cross-sectional view taken along the line XIII-XIII' of FIG. 21.
Figure 22B:
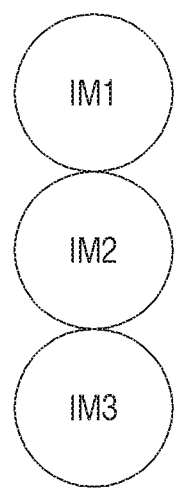
FIG. 22B illustrates images provided to a user by the augmented reality providing device of FIG. 21.

Here, as shown in FIG. 21, because the distance between the second reflective member 420 and the second display area 202 is smaller than the distance between the first reflective member 410 and the first display area 201, an inclined angle 842 of the second reflective member 420 may be larger than an inclined angle $\theta 41$ of the first reflective member 410 as illustrated in FIG. 22A. In addition, because the distance between the first reflective member 410 and the first display area 201 is smaller than the distance between the third reflective member 430 and the third display area 203, the inclined angle $\theta 41$ of the first reflective member 410 may be larger than an inclined angle $\theta 43$ of the third reflective member 430 as illustrated in FIG. 22A.

As described above, according to the embodiments illustrated in FIGS. 18 and 21, when the flexible display device 200 is bent and disposed on the first through third side surfaces SIF1 through SIF3 on one side of the lens 100, the positions of the first through third images IM1 through IM3 seen by the user can be adjusted according to the positions of the first through third reflective members 410 through 430.

Figure 23:
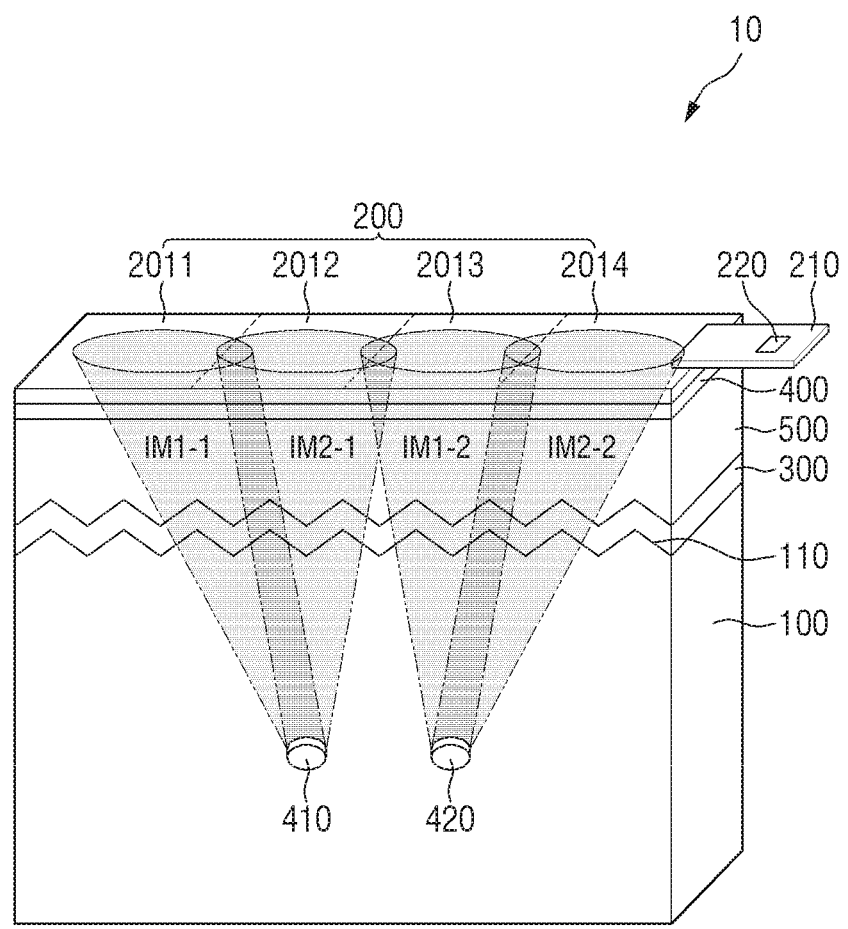
FIG. 23 is a perspective view of an augmented reality providing device according to an embodiment.

FIG. 23 is a perspective view of an augmented reality providing device 10 according to an embodiment.

The augmented reality providing device 10 illustrated in FIG. 23 includes a lens 100, a flexible display device 200, a first adhesive layer 300, a second adhesive layer 400, and a gap maintaining member 500.

The embodiment shown in FIG. 23 is different from the embodiment shown in FIG. 1 in that the second adhesive layer 400 and the gap maintaining member 500 are further provided, and a side surface of the lens 100 on which the flexible display device 200 is disposed has a light separation structure 110. In FIG. 23, a description of elements and features identical or substantially similar to those of the embodiment shown in FIG. 1 may not be repeated.

Figure 26:
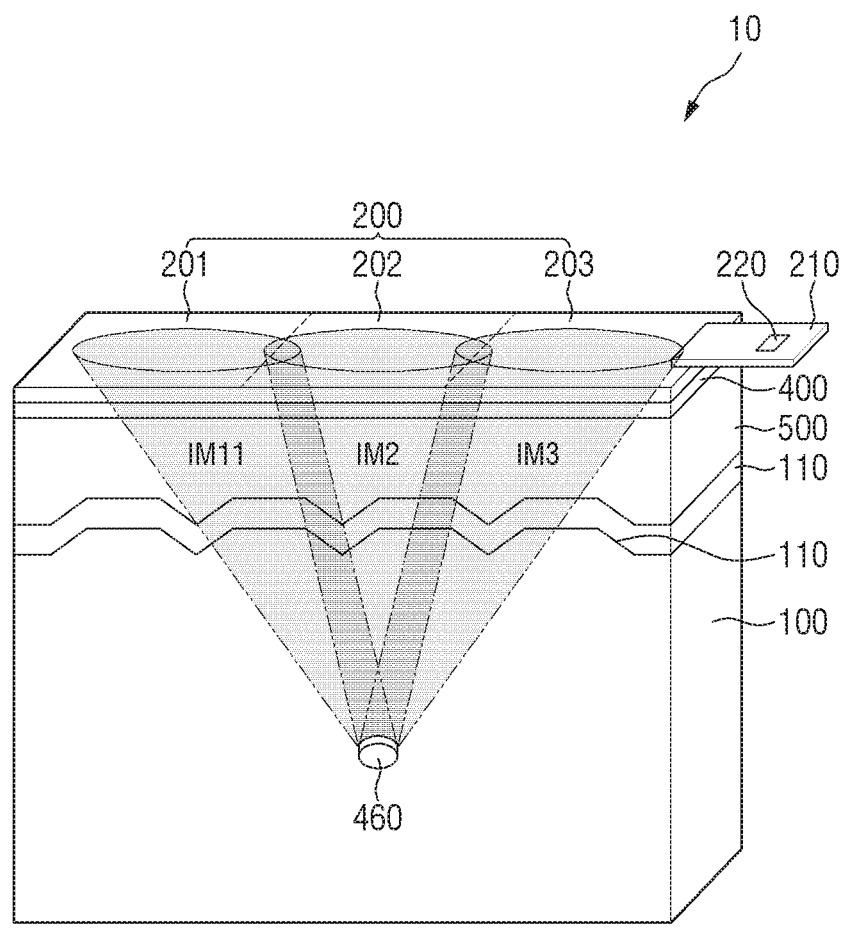
FIG. 26 is a perspective view of an augmented reality providing device according to an embodiment.

Referring to FIG. 23, the light separation structure 110 is formed at one side surface of the lens 100. The light separation structure 110 may be formed in the shape of triangular prisms, each having an isosceles triangular or equilateral triangular base as illustrated in FIG. 23. However, the shape of the light separation structure 110 is not limited to the above examples. For example, the light separation structure 110 may be formed in the shape of quadrangular prisms, each having a trapezoidal base as illustrated in FIG. 26.

Figure 24A:
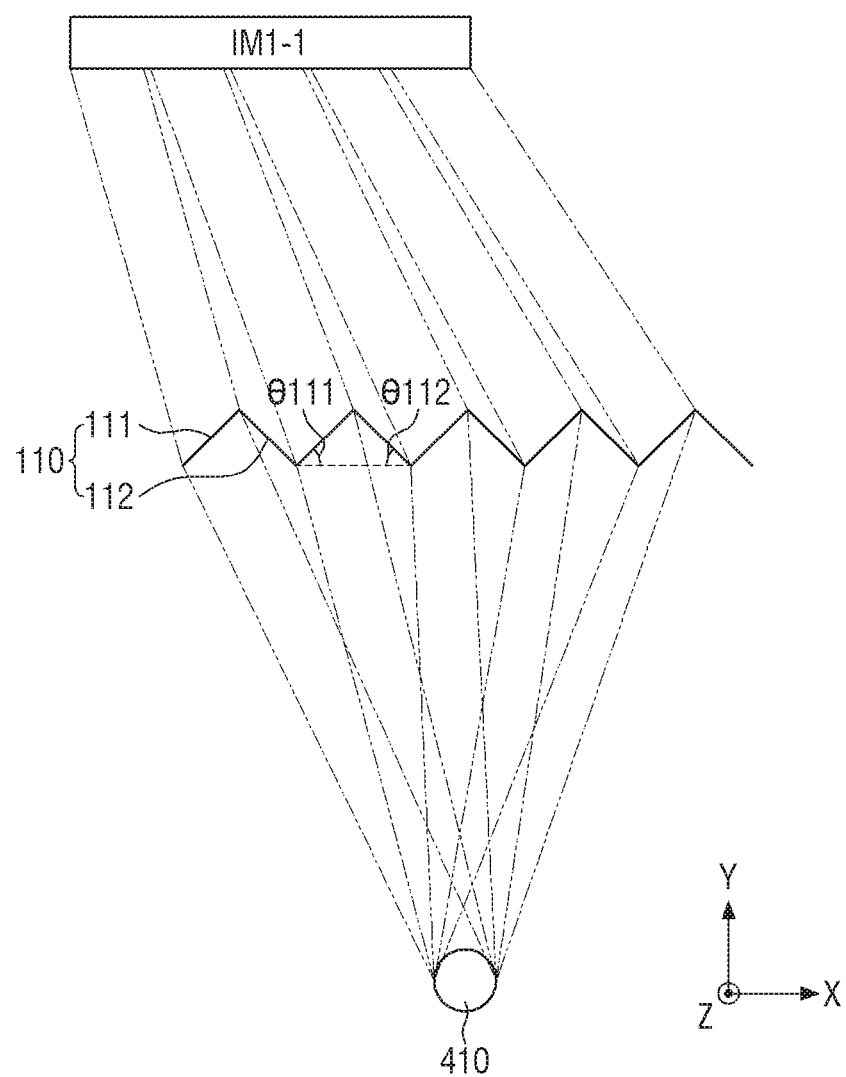
FIGS. 24A and 24B illustrate an example in which a $(1-1)^{th}$ image and a $(1-2)^{th}$ image are separated by a light separation structure of FIG. 23, respectively.
Figure 24B:
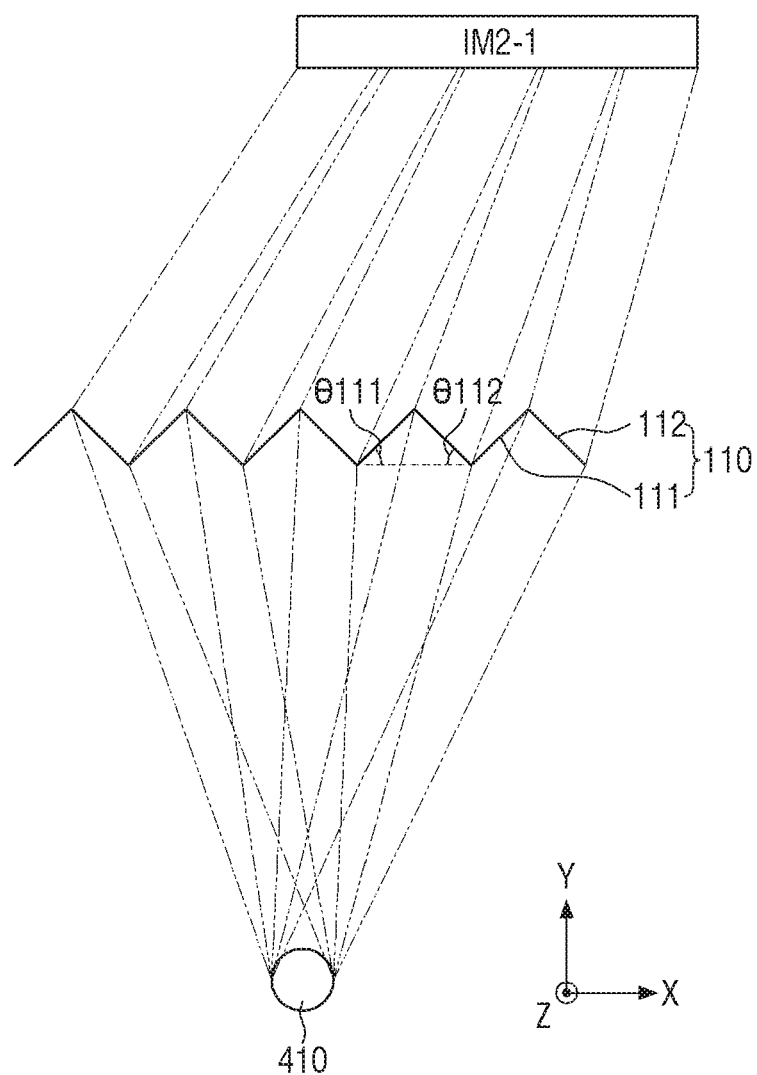

The light separation structure 110 may include first light separation surfaces 111 and second light separation surfaces 112 as illustrated in FIGS. 24A and 24B. The first light separation surfaces 111 may provide a $(1-1)^{th}$ image IM1-1 displayed on a $(1-1)^{th}$ display area 2011 of the flexible display device 200 to a first reflective member 410 as illustrated in FIG. 24A and provide a (1-2)th image IM1-2 displayed on a (1-3)th display area 2013 of the flexible display device 200 to the second reflective member 420. An inclined angle θ111 of each of the first light separation surfaces 111 may be set in consideration of the positions of the $(1-1)^{th}$ display area 2011, the $(1-3)^{th}$ display area 2013, the first reflective member 410 and the second reflective member 420 so that the $(1-1)^{th}$ image IM1-1 displayed on the $(1-1)^{th}$ display area 2011 of the flexible display device 200 is provided to the first reflective member 410 and the $(1-2)^{th}$ image IM1-2 displayed on the $(1-3)^{th}$ display area 2013 are provided to the second reflective member 420.

In addition, the second light separation surfaces 112 may provide the (2-1)th image IM2-1 displayed on the (1-2)th display area 2012 of the flexible display device 200 to the first reflective member 410 as illustrated in FIG. 24B, and provide the (2-2)th image IM2-2 displayed on the (1-4)th display area 2014 to the second reflective member 420. An inclined angle θ112 of each of the second light separation surfaces 112 may be set in consideration of the positions of the (1-2)th display area 2012, the (1-4)th display area 2014, the first reflective member 410, and the second reflective member 420 so that the (2-1)th image IM2-1 displayed on the (1-2)th display area 2012 of the flexible display device 200 is provided to the first reflective member 410 and the (2-2)th image IM2-2 displayed on the $(1-4)^{th}$ display area 2014 are provided to the second reflective member 420.

The inclined angle θ111 of each of the first light separation surfaces 111 and the inclined angle θ112 of each of the second light separation surfaces 112 may be substantially the same. The inclined angle θ111 of each of the first light separation surfaces 111 and the inclined angle θ112 of each of the second light separation surfaces 112 refer to angles of inclination in the second direction (Y-axis direction) with respect to the first direction (X-axis direction) as illustrated in FIGS. 24A and 24B.

The lens 100 may include the first and second reflective members 410 and 420 arranged side by side in the first direction (X-axis direction). The first reflective member 410 may reflect the (1-1)th image IM1-1 displayed on the (1-1)th display area 2011 and the (2-1)th image IM1-2 displayed on the (1-3)th display area 2013 of the flexible display device 200 to a first surface SF1 of the lens 100, thereby providing the (1-1)th image IM1-1 and the (1-2)th image IM1-2 to a user's eye E. The second reflective member 420 may reflect the (1-2)th image IM1-2 displayed on the $(1-3)^{th}$ display area 2013 of the flexible display device 200 and the $(2-2)^{th}$ image IM2-2 displayed on the $(1-4)^{th}$ display area 2014 to the first surface SF1 of the lens 100, thereby providing the $(1-2)^{th}$ image IM1-2 and the $(2-2)^{th}$ image IM2-2 to the user's eye E.

That is, because the $(1-1)^{th}$, $(1-2)^{th}$, $(2-1)^{th}$ and $(2-2)^{th}$ images IM1-1, IM1-2, IM2-1 and IM2-2 displayed on the flexible display device 200 are reflected by the first and second reflective members 410 and 420, the depth of field is increased. In addition, the first and second reflective members 410 and 420 cause a virtual image, e.g., the (1-1)th, (1-2)th, (2-1)th and (2-2)th images IM1-1, IM1-2, IM2-1 and IM2-2 displayed on the flexible display device 200 to be focused at one point on the retina of the user's eye E. Therefore, even if the user focuses on a real image through the lens 100, the virtual image can be clearly seen. That is, even if the user does not shift the focus on the real image, the virtual image can be clearly seen.

The flexible display device 200 may be disposed on one side surface of the lens 100 at which the light separation structure 110 is formed. The flexible display device 200 may include the $(1-1)^{th}$ display area 2011 which displays the $(1-1)^{th}$ image IM1-1, the $(1-2)^{th}$ display area 2012 which displays the $(2-1)^{th}$ image IM2-1, the $(1-3)^{th}$ display area 2013 which displays the $(1-2)^{th}$ image IM1-2, and the $(1-4)^{th}$ display area 2014 which displays the $(2-2)^{th}$ image IM2-2. The $(1-2)^{th}$ display area 2012 may be disposed between the $(1-1)^{th}$ display area 2011 and the $(1-3)^{th}$ display area 2013, and the $(1-3)^{th}$ display area 2013 may be disposed between the $(1-2)^{th}$ display area 2012 and the $(1-4)^{th}$ display area 2014.

The flexible display device 200 may simultaneously or concurrently display the $(1-1)^{th}$ image IM1-1 on the $(1-1)^{th}$ display area 2011, the $(2-1)^{th}$ image IM2-1 on the $(1-2)^{th}$ display area 2012, the $(1-2)^{th}$ image IM1-2 on the $(1-3)^{th}$ display area 2013, and the $(2-2)^{th}$ image IM1-4 on the $(1-4)^{th}$ display area 2014. In this case, as illustrated in FIG. 23, the user can see an image in which the $(1-1)^{th}$ image IM1-1 displayed on the $(1-1)^{th}$ display area 2011 and the $(2-1)^{th}$ image IM2-1 displayed on the $(1-2)^{th}$ display area 2012 are superimposed on each other and an image in which the $(1-2)^{th}$ image IM1-2 displayed on the $(1-3)^{th}$ display area 2013 and the $(2-2)^{th}$ image IM2-2 displayed on the $(1-4)^{th}$ display area 2014 are superimposed on each other.

Figure 25A:
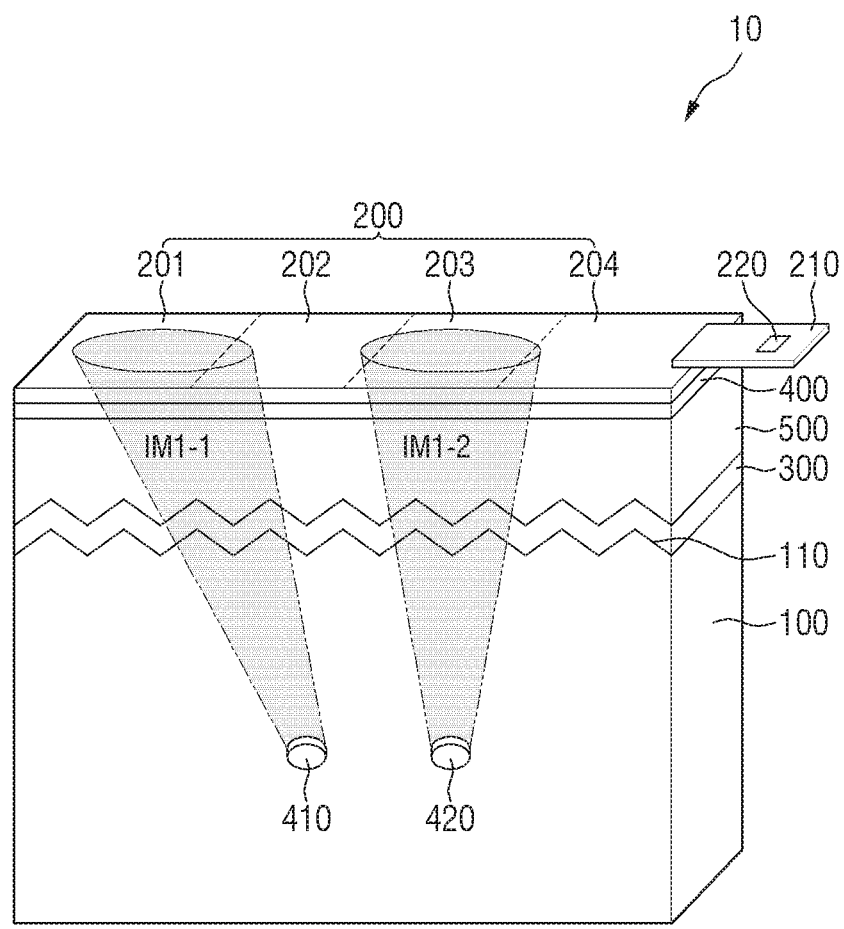
FIGS. 25A and 25B are perspective views illustrating images displayed on a display device of the augmented reality providing device of FIG. 23 during first and second periods, respectively.
Figure 25B:
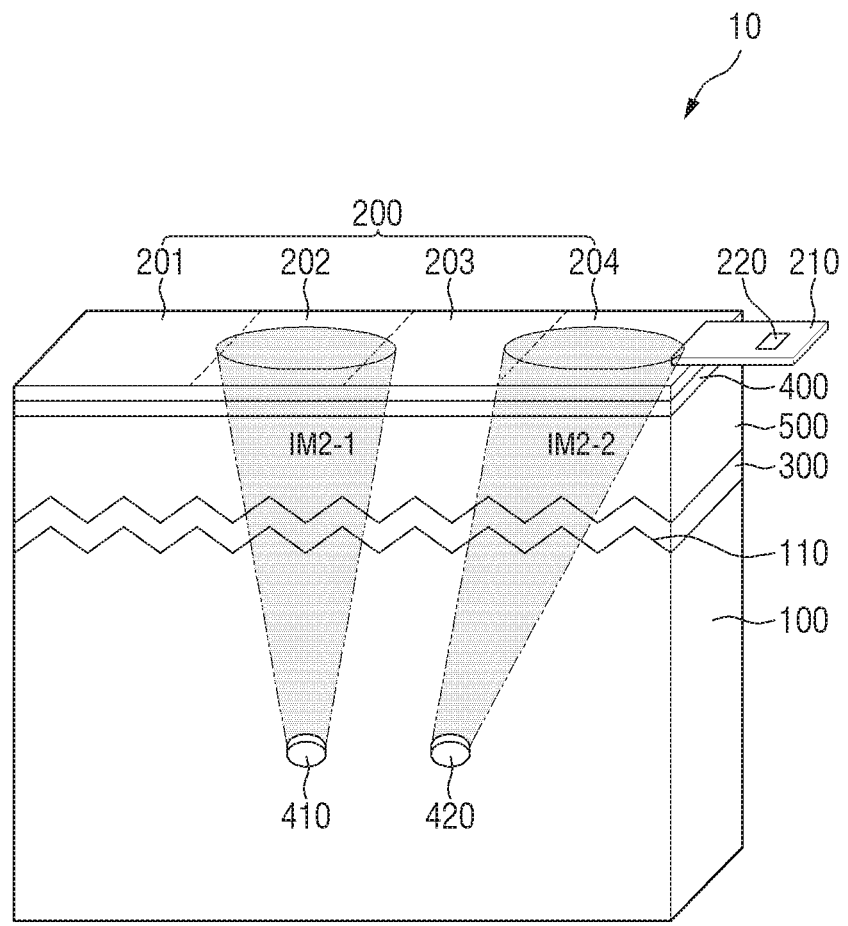

Alternatively, the flexible display device 200 may display the $(1-1)^{th}$ image IM1-1 on the $(1-1)^{th}$ display area 2011 and the $(1-2)^{th}$ image IM1-2 on the $(1-3)^{th}$ display area 2013 during a first period (i.e., time period) as illustrated in FIG. 25A. In addition, the flexible display device 200 may display the (2-1)th image IM2-1 on the (1-2)th display area 2012 and the (2-2)th image IM2-2 on the (1-4)th display area 2014 during a second period as illustrated in FIG. 25B. In this case, the user can see the (1-1)th image IM1-1 displayed on the $(1-1)^{th}$ display area 2011 and the (1-2)th image IM1-2 displayed on the (1-3)th display area 2013 during the first period as illustrated in FIG. 25A. In addition, the user can see the (2-1)th image IM2-1 displayed on the (1-2)th display area 2012 and the (2-2)th image IM2-2 displayed on the (1-4)th display area 2014 during the second period as illustrated in FIG. 25B.

A flexible circuit board 210 may be attached to an end of the $(1-4)^{th}$ display area 2014. Alternatively, the flexible circuit board 210 may be attached to an end of the $(1-1)^{th}$ display area 2011. Alternatively, when there are many signal lines and voltage lines for driving the flexible display device 200, two flexible circuit boards 210 may be attached to the end of the $(1-1)^{th}$ display area 2011 and the end of the $(1-4)^{th}$ display area 2014, respectively.

The gap maintaining member 500 is designed to maintain a gap between the light separation structure 110 of the lens 100 and the flexible display device 200, so that the $(1-1)^{th}$ image IM1-1 and the $(2-1)^{th}$ image IM2-1 provided to the first reflective member 410 are separated by the light separation structure 110, and the $(1-2)^{th}$ image IM1-2 and the $(2-2)^{th}$ image IM2-2 provided to the second reflective member 420 are separated by the light separation structure 110. The gap maintaining member 500 may be made of the same material as the lens 100, for example, may be made of glass or plastic.

The first adhesive layer 300 bonds the lens 100 and the gap maintaining member 500 together. The second adhesive layer 400 bonds the gap maintaining member 500 and the flexible display device 200 together. Each of the first adhesive layer 300 and the second adhesive layer 400 may be an OCR or an OCA film.

As described above, due to the light separation structure 110 formed at one side surface of the lens 100, the $(1-1)^{th}$ image IM1-1 displayed on the $(1-1)^{th}$ display area 2011 of the flexible display device 200 and the $(2-1)^{th}$ image IM2-1 displayed on the $(1-2)^{th}$ display area 2012 may be reflected by the first reflective member 410 to the user's eye E, and the $(1-2)^{th}$ image IM1-2 displayed on the $(1-3)^{th}$ display area 2013 and the $(2-2)^{th}$ image IM2-2 displayed on the $(1-4)^{th}$ display area 2014 may be reflected by the second reflective member 420 to the user's eye E. Therefore, according to the embodiment illustrated in FIG. 23, an area visible to the user's eye E in the flexible display device 200 can be increased, thereby expanding the user's FOV.

FIG. 26 is a perspective view of an augmented reality providing device 10 according to an embodiment.

The augmented reality providing device 10 illustrated in FIG. 26 includes a lens 100, a flexible display device 200, a first adhesive layer 300, a second adhesive layer 400, and a gap maintaining member 500.

The embodiment shown in FIG. 26 is different from the embodiment shown in FIG. 23 in that a light separation structure 110 formed at one side surface of the lens 100 is in the shape of quadrangular prisms, each having a trapezoidal base. In FIG. 26, a description of elements and features identical or substantially similar to those of the embodiment shown in FIG. 23 may not be repeated.

Figure 27A:
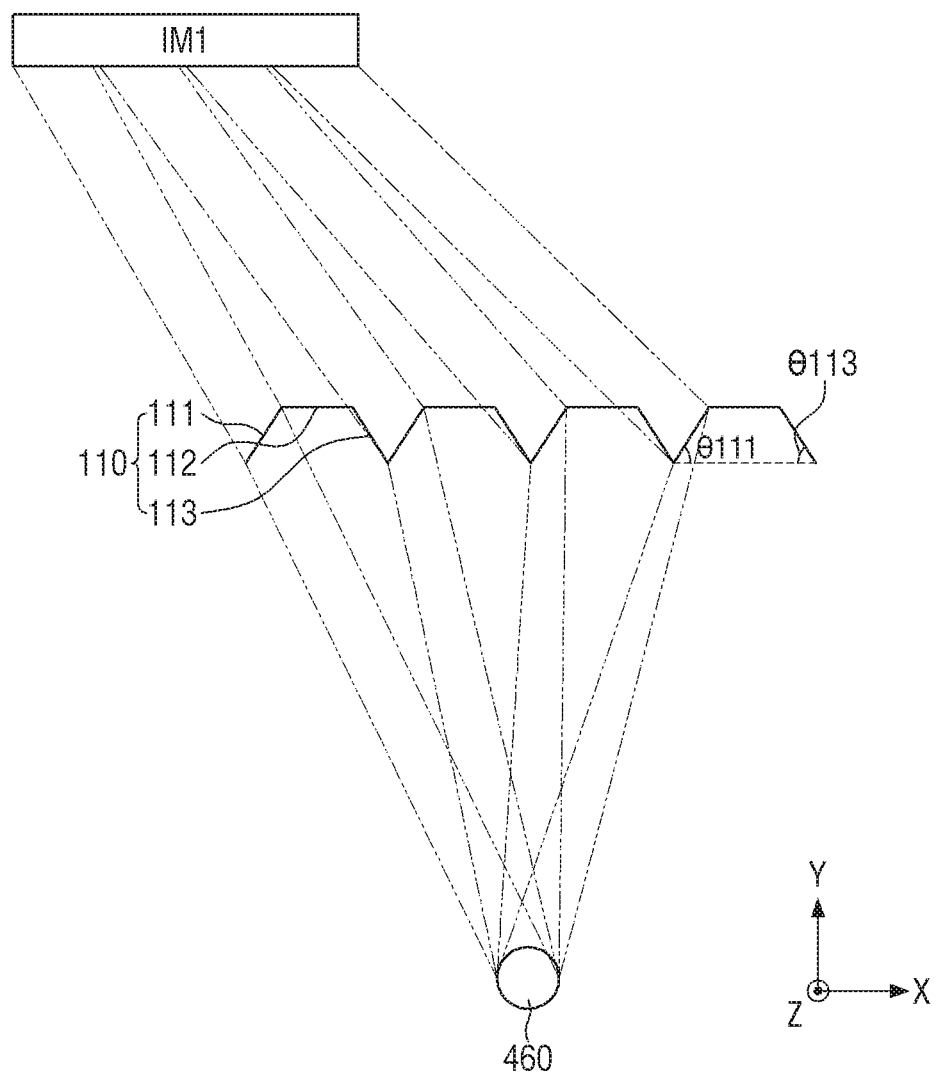
FIGS. 27A through 27C illustrate an example in which $(1-1)^{th}$ through $(1-3)^{th}$ images are separated by a light separation structure of FIG. 26, respectively.
Figure 27B:
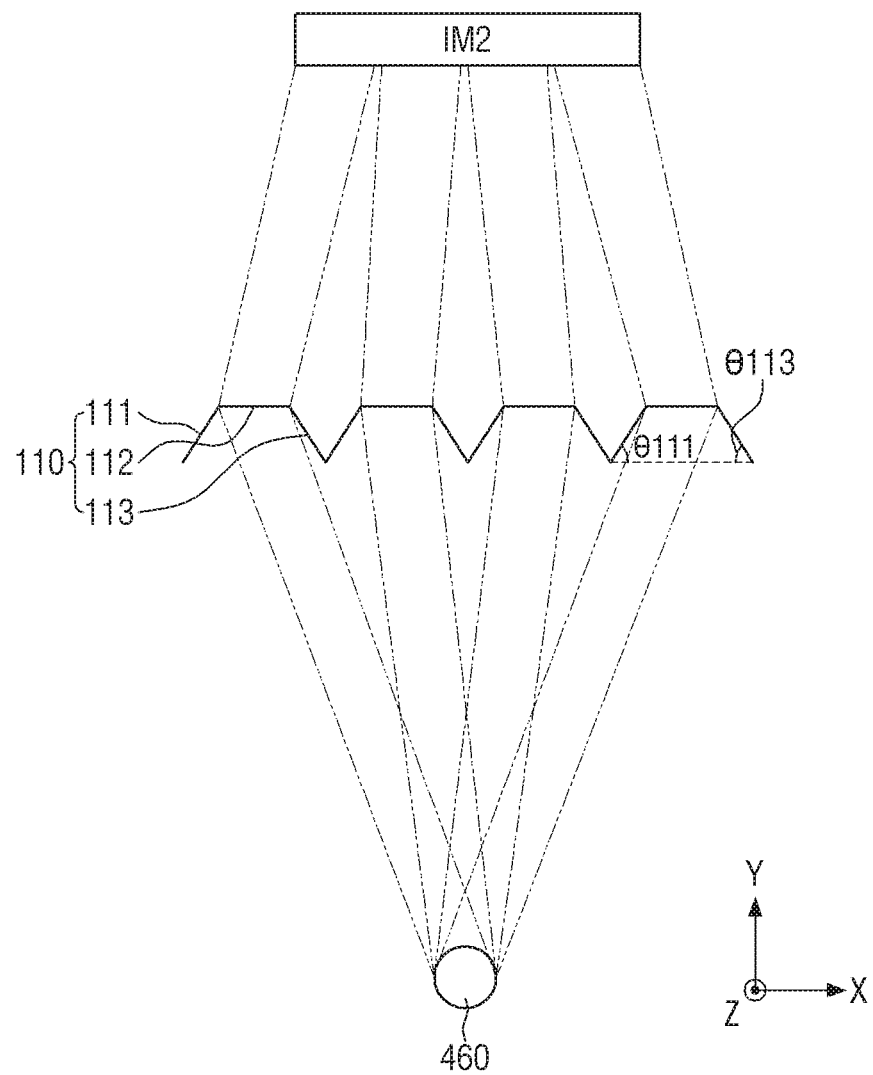
Figure 27C:
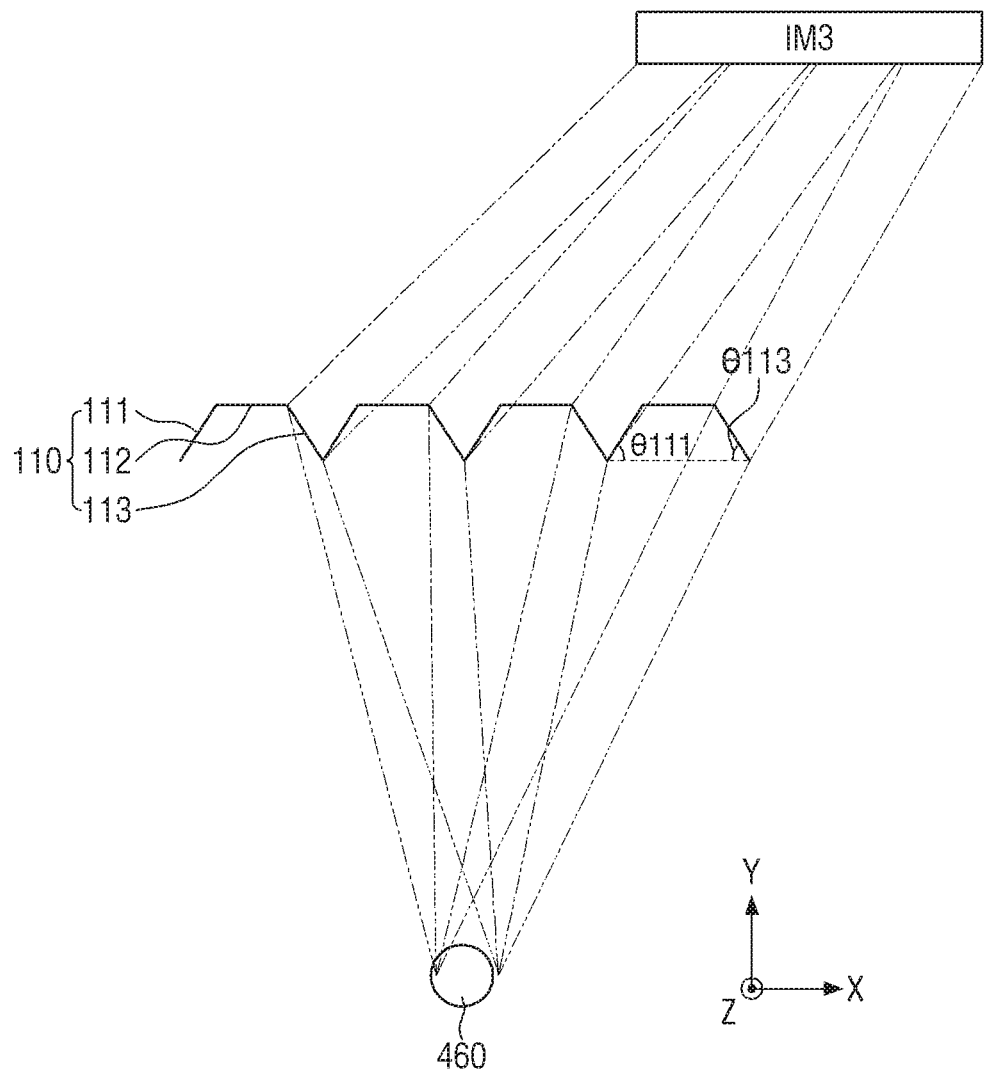

Referring to FIG. 26, the light separation structure 110 may include first through third light separation surfaces 111 through 113 as illustrated in FIGS. 27A through 27C. The first light separation surfaces 111 may provide a first image IM1 displayed on a first display area 201 of the flexible display device 200 to a reflective member 460 as illustrated in FIG. 27A. The second light separation surfaces 112 may provide a second image IM2 displayed on a second display area 202 to the reflective member 460 as illustrated in FIG. 27B. The third light separation surfaces 113 may provide a third image IM3 displayed on a third display area 203 to the reflective member 460 as illustrated in FIG. 27C.

An inclined angle θ111 of each of the first light separation surfaces 111 may be set in consideration of the positions of the first display area 201 and the reflective member 460 so that the first image IM1 displayed on the first display area 201 is provided to the reflective member 460. An inclined angle θ113 of each of the third light separation surfaces 113 may be set in consideration of the positions of the third display area 203 and the reflective member 460 so that the third image IM3 displayed on the third display area 203 is provided to the reflective member 460. In FIG. 27B, the second light separation surfaces 112 are formed side by side in the first direction (X-axis direction) without being inclined. However, the second light separation surfaces 112 may also be inclined in consideration of the positions of the second display area 202 and the reflective member 460.

The inclined angle θ111 of each of the first light separation surfaces 111 and the inclined angle θ113 of each of the third light separation surfaces 113 may be substantially the same. The inclined angle θ111 of each of the first light separation surfaces 111 and the inclined angle θ113 of each of the third light separation surfaces 113 refer to angles of inclination in the second direction (Y-axis direction) with respect to the first direction (X-axis direction) as illustrated in FIGS. 27A through 27C.

In FIG. 26, the lens 100 includes one reflective member 460. However, the present disclosure is not limited to this case. The lens 100 may also include a plurality of reflective members 460. The reflective member 460 may reflect the first image IM1 displayed on the first display area 201, the second image IM2 displayed on the second display area 202, and the third image IM3 displayed on the third display area 203 to a first surface SF1 of the lens 100, thereby providing the first image IM1, the second image IM2 and the third image IM3 to a user's eye E.

That is, because the first, second and third images IM1, IM2 and IM3 displayed on the flexible display device 200 are reflected by the reflective member 460, the depth of field is increased. In addition, the reflective member 460 causes a virtual image, e.g., the first, second and third images IM1, IM2 and IM3 displayed on the flexible display device 200 to be focused at one point on the retina of the user's eye E. Therefore, even if the user focuses on a real image through the lens 100, the virtual image can be clearly seen. That is, even if the user does not shift the focus on the real image, the virtual image can be clearly seen.

The flexible display device 200 may be disposed on one side surface of the lens 100 at which the light separation structure 110 is formed. The flexible display device 200 may include the first display area 201 which displays the first image IM1, the second display area 202 which displays the second image IM2, and the third display area 203 which displays the third image IM3. The first display area 201 may extend from an end (e.g., a first end) of the second display area 202, and the third display area 203 may extend from the other end (e.g., a second end opposite to the first end) of the second display area 202.

The flexible display device 200 may simultaneously or concurrently display the first image IM1 on the first display area 201, the second image IM2 on the second display area 202, and the third image IM3 on the third display area 203. In this case, the user can see an image in which the first image IM1 displayed on the first display area 201, the second image IM2 displayed on the second display area 202 and the third image IM3 displayed on the third display area 203 are superimposed on each other as illustrated in FIG. 26.

Figure 28A:
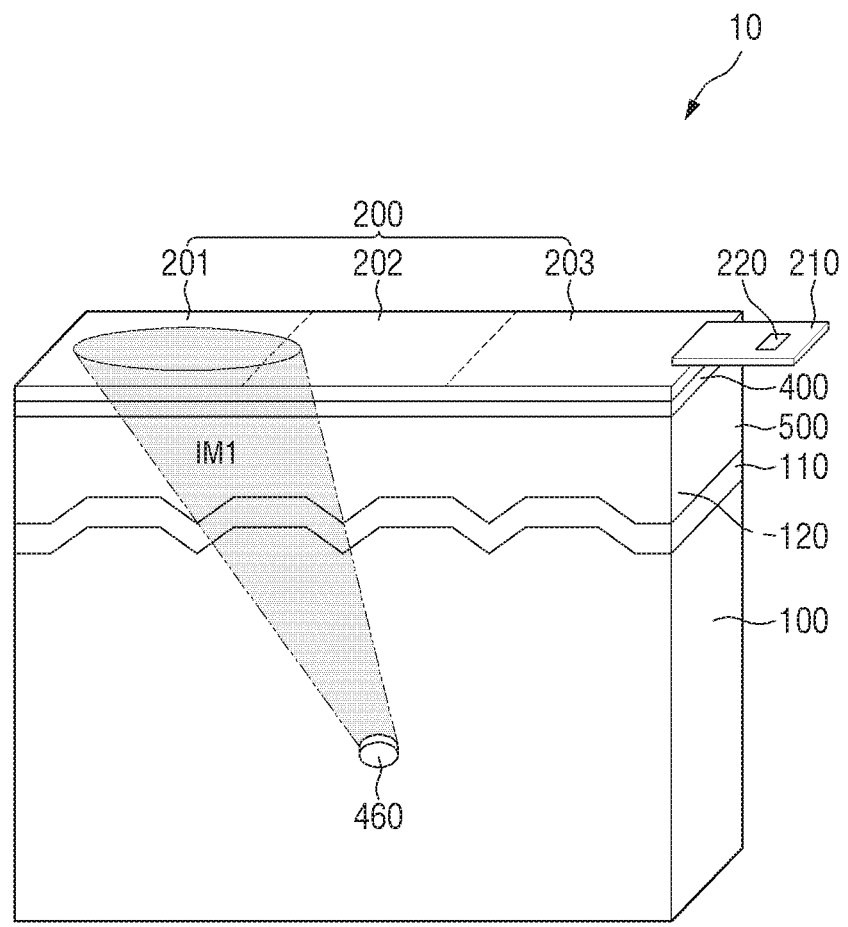
FIGS. 28A through 28C are perspective views illustrating images displayed on a display device of the augmented reality providing device of FIG. 26 during first through third periods, respectively.
Figure 28B:
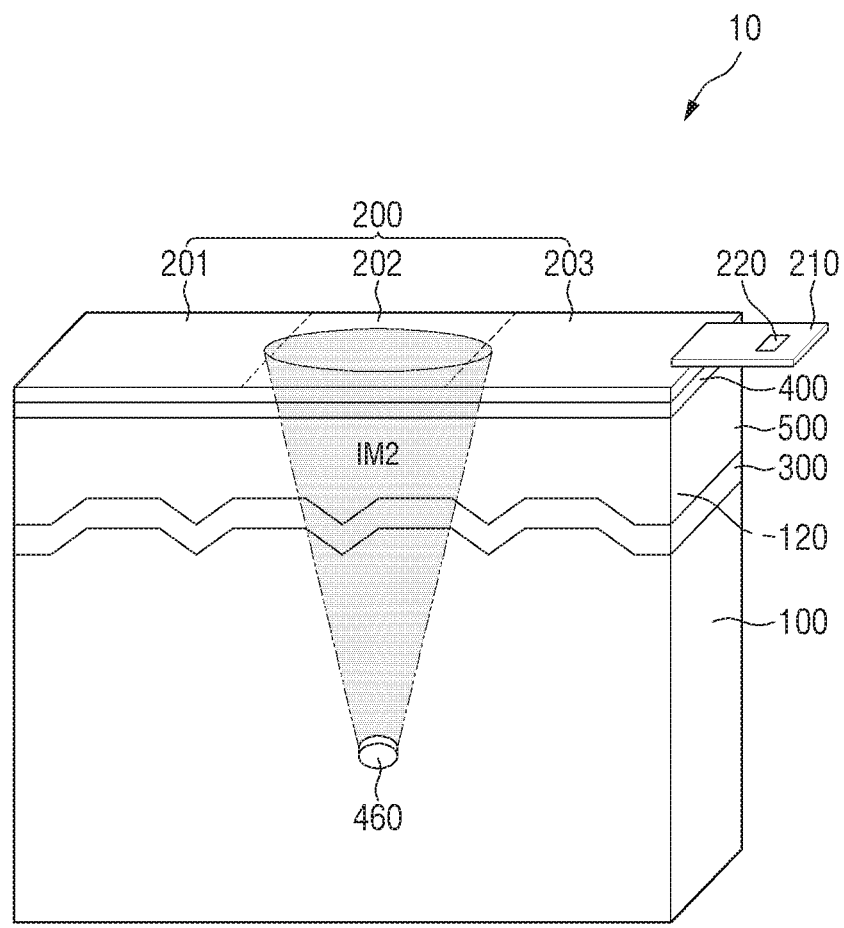
Figure 28C:
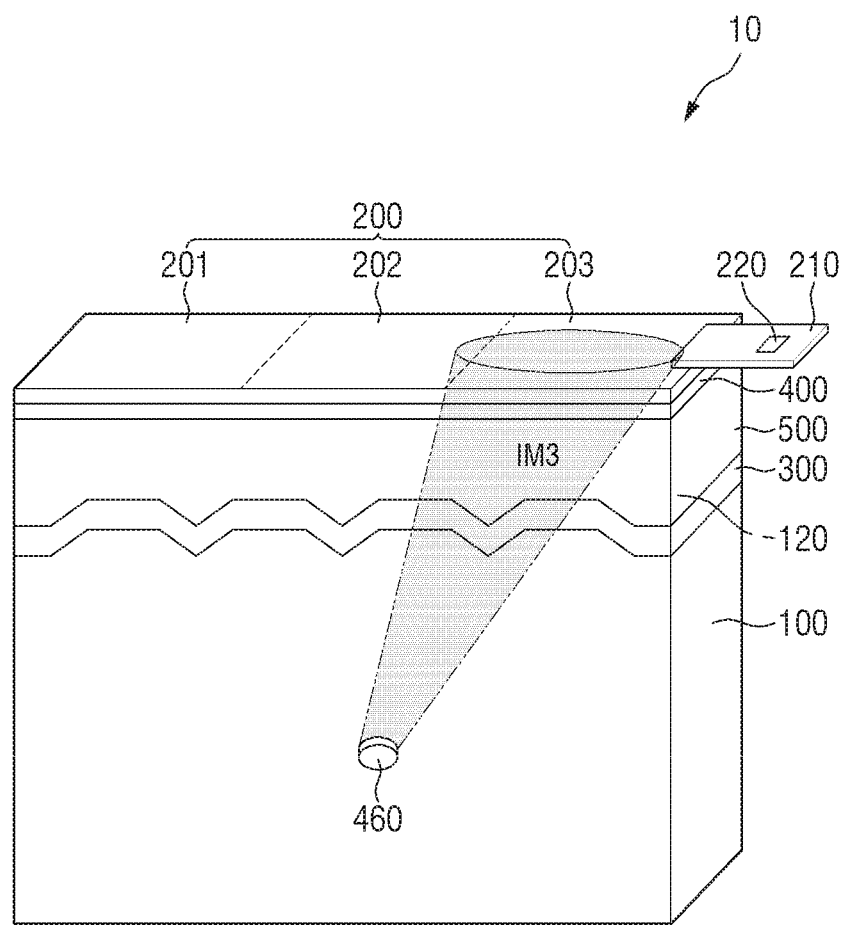

Alternatively, the flexible display device 200 may display the first image IM1 on the first display area 201 during a first period as illustrated in FIG. 28A, display the second image IM2 on the second display area 202 during a second period as illustrated in FIG. 28B, and display the third image IM3 on the third display area 203 during a third period as illustrated in FIG. 28C. In this case, the user can see the first image IM1 displayed on the first display area 201 during the first period as illustrated in FIG. 28A, see the second image IM2 displayed on the second display area 202 during the second period as illustrated in FIG. 28B, and see the third image IM3 displayed on the third display area 203 during the third period as illustrated in FIG. 28C.

A flexible circuit board 210 may be attached to an end of the third display area 203. Alternatively, the flexible circuit board 210 may be attached to an end of the first display area 201. Alternatively, when there are many signal lines and voltage lines for driving the flexible display device 200, two flexible circuit boards 210 may be attached to the end of the first display area 201 and the end of the third display area 203, respectively.

The gap maintaining member 500 is designed to maintain a gap between the light separation structure 110 of the lens 100 and the flexible display device 200, so that the first through third images IM1 through IM3 provided to the reflective member 460 are separated by the light separation structure 110. The gap maintaining member 500 may be made of the same material as the lens 100, for example, may be made of glass or plastic.

The first adhesive layer 300 bonds the lens 100 and the gap maintaining member 500 together. The second adhesive layer 400 bonds the gap maintaining member 500 and the flexible display device 200 together. Each of the first adhesive layer 300 and the second adhesive layer 400 may be an OCR or an OCA film.

As described above, due to the light separation structure 110 formed at one side surface of the lens 100, the first image IM1 displayed on the first display area 201 of the flexible display device 200, the second image IM2 displayed on the second display area 202, and the third image IM3 displayed on the third display are 203 may be reflected by the reflective member 460 to the user's eye E. Therefore, according to the embodiment illustrated in FIG. 26, an area visible to the user's eye E in the flexible display device 200 can be increased, thereby expanding the user's FOV.

Figure 29:
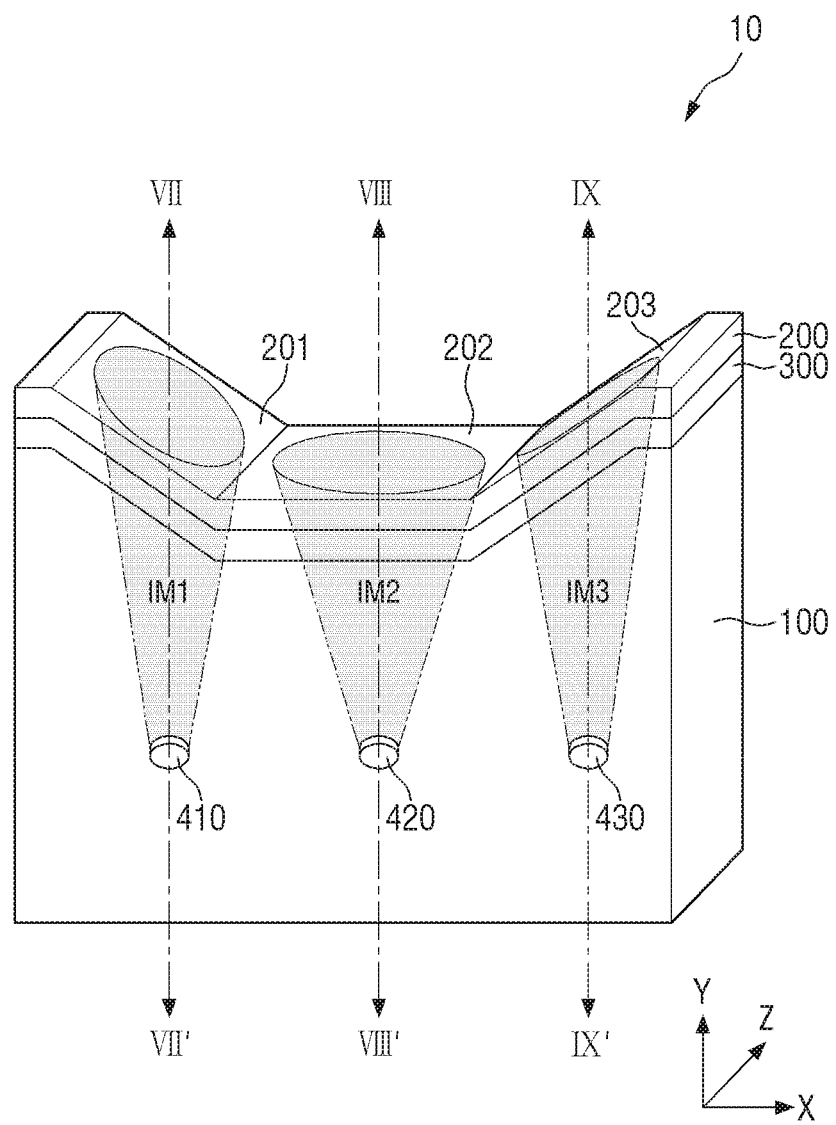
FIG. 29 is a perspective view of an augmented reality providing device according to an embodiment.

FIG. 29 is a perspective view of an augmented reality providing device 10 according to an embodiment.

The augmented reality providing device 10 illustrated in FIG. 29 is different from the embodiment shown in FIG. 18 in that a flexible display device 200 is disposed on first through third side surfaces SIF1 through SIF3 of a lens 100, the distance between the first side surface SIF1 and a first reflective member 410 is greater than the distance between the second side surface SIF2 and a second reflective member 420, and the distance between the third side surface SIF3 and a third reflective member 430 is greater than the distance between the second side surface SIF2 and the second reflective member 420. In FIG. 29, a description of elements and features identical or substantially similar to those of the embodiment shown in FIG. 18 may not be repeated.

Figure 30A:
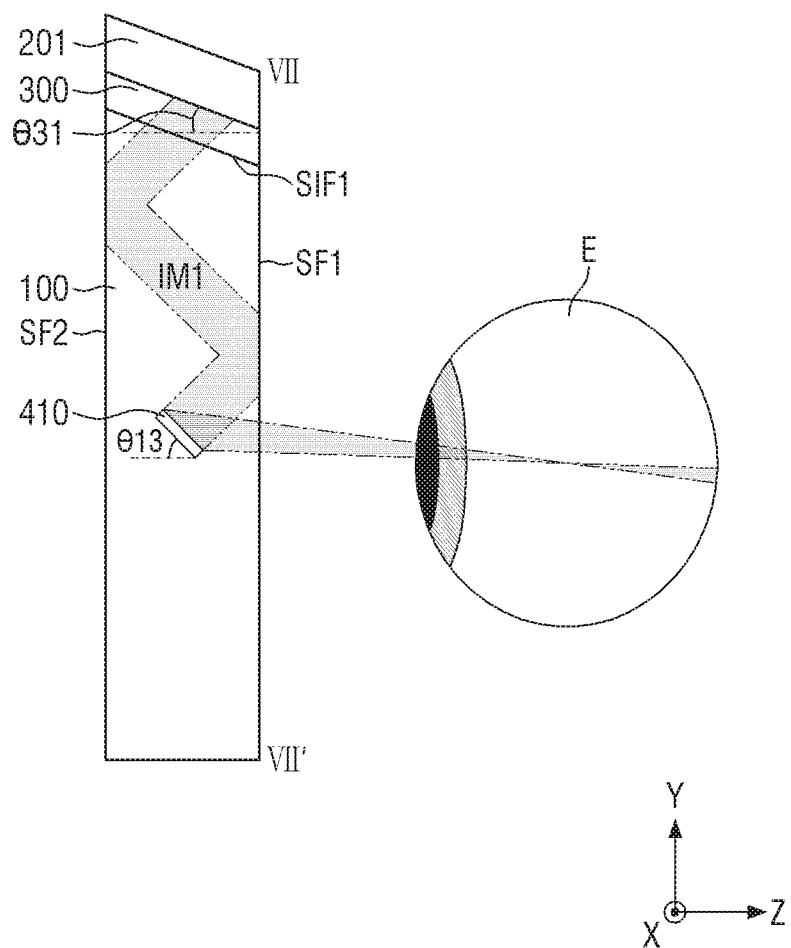
FIG. 30A illustrates an example cross-sectional view taken along the line VII-VII' of FIG. 29.
Figure 30B:
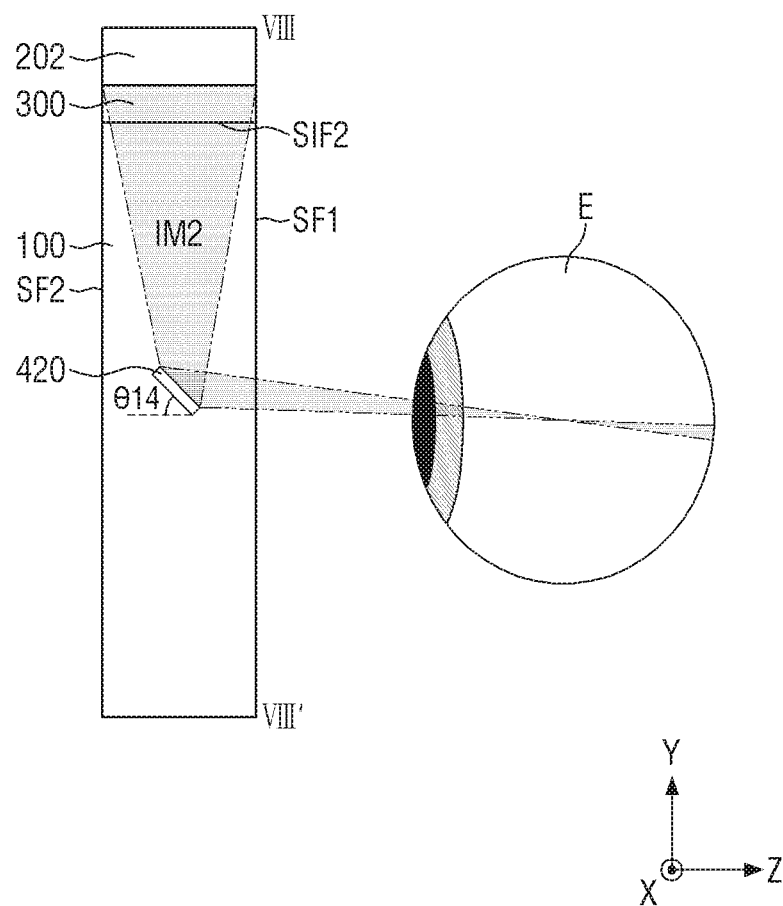
FIG. 30B illustrates an example cross-sectional view taken along the line VIII-VIII' of FIG. 29.
Figure 30C:
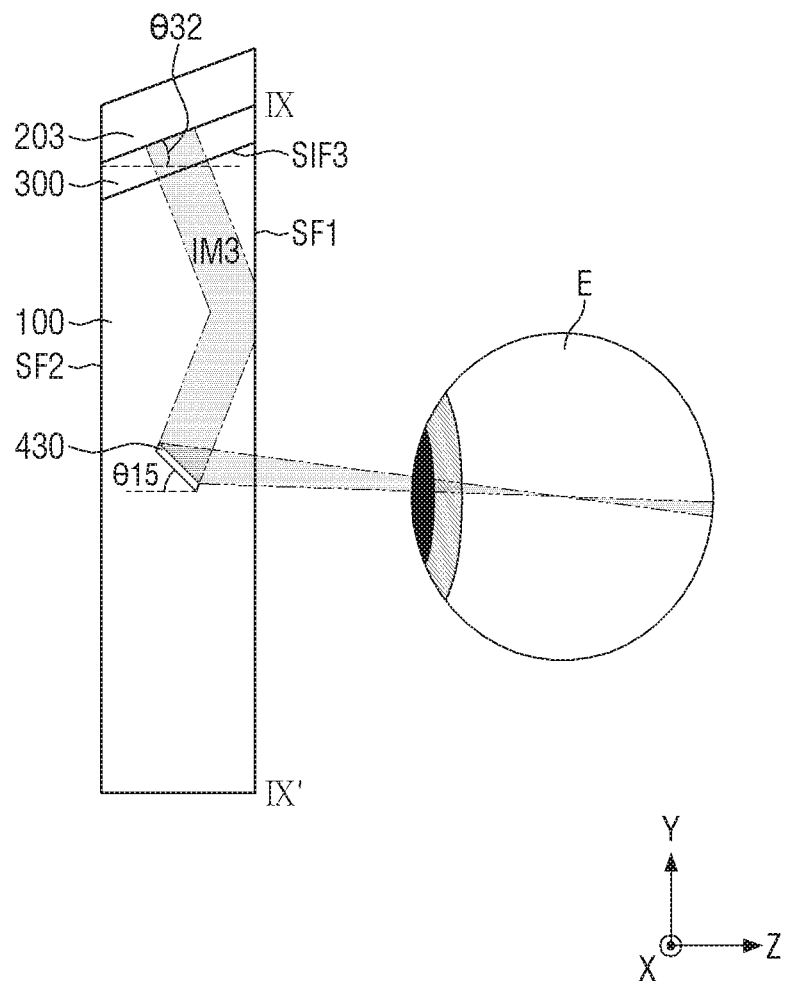
FIG. 30C illustrates an example cross-sectional view taken along the line IX-IX' of FIG. 29.

As shown in FIGS. 29 and 30A to 30C, a first display area 201 disposed on the first side surface SIF1 is inclined at a set or predetermined angle θ31 with respect to the first direction (X-axis direction). Therefore, a first image IM1 displayed on the first display area 201 may be totally reflected on a first surface SF1 and a second surface SF2 of the lens 100 and provided to the first reflective member 410 as illustrated in FIG. 30A. A second display area 202 disposed on the second side surface SIF2 is not inclined with respect to the first direction (X-axis direction). Therefore, a second image IM2 displayed on the second display area 202 may be directly provided to the second reflective member 420 as illustrated in FIG. 30B. A third display area 203 disposed on the third side surface SIF3 is inclined at a set or predetermined angle θ32 with respect to the first direction (X-axis direction). Therefore, a third image IM3 displayed on the third display area 203 may be totally reflected on the first surface SF1 of the lens 100 and provided to the third reflective member 430 as illustrated in FIG. 30C. The angle θ31 at which the first display area 201 is inclined with respect to the first direction (X-axis direction) and the angle θ32 at which the third display area 203 is inclined with respect to the first direction (X-axis direction) may be set in consideration of the total reflection angle of the lens 100 and may be about 45 degrees or less.

That is, according to the embodiment illustrated in FIG. 29, an inclined angle θ13 of the first reflective member 410, an inclined angle θ14 of the second reflective member 420, and an inclined angle θ15 of the third reflective member 430 may be substantially the same. The inclined angle θ13 of the first reflective member 410, the inclined angle θ14 of the second reflective member 420 and the inclined angle θ15 of the third reflective member 430 refer to angles of inclination in the second direction (Y-axis direction) with respect to the first direction (X-axis direction) as illustrated in FIGS. 30A through 30C.

According to the degrees of inclination of the first display area 201, the second display area 202 and the third display area 203, the first image IM1 displayed on the first display area 201 may be provided to the reflective member 410 through one (or two) total reflection, the second image IM2 displayed on the second display area 202 may be provided directly to the reflective member 420, and the third image IM3 displayed on the third display area 203 may be provided to the reflective member 430 through one total reflection. Accordingly, the first through third images IM1 through IM3 may be reflected through the reflective member 410 through 430 to a user's eye E. Therefore, according to the embodiment illustrated in FIG. 29, an area visible to the user's eye E in the flexible display device 200 can be increased, thereby expanding the user's FOV.

Figure 31:
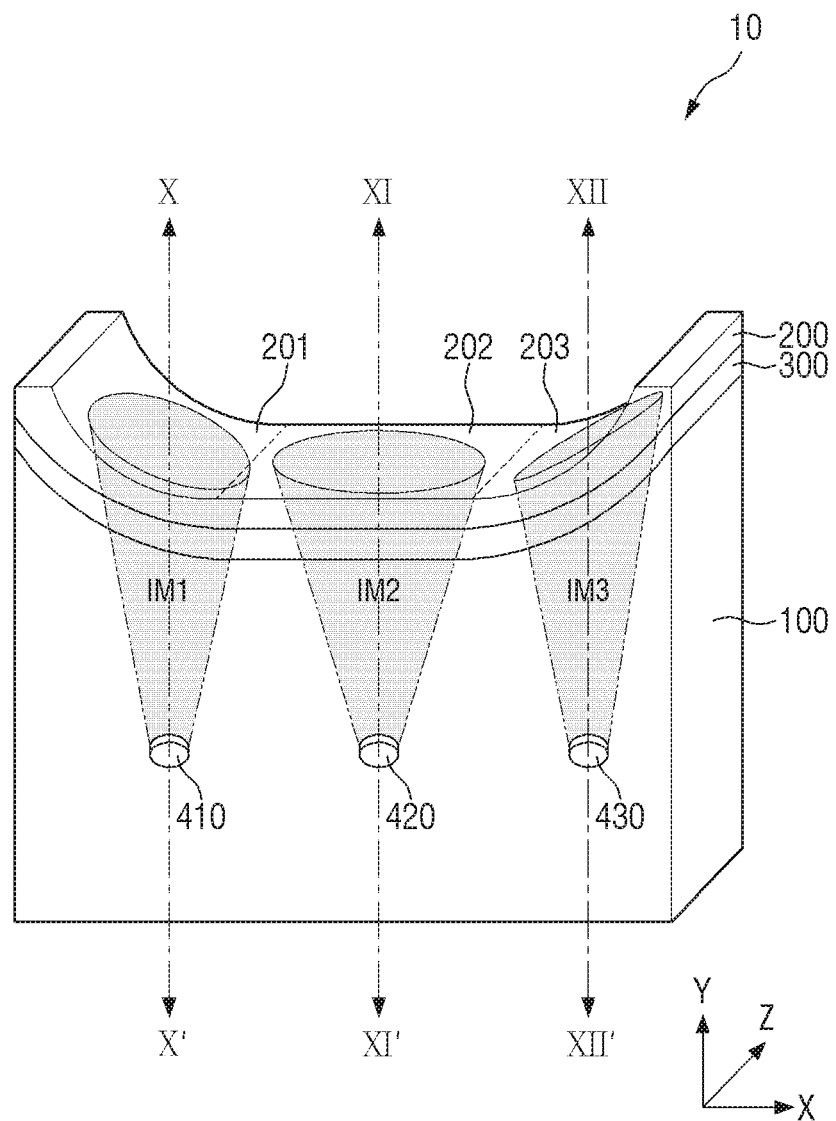
FIG. 31 is a perspective view of an augmented reality providing device according to an embodiment.

FIG. 31 is a perspective view of an augmented reality providing device 10 according to an embodiment.

The augmented reality providing device 10 illustrated in FIG. 31 is different from the embodiment shown in FIG. 29 in that a first side surface SIF1 of a lens 100 is curved with a first curvature from an end of a second side surface SIF2 and a third side surface SIF3 is curved with a second curvature from the other end of the second side surface SIF2 so that a first display area 201 extends from an end of a second display area 202 and is curved with the first curvature and a third display area 203 extends from the other end of the second display area 202 and is curved with the second curvature. In FIG. 31, a description of elements and features identical or substantially similar to those of the embodiment shown in FIG. 29 may not be repeated.

Figure 32A:
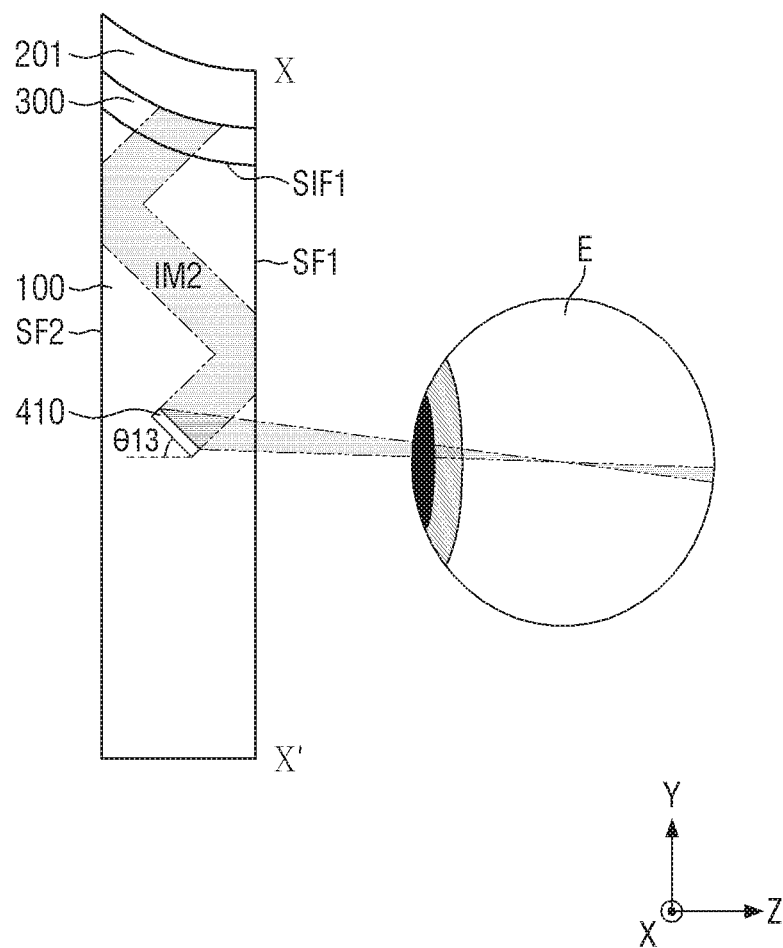
FIG. 32A illustrates an example cross-sectional view taken along the line X-X' of FIG. 31.

Because the first display area 201 disposed on the first side surface SIF1 is curved with the first curvature from an end of the second display area 202, a first image IM1 displayed on the first display area 201 may be totally reflected on a first surface SF1 and a second surface SF2 of the lens 100 and provided to a first reflective member 410 as illustrated in FIG. 32A. Because the second display area 202 disposed on the second side surface SIF2 is flat without curvature, a second image IM2 displayed on the second display area 202 may be directly provided to a second reflective member 420 as illustrated in FIG. 30B. Because the third display area 203 disposed on the third side surface SIF3 is curved with the second curvature from the other end of the second display area 202, a third image IM3 displayed on the third display area 203 may be totally reflected on the first surface SF1 of the lens 100 and provided to a third reflective member 430 as illustrated in FIG. 32C.

Figure 32B:
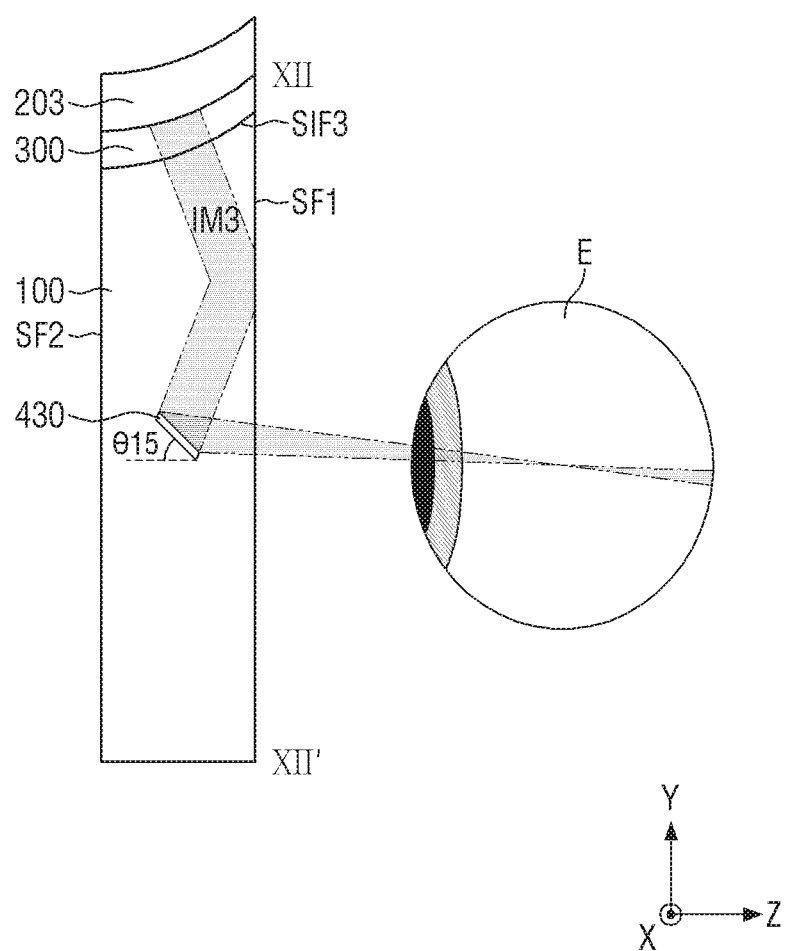
FIG. 32B illustrates an example cross-sectional view taken along the line XII-XII' of FIG. 31.

That is, according to the embodiment shown in FIG. 31, an inclined angle θ13 of the first reflective member 410, an inclined angle θ14 of the second reflective member 420, and an inclined angle θ15 of the third reflective member 430 may be substantially the same. The inclined angle θ13 of the first reflective member 410, the inclined angle θ14 of the second reflective member 420 and the inclined angle θ15 of the third reflective member 430 refer to angles of inclination in the second direction (Y-axis direction) with respect to the third direction (Z-axis direction) as illustrated in FIGS. 30B, 32A and 32B.

According to the degrees of curving, i.e., curvatures of the first display area 201, the second display area 202 and the third display area 203, the first image IM1 displayed on the first display area 201 may be provided to the first reflective member 410 through two total reflections, the second image IM2 displayed on the second display area 202 may be provided directly to the second reflective member 420, and the third image IM3 displayed on the third display area 203 may be provided to the third reflective member 430 through one total reflection. Accordingly, the first through third images IM1 through IM3 may be reflected by the first through third reflective members 410 through 430 to a user's eye E. Therefore, according to the embodiment illustrated in FIG. 31, an area visible to the user's eye E in the flexible display device 200 can be increased, thereby expanding the user's FOV.

Figure 33:
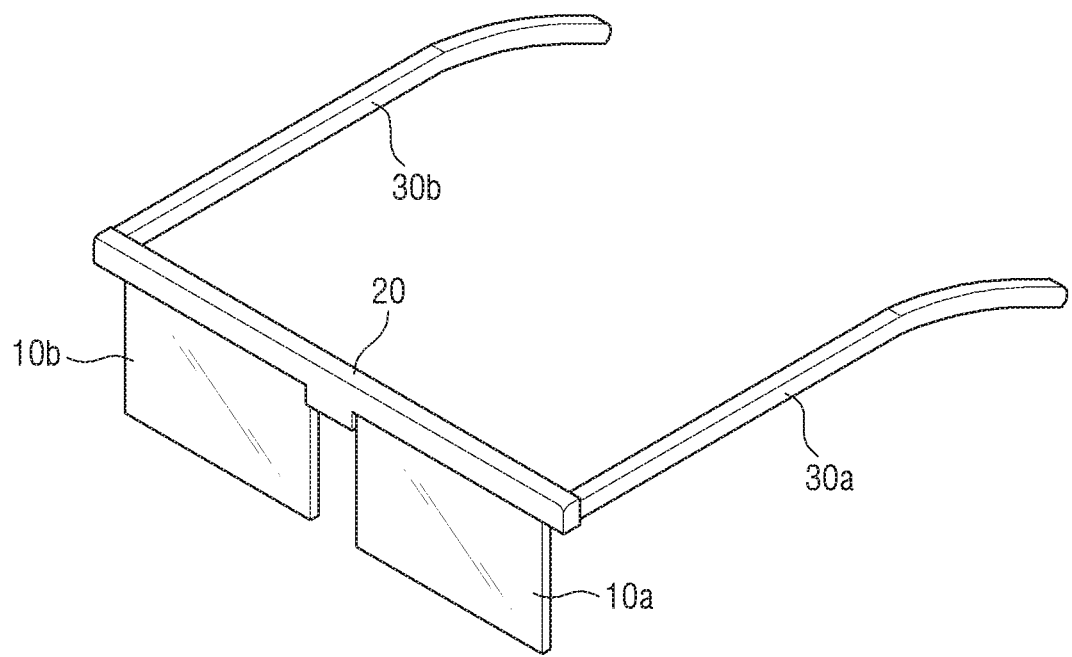
FIG. 33 illustrates an example head mounted display (HMD) including an augmented reality providing device according to an embodiment.

FIG. 33 illustrates an example head mounted display (HMD) including an augmented reality providing device according to an embodiment.

FIG. 33 shows that an augmented reality providing device can be applied to an HMD. An HMD according to an embodiment includes a first augmented reality providing device 10a, a second augmented reality providing device 10b, a support frame 20, and eyeglass temples 30a and 30b as illustrated in FIG. 33.

In FIG. 33, the HMD is implemented in the form of eyeglasses including the eyeglass temples 30a and 30b. However, a head mounted band that can be mounted on the head may also be provided instead of the eyeglass temples 30a and 30b.

An example in which an augmented reality providing device is applied is not limited to that illustrated in FIG. 33, and the augmented reality providing device can be applied in various suitable forms to various other suitable electronic devices.

An augmented reality providing device according to an embodiment can expand an area of a display device visible to a user's eyes, that is, the FOV of the user while utilizing one display.

However, the effects of the embodiments are not restricted to the one set forth herein. The above and other effects of the embodiments will become more apparent to one of daily skill in the art to which the embodiments pertain by referencing the claims, and equivalents thereof.

The use of the terms "a," "an," "the" and similar referents (terms) in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Further, the use of "may" when describing embodiments of the present invention refers to "one or more embodiments of the present invention."

As used herein, the term "substantially," "about," and similar terms are used as terms of approximation and not as terms of degree, and are intended to account for the inherent deviations in measured or calculated values that would be recognized by those of ordinary skill in the art.

What is claimed is:

1. An augmented reality providing device comprising:
 a lens comprising first and second reflective members; and
 a flexible display device comprising a first display area on a first side surface of the lens and a second display area on a second side surface of the lens,
 wherein the first reflective member is configured to reflect a first image displayed on the first display area to a first surface of the lens, and the second reflective member is configured to reflect a second image displayed on the second display area to the first surface of the lens,
 wherein the first display area comprises (1-1)-th and (1-2)-th display regions, and the first reflective member comprises a (1-1)-th reflective member configured to reflect a (1-1)-th image displayed on the (1-1)-th display region to the first surface of the lens and a (1-2)-th reflective member configured to reflect a (1-2)-th image displayed on the (1-2)-th display region to the first surface of the lens, and wherein the (1-1)-th reflective member is closer to the first display area than the (1-2)-th reflective member, and
 wherein the first surface is different from the first side surface and the second side surface of the lens.

2. The augmented reality providing device of claim 1, wherein the second display area extends from an end of the first display area.

3. The augmented reality providing device of claim 1, further comprising an adhesive layer between the first and second side surfaces of the lens and the flexible display device.

4. The augmented reality providing device of claim 1, wherein the flexible display device is inclined at an angle of 45 degrees or less with respect to the first side surface or the second side surface of the lens.

5. The augmented reality providing device of claim 1, wherein the first display area further comprises (1-3)-th display regions, and the first reflective member further comprises a (1-3)-th reflective member configured to reflect a (1-3)-th image displayed on the (1-3)-th display region to the first surface of the lens, and wherein the (1-1)-th reflective member and the (1-3)-th reflective member are arranged side by side in a first direction which is a width direction of the lens.

6. The augmented reality providing device of claim 1, wherein the second display area comprises (2-1)-th and (2-2)-th display regions, and the second reflective member comprises a (2-1)-th reflective member configured to reflect a (2-1)-th image displayed on the (2-1)-th display region to the first surface of the lens and a (2-2)-th reflective member configured to reflect a (2-2)-th image displayed on the (2-2)-th display region to the first surface of the lens, and wherein the (2-1)-th reflective member is closer to the second display area than the (2-2)-th reflective member.

7. The augmented reality providing device of claim 1, wherein the second display area comprises (2-1)-th and (2-3)-th display regions, and the second reflective member comprises a (2-1)-th reflective member configured to reflect a (2-1)-th image displayed on the (2-1)-th display region to the first surface of the lens and a (2-3)-th reflective member configured to reflect a (2-3)-th image displayed on the (2-3)-th display region to the first surface of the lens, and wherein the (2-1)-th reflective member and the (2-3)-th reflective member are arranged side by side in a first direction which is a width direction of the lens.

8. The augmented reality providing device of claim 1, wherein the flexible display device further comprises a third display area on a third side surface of the lens, and the lens further comprises a third reflective member configured to reflect a third image displayed on the third display area to the first surface of the lens.

9. The augmented reality providing device of claim 8, wherein the second display area extends from an end of the first display area, and the third display area extends from an end of the second display area.

10. The augmented reality providing device of claim 8, wherein the flexible display device further comprises a fourth display area on a fourth side surface of the lens, and the lens further comprises a fourth reflective member configured to reflect a fourth image displayed on the fourth display area to the first surface of the lens.

11. The augmented reality providing device of claim 10, wherein the second display area extends from an end of the first display area, the third display area extends from an end of the second display area, and the fourth display area extends from an end of the third display area.

12. The augmented reality providing device of claim 10, further comprising a flexible circuit board at an end of the fourth display area.

13. The augmented reality providing device of claim 10, wherein the first reflective member is closer to the first display area than the second through fourth reflective members, the second reflective member is closer to the second display area than the first, third and fourth reflective members, the third reflective member is closer to the third display area than the first, second and the fourth reflective members, and the fourth reflective member is closer to the fourth display area than the first through third reflective members.

14. The augmented reality providing device of claim 1, wherein the first side surface and the second side surface of the lens are on an upper side of the lens, and the first reflective member and the second reflective member are arranged side by side in a width direction of the lens.

15. The augmented reality providing device of claim 14, wherein the first display area extends from an end of the second display area, and a distance between the first reflective member and the first display area is smaller than a distance between the second reflective member and the second display area.

16. The augmented reality providing device of claim 1, wherein the first side surface and the second side surface of the lens are on an upper side of the lens, and the first reflective member and the second reflective member are arranged side by side in a height direction of the lens.

17. The augmented reality providing device of claim 16, wherein the first display area extends from an end of the second display area, and a distance between the first reflective member and the first display area is greater than a distance between the second reflective member and the second display area.

18. The augmented reality providing device of claim 16, wherein an inclined angle of the second reflective member is larger than an inclined angle of the first reflective member.

19. An augmented reality providing device comprising:
a lens comprising first and second reflective members; and
a flexible display device comprising a first display area on a first side surface of the lens and a second display area on a second side surface of the lens,
wherein the first reflective member is configured to reflect a first image displayed on the first display area to a first surface of the lens, and the second reflective member is configured to reflect a second image displayed on the second display area to the first surface of the lens,
wherein the flexible display device further comprises a third display area on a third side surface of the lens, and the lens further comprises a third reflective member configured to reflect a third image displayed on the third display area to the first surface of the lens, and
wherein the first through third side surfaces of the lens are on an upper side of the lens, the second display area extends from a first end of the first display area, and the third display area extends from a second end opposite to the first end of the first display area.

20. The augmented reality providing device of claim 19, wherein a distance between the second reflective member and the second display area is smaller than a distance between the first reflective member and the first display area, and the distance between the second reflective member and the second display area is smaller than a distance between the third reflective member and the third display area.

21. The augmented reality providing device of claim 20, wherein the first through third reflective members are arranged side by side in a width direction of the lens.

22. The augmented reality providing device of claim 21, wherein an inclined angle of the first reflective member, an inclined angle of the second reflective member, and an inclined angle of the third reflective member are substantially equal to each other.

23. The augmented reality providing device of claim 21, wherein the first display area extends from a first end of the second display area and is curved with a first curvature, and the third display area extends from a second end opposite to the first end of the second display area and is curved with a second curvature.

24. An augmented reality providing device comprising:
a lens comprising a first reflective member; and
a flexible display device on a side surface of the lens and comprising a (1-1)-th display area for displaying a (1-1)-th image and a (1-2)-th display area for displaying a (2-1)-th image,
wherein the side surface of the lens comprises a light separation structure, wherein the light separation structure is configured to provide both the (1-1)-th image and the (2-1)-th image to the first reflective member, and the first reflective member is configured to reflect the (1-1)-th image and the (2-1)-th image from the light separation structure to a first surface of the lens, the first surface being different from the side surface, and
wherein the flexible display device further comprises a (1-3)-th display area for displaying a (1-3)-th image, the light separation structure is further configured to provide the (1-3)-th image to the first reflective member, and the first reflective member is configured to reflect the (1-3)-th image from the light separation structure to the first surface of the lens.

25. The augmented reality providing device of claim 24, wherein the (1-1)-th image is to be displayed on the (1-1)-th display area during a first period, and the (2-1)-th image is to be displayed on the (1-2)-th display area during a second period.

26. The augmented reality providing device of claim 25, wherein the lens further comprises a second reflective member, and the flexible display device, on the side surface of the lens, further comprises a (1-3)-th display area for displaying a (1-2)-th image and a (1-4)-th display area for displaying a (2-2)-th image, wherein the (1-2)-th display area is between the (1-1)-th display area and the (1-3)-th display area, and the (1-3)-th display area is between the (1-2)-th display area and the (1-4)-th display area.

27. The augmented reality providing device of claim 26, wherein the (1-1)-th image is to be displayed on the (1-1)-th display area and the (1-2)-th image is to be displayed on the (1-3)-th display area during a first period, and the (2-1)-th image is to be displayed on the (1-2)-th display area and the (2-2)-th image is to be displayed on the (1-4)-th display area during a second period.

28. The augmented reality providing device of claim 24, wherein the (1-1)-th image is to be displayed on the (1-1)-th display area during a first period, the (1-2)-th image is to be displayed on the (1-2)-th display area during a second period, and the (1-3)-th image is to be displayed on the (1-3)-th display area during a third period.

29. The augmented reality providing device of claim 24, further comprising:
- a gap maintaining member between the lens and the flexible display device;
- a first adhesive layer between the lens and the gap maintaining member; and
- a second adhesive layer between the gap maintaining member and the flexible display device.

\* \* \* \* \*